US012422765B2

(12) United States Patent
Sato et al.

(10) Patent No.: US 12,422,765 B2

(45) Date of Patent: Sep. 23, 2025

(54) TONER CONTAINER INCLUDING A POUCH AND PORTIONS SUPPORTING THE POUCH

(71) Applicant: CANON KABUSHIKI KAISHA, Tokyo (JP)

(72) Inventors: Masaaki Sato, Kanagawa (JP); Koji Wada, Kanagawa (JP); Hiroshi Takarada, Kanagawa (JP); Tsuyoshi Ogawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/235,957

(22) Filed: Aug. 21, 2023

(65) Prior Publication Data

US 2023/0400792 A1 Dec. 14, 2023

Related U.S. Application Data

(60) Division of application No. 17/590,934, filed on Feb. 2, 2022, now Pat. No. 11,774,881, which is a (Continued)

(30) Foreign Application Priority Data

Aug. 9, 2019 (JP) ................................ 2019-146927
Aug. 9, 2019 (JP) ................................ 2019-146928
(Continued)

(51) Int. Cl.
*G03G 15/08* (2006.01)
*B65D 33/00* (2006.01)
(Continued)

(52) U.S. Cl.
CPC ......... *G03G 15/0874* (2013.01); *B65D 33/02* (2013.01); *B65D 61/00* (2013.01);
(Continued)

(58) Field of Classification Search
CPC ....... G03G 15/0874; G03G 2215/0682; G03G 15/0886; G03G 2215/0692;
(Continued)

(56) References Cited

U.S. PATENT DOCUMENTS 4,371,015 A 2/1983 Simons
4,615,364 A 10/1986 Kawata
(Continued)

FOREIGN PATENT DOCUMENTS

DE 20-2007-007174 U1 8/2007
EP 761558 A1 3/1997
(Continued)

OTHER PUBLICATIONS

International Search Report and Written Opinion for International Patent Application No. PCT/JP2020/030288.
(Continued)

*Primary Examiner* — Robert B Beatty
(74) *Attorney, Agent, or Firm* — Venable LLP

(57) ABSTRACT

A toner container includes a pouch configured to accommodate the toner therein and provided with an opening at a first end portion of the pouch with respect to a first direction, with a width of the pouch in a second direction that is perpendicular to the first direction being wider than a width of the pouch in a third direction that is perpendicular to both the first direction and the second direction. A first supporting portion supports the pouch on a first side of the first end portion of the pouch with respect to the second direction, the first supporting portion extending in a direction from the first end portion of the pouch to a second end portion of the pouch that is opposite to the first end portion of the pouch. A second supporting portion supports the pouch on a second side of the first end portion of the pouch that is opposite to the first side of the first end portion of the pouch with respect
(Continued)

to the second direction, the second supporting portion extending in the direction from the first end portion of the pouch to the second end portion of the pouch.

8 Claims, 45 Drawing Sheets

Related U.S. Application Data continuation of application No. PCT/JP2020/030288, filed on Jul. 31, 2020.

(30) Foreign Application Priority Data

Aug. 9, 2019 (JP) ................................ 2019-146929
Aug. 9, 2019 (JP) ................................ 2019-146930

(51) Int. Cl.
*B65D 33/02* (2006.01)
*B65D 61/00* (2006.01)
*B65D 83/06* (2006.01)

(52) U.S. Cl.
CPC ......... *B65D 83/06* (2013.01); *G03G 15/0886* (2013.01); *B65D 2585/6892* (2013.01); *G03G 2215/0682* (2013.01); *G03G 2215/0692* (2013.01)

(58) Field of Classification Search
CPC ... G03G 2215/0673; G03G 2215/0678; B65D 33/02; B65D 83/0055; B65D 83/06; B65D 2231/001; B65D 2585/6892; B65D 1/32; B65D 1/42
USPC ..................................... 399/262; 222/DIG. 1
See application file for complete search history.

(56) References Cited

U.S. PATENT DOCUMENTS

| | | | | |
|---|---|---|---|---|
| 5,331,373 | A | 7/1994 | Nomura et al. | |
| 5,452,056 | A | 9/1995 | Nomura et al. | |
| 5,528,341 | A | 6/1996 | Shishido et al. | |
| 5,585,889 | A | 12/1996 | Shishido et al. | |
| 5,785,213 | A | 7/1998 | Guillot | |
| 5,848,516 | A | 12/1998 | Ban | |
| 5,870,654 | A | 2/1999 | Sato et al. | |
| 5,911,096 | A | 6/1999 | Batori et al. | |
| 5,940,658 | A | 8/1999 | Yokoi et al. | |
| 5,966,566 | A | 10/1999 | Odagawa et al. | |
| 5,974,288 | A | 10/1999 | Sato | |
| 6,058,283 | A | 5/2000 | Okada | |
| 6,075,957 | A | 6/2000 | Batori et al. | |
| 6,104,894 | A | 8/2000 | Sato et al. | |
| 6,131,007 | A | 10/2000 | Yamaguchi et al. | |
| 6,185,390 | B1 | 2/2001 | Higeta et al. | |
| 6,188,856 | B1 | 2/2001 | Sato | |
| 6,332,065 | B1 | 12/2001 | Howard | |
| 6,363,235 | B1 | 3/2002 | Chiesa et al. | |
| 6,381,420 | B1 | 4/2002 | Sato et al. | |
| 6,519,436 | B2 * | 2/2003 | Katsuyama ........ | G03G 15/0874 229/117.27 |
| 6,549,744 | B2 * | 4/2003 | Terazawa .............. | B65D 77/06 222/105 |
| 6,640,066 | B2 | 10/2003 | Sato | |
| 6,714,749 | B2 | 3/2004 | Sato et al. | |
| 6,895,199 | B2 | 5/2005 | Sato et al. | |
| 6,898,399 | B2 | 5/2005 | Morioka et al. | |
| 6,937,832 | B2 | 8/2005 | Sato et al. | |
| 7,054,582 | B2 * | 5/2006 | Huang ............... | G03G 15/0874 399/258 |
| 7,149,457 | B2 | 12/2006 | Miyabe et al. | |
| 7,155,140 | B2 | 12/2006 | Arimitsu et al. | |
| 7,155,141 | B2 | 12/2006 | Sato et al. | |
| 7,158,736 | B2 | 1/2007 | Sato et al. | |
| 7,200,349 | B2 | 4/2007 | Sato et al. | |
| 7,218,882 | B2 | 5/2007 | Toba et al. | |
| 7,224,925 | B2 | 5/2007 | Sato et al. | |
| 7,283,766 | B2 | 10/2007 | Arimitsu et al. | |
| 7,349,657 | B2 | 3/2008 | Sato et al. | |
| 7,412,193 | B2 | 8/2008 | Sato et al. | |
| 7,499,663 | B2 | 3/2009 | Sato et al. | |
| 7,660,550 | B2 | 2/2010 | Mori et al. | |
| 7,689,146 | B2 | 3/2010 | Sato et al. | |
| 7,720,408 | B2 | 5/2010 | Ueno et al. | |
| 7,813,668 | B2 | 10/2010 | Ueno et al. | |
| 8,155,553 | B2 | 4/2012 | Takarada | |
| 8,249,485 | B2 | 8/2012 | Horikawa et al. | |
| 8,515,306 | B2 | 8/2013 | Kawai et al. | |
| 8,874,010 | B2 | 10/2014 | Wada | |
| 8,879,944 | B2 | 11/2014 | Takarada et al. | |
| 9,052,675 | B2 | 6/2015 | Takarada et al. | |
| 9,134,696 | B2 | 9/2015 | Sato et al. | |
| 9,207,581 | B2 | 12/2015 | Wada et al. | |
| 9,274,489 | B2 | 3/2016 | Takarada et al. | |
| 9,367,025 | B2 | 6/2016 | Takarada et al. | |
| 9,367,031 | B2 | 6/2016 | Wada | |
| 9,429,877 | B2 | 8/2016 | Sato et al. | |
| 9,429,906 | B2 | 8/2016 | Yoshimura et al. | |
| 9,529,298 | B2 | 12/2016 | Sato et al. | |
| 9,632,451 | B2 | 4/2017 | Hayashi et al. | |
| 9,688,008 | B2 | 6/2017 | Takarada et al. | |
| 9,804,560 | B2 | 10/2017 | Sato et al. | |
| 9,817,338 | B2 | 11/2017 | Hoshi et al. | |
| 9,836,020 | B2 | 12/2017 | Yoshimura et al. | |
| 9,885,974 | B2 | 2/2018 | Sato et al. | |
| 10,139,777 | B2 | 11/2018 | Sato et al. | |
| 10,168,664 | B2 | 1/2019 | Yoshimura et al. | |
| 10,228,652 | B2 | 3/2019 | Sato et al. | |
| 10,254,712 | B2 | 4/2019 | Uneme et al. | |
| 10,353,339 | B2 | 7/2019 | Koishi et al. | |
| 10,386,786 | B2 | 8/2019 | Sato et al. | |
| 10,401,762 | B2 | 9/2019 | Hoshi et al. | |
| 10,401,788 | B2 | 9/2019 | Yoshimura et al. | |
| 10,459,402 | B2 | 10/2019 | Kashiide et al. | |
| 10,534,313 | B2 | 1/2020 | Sugimoto et al. | |
| 10,591,868 | B2 | 3/2020 | Yoshimura et al. | |
| 10,678,185 | B2 | 6/2020 | Uneme et al. | |
| 10,705,480 | B2 | 7/2020 | Sato et al. | |
| 10,712,708 | B2 | 7/2020 | Sato et al. | |
| 10,782,647 | B2 | 9/2020 | Kashiide et al. | |
| 10,824,110 | B2 | 11/2020 | Sugimoto et al. | |
| 10,901,365 | B2 | 1/2021 | Sato et al. | |
| 10,948,872 | B2 | 3/2021 | Ogawa et al. | |
| 10,996,623 | B2 | 5/2021 | Sato et al. | |
| 11,036,181 | B2 | 6/2021 | Uneme et al. | |
| 11,067,950 | B2 | 7/2021 | Kashiide et al. | |
| 11,099,521 | B2 | 8/2021 | Uneme et al. | |
| 11,112,751 | B2 | 9/2021 | Sato et al. | |
| 11,131,960 | B2 | 9/2021 | Sato et al. | |
| 11,156,954 | B2 | 10/2021 | Yoshimura et al. | |
| 11,175,624 | B2 | 11/2021 | Sugimoto et al. | |
| 2001/0052526 | A1 * | 12/2001 | Kasahara ........... | G03G 15/0865 222/105 |
| 2005/0155989 | A1 | 7/2005 | Vaynshteyn et al. | |
| 2006/0008289 | A1 | 1/2006 | Sato et al. | |
| 2006/0016226 | A1 | 1/2006 | Nakanishi et al. | |
| 2006/0024091 | A1 | 2/2006 | Wegman et al. | |
| 2007/0048027 | A1 | 3/2007 | Park | |
| 2007/0269227 | A1 | 11/2007 | Sato | |
| 2008/0193057 | A1 * | 8/2008 | Nomura ............ | B29C 66/53263 383/119 |
| 2009/0263164 | A1 * | 10/2009 | Koeda ................ | G03G 15/0855 399/262 |
| 2012/0219318 | A1 | 8/2012 | Yoshida et al. | |
| 2014/0186075 | A1 | 7/2014 | Morita | |
| 2014/0376834 | A1 * | 12/2014 | Callahan ................ | B65D 75/52 383/119 |
| 2018/0170622 | A1 * | 6/2018 | Pellingra ............ | B65D 33/1616 |
| 2020/0142353 | A1 | 5/2020 | Sato et al. | |
| 2020/0249623 | A1 | 8/2020 | Sato et al. | |
| 2021/0088965 | A1 | 3/2021 | Sato et al. | |

(56) References Cited

U.S. PATENT DOCUMENTS

| | | | |
|---|---|---|---|
| 2021/0146696 | A1 | 5/2021 | Storey et al. |
| 2021/0181672 | A1 | 6/2021 | Ogawa et al. |
| 2021/0191314 | A1 | 6/2021 | Sato et al. |
| 2021/0263467 | A1 | 8/2021 | Sato et al. |
| 2021/0311431 | A1 | 10/2021 | Kashiide et al. |
| 2021/0325824 | A1 | 10/2021 | Uneme et al. |
| 2021/0405583 | A1 | 12/2021 | Yoshimura et al. |
| 2022/0035309 | A1 | 2/2022 | Sugimoto et al. |
| 2022/0155722 | A1 | 5/2022 | Kashiide et al. |
| 2022/0197211 | A1 | 6/2022 | Sato et al. |

FOREIGN PATENT DOCUMENTS

| | | | |
|---|---|---|---|
| JP | H05-2164 | U | 1/1993 |
| JP | H07-168435 | A | 7/1995 |
| JP | H08-30084 | A | 2/1996 |
| JP | H08-082992 | A | 3/1996 |
| JP | H11-065253 | A | 3/1999 |
| JP | 2001-324863 | A | 11/2001 |
| JP | 2002-091144 | A | 3/2002 |
| JP | 2002-202658 | A | 7/2002 |
| JP | 2003-107875 | A | 4/2003 |
| JP | 2003-122101 | A | 4/2003 |
| JP | 2005-301297 | A | 10/2005 |
| JP | 2006-023755 | A | 1/2006 |
| JP | 2006-184643 | A | 7/2006 |
| JP | 2009-020302 | A | 1/2009 |
| JP | 2010-036319 | A | 2/2010 |
| JP | 2012-177766 | A | 9/2012 |
| JP | 2014-130185 | A | 7/2014 |
| JP | 2017-191182 | A | 10/2017 |
| JP | 2018-084832 | A | 5/2018 |
| KR | 2006-0016226 | A | 2/2006 |
| WO | 2016/113188 | A1 | 7/2016 |
| WO | 2020/046333 | A1 | 3/2020 |

OTHER PUBLICATIONS

May 2, 2023 Office Action in Japanese Patent Application No. 2019-146927 (with English translation).

Jun. 6, 2023 Office Action in Japanese Patent Application No. 2019-146929 (with English translation).

Jun. 13, 2023 Office Action in Japanese Patent Application No. 2019-146930 (with English translation).

Jul. 25, 2023 Office Action in Chinese Patent Application No. 202080056391.2 (with English translation).

May 28, 2024 Office Action in Japanese Patent Application No. 2023-157462 (with English translation).

Jan. 28, 2025 Office Action in Japanese Patent Application No. 2023-192967.

* cited by examiner (a)

(b)

(a)

(b)

(a)

(b)

TONER CONTAINER INCLUDING A POUCH AND PORTIONS SUPPORTING THE POUCH

TECHNICAL FIELD

The present invention relates to a toner container mountable in an image forming apparatus for forming an image on a recording material.

BACKGROUND ART

In general, an image forming apparatus of an electrophotographic type forms an image by transferring a toner image, formed on a surface of a photosensitive drum, onto a transfer material as a transfer medium. Further, as a developer supplying type, for example, a process cartridge type or a toner supplying (replenishing) type has been known. The process cartridge type is a type in which the photosensitive drum and a developing container are integrally assembled as a process cartridge in which the process cartridge is exchanged with a new one when the developer runs out.

On the other hand, the toner supplying type is a type in which when the toner runs out, toner newly supplied (replenished) to a developing container. Conventionally, a one-component developing device of the toner supplying type in which a toner supplying box capable of supplying the toner is connected to a toner feeding passage along which the toner is fed has been proposed (Japanese Laid-Open Patent Application Hei 08-30084). The toner stored in the toner supplying box is fed to the toner feeding passage by a feeding screw.

Problem to be Solved by the Invention

In recent years, a toner container mountable in the image forming apparatus has been required by a user to be used in various manners.

Therefore, an object of the present invention is to provide a form of the toner container mounted in the image forming apparatus.

Means for Solving the Problem

According to an aspect of the present invention, there is provided a toner container for accommodating toner, the tone container comprising a pouch configured to accommodate the toner therein and provided with an opening at a first end portion of the pouch with respect to a first direction, with a width of the pouch in a second direction that is perpendicular to the first direction being wider than a width of the pouch in a third direction that is perpendicular to both the first direction and the second direction; a base attached to the first end portion of the pouch and provided with a supplying opening communicating with the opening, the supplying opening being configured to permit supply of the toner to outside of the toner; a first supporting portion supporting the pouch on a first side of the first end portion of the pouch with respect to the second direction, the first supporting portion extending in a direction from the first end portion of the pouch to a second end portion of the pouch that is opposite to the first end portion of the pouch; and a second supporting portion supporting the pouch on a second side of the first end portion of the pouch that is opposite to the first side of the first end portion of the pouch with respect to the second direction, the second supporting portion extending in the direction from the first end portion of the pouch to the second end portion of the pouch, wherein, as seen in the third direction, a central portion of the pouch between the first supporting portion and the second supporting portion with respect to the second direction is exposed to outside of the first and second supporting portions.

EMBODIMENTS FOR CARRYING OUT THE INVENTION

In the following, exemplary embodiments will be described while making reference to the drawings.

First Embodiment

Figure 1:
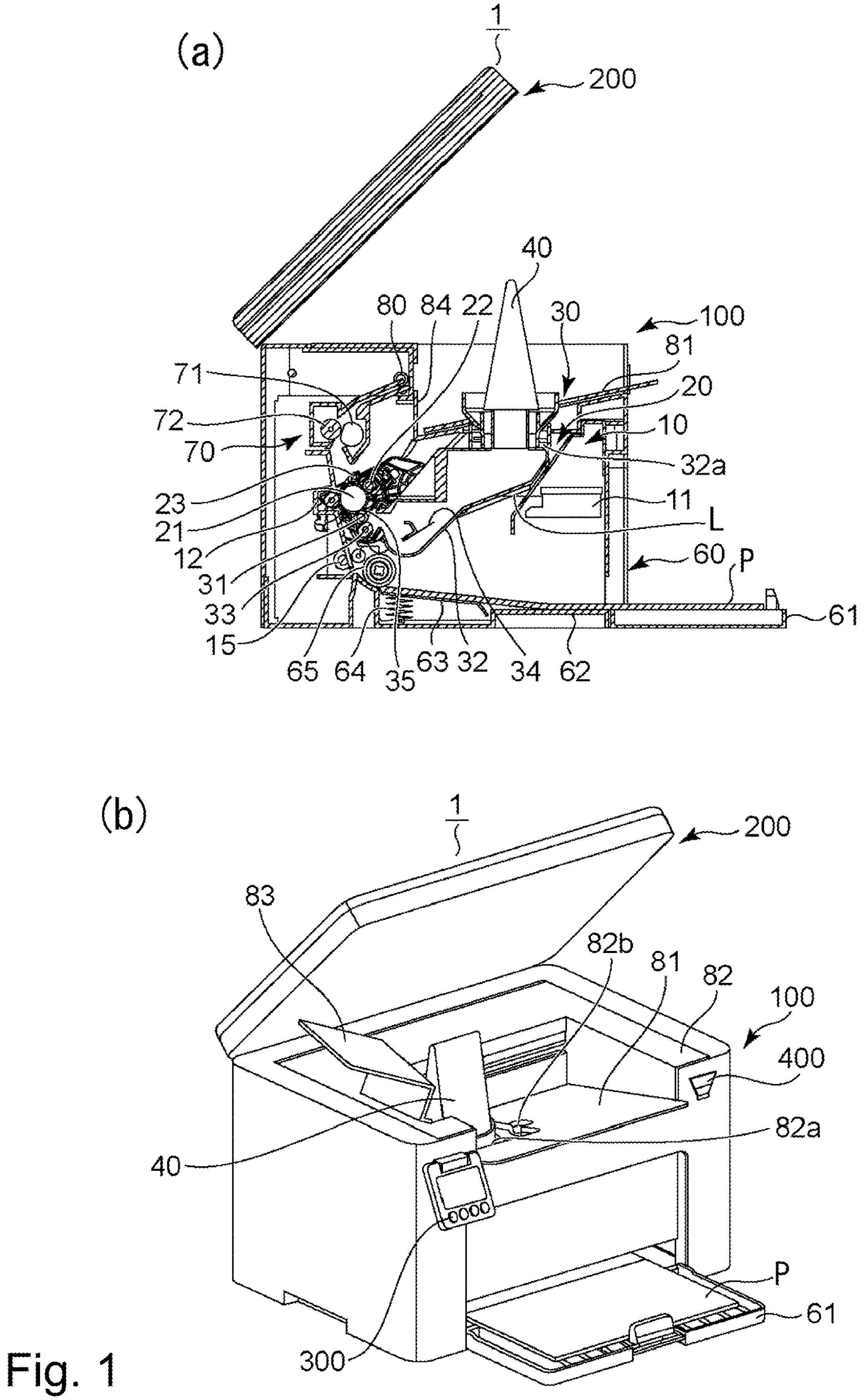
In FIG. 1, part (a) is a sectional view showing an image forming apparatus according to a first embodiment, and part (b) is a perspective view showing the image forming apparatus.

Part (a) of FIG. 1 is a schematic view showing a structure of an image forming apparatus 1 according to a first embodiment. The image forming apparatus 1 is a monochromatic printer for forming an image on a recording material on the basis of image information inputted from an external device. In the recording material, various sheet materials different in material including papers such as plain paper and thick paper, a plastic film such as a sheet for an overhead projector, special-shaped sheets such as an envelope and index paper, a cloth, and the like are included.

[General Structure]

The image forming apparatus 1 includes, as shown in parts (a) and (b) of FIG. 1, a printer main assembly 100 as an apparatus main assembly, a reading device 200 supported so as to be openable relative to the printer main assembly 100, and an operating portion 300 mounted to an outer casing surface of the printer main assembly 100. The printer main assembly 100 includes an image forming portion 10 for forming a toner image on the recording material, a feeding portion 60 for feeding the recording material to the image forming portion 10, a fixing portion 70 for fixing the toner image, formed by the image forming portion 10, on the recording material, and a discharging roller pair 80.

The image forming portion 10, a scanner unit 11, a process cartridge 20 of an electrophotographic type, and a transfer roller 12 for transferring the toner image, formed on a photosensitive drum 21 of the process cartridge 20, onto the recording material. The process cartridge 20 includes, as shown in part (a) and (b) of FIG. 6, a developing device 30 including the photosensitive drum 21, a charging roller 22 disposed at a periphery of the photosensitive drum 21, a pre-exposure device 23, and a developing roller 31.

The photosensitive drum 21 is a photosensitive member molded in a cylindrical shape. The photosensitive drum 21 in this embodiment includes, on a drum-shaped base material molded with aluminum, a photosensitive layer formed with a negatively chargeable organic photosensitive member. Further, the photosensitive drum 21 as an image bearing member is rotationally driven at a predetermined process speed in a predetermined direction (clockwise direction in the figure) by a motor.

The charging roller 22 contacts the photosensitive drum 21 at a predetermined press-contact force and forms a charging portion. Further, a desired charging voltage is applied to the charging roller 22 by a high charging voltage source, so that a surface of the photosensitive drum 21 is electrically charged uniformly to a predetermined potential. In this embodiment, the photosensitive drum 21 is charged to a negative polarity by the charging roller 22. The pre-exposure device 23 discharges a surface potential of the photosensitive drum 21 before entering the charging portion in order to generate stable electric discharge at the charging portion.

The scanner unit 11 irradiates the photosensitive drum 21, by using a polygonal mirror, with laser light corresponding to image information inputted from the external device or the reading device 200, so that the surface of the photosensitive drum 21 is subjected to scanning exposure. By this light exposure, an electrostatic latent image depending on the image information is formed on the surface of the photosensitive drum 21. Incidentally, the scanner unit 11 is not limited to a laser scanner device, but for example, an LED exposure device including an LED array in which a plurality of LEDs are arranged along a longitudinal direction of the photosensitive drum 21.

The developing device 30 includes the developing roller 31 as a developer carrying member for carrying a developer, a developing container 32 which is a frame for the developing device 30, and a supplying roller 33 capable of supplying the developer to the developing roller 31. The developing roller 31 and the supplying roller 33 are rotatably supported by the developing container 32. Further, the developing roller 31 is disposed at an opening of the developing container 31 so as to oppose the photosensitive drum 21. The supplying roller 33 rotatably contacts the developing roller 31, and toner as the developer accommodated in the developing container 32 is applied onto the surface of the developing roller 31 by the supplying roller 33. Incidentally, when a constitution capable of supplying the toner sufficiently to the developing roller 31 is employed, the supplying roller 33 is not necessarily be required.

The developing device 30 in this embodiment uses a contact development type as a development type. That is, a toner layer carried on the developing roller 31 contacts the photosensitive drum 21 at a developing portion (developing region) where the photosensitive drum 21 and the developing roller 31 oppose each other. To the developing roller 31, a developing voltage is applied by a high developing voltage source. Under application of the developing voltage, the toner carried on the developing roller 31 is transferred from the developing roller 31 onto the drum surface in accordance with a potential distribution of the surface of the photosensitive drum 21, so that the electrostatic latent image is developed into a toner image. Incidentally, in this embodiment, a reversal development type is employed. That is, the toner image is formed by being deposited on a surface region of the photosensitive drum 21 attenuated in charge amount by being exposed to light in an exposure step after being charged in a charging step.

Further, in this embodiment, the toner which is 6 μm in particle size and of which normal charge polarity is a negative polarity is used. As the toner in this embodiment, a polymerization toner formed by a polymerization method as an example is employed. Further, the toner in this embodiment is a so-called non-magnetic one-component developer which does not contain a magnetic component and in which the toner is carried on the developing roller 31 principally by an intermolecular force or an electrostatic force (mirror force). However, a one-component developer containing a magnetic component may also be used. Further, in the one-component developer, an additive (for example, wax or silica fine particles) for adjusting flowability and charging performance is contained in addition to toner particles in some cases. Further, as the developer, a two-component developer constituted by non-magnetic toner and a magnetic carrier may also be used. In the case where the developer having a magnetic property is used, as the developer carrying member, for example, a cylindrical developing sleeve inside of which a magnet is disposed is used.

At an inner portion of the developing container 32, a stirring member 34 as a stirring means is provided. The stirring member 34 not only stirs the toner in the developing container 32 but also sends the toner toward the developing roller 31 and the supplying roller 33 by being driven and rotated by a motor M1 (see FIG. 12). Further, the stirring member 34 has a function of circulating the toner, peeled off from the developing roller 31 without being used for the development, in the developing container and of uniformizing the toner in the developing container. Incidentally, the stirring member 34 is not limited to a rotatable form. For example, a stirring member in a swingable from may also be employed.

Further, at an opening of the developing container 32 where the developing roller 31 is disposed, a developing blade 35 for regulating an amount of the toner carried on the developing roller 31 is disposed. The toner supplied to the surface of the developing roller 31 passes through an opposing portion to the developing blade 35 with rotation of the developing roller 31, so that the toner is uniformly formed in a thin layer and is charged to the negative polarity by triboelectric charge.

A feeding portion 60 includes, as shown in parts (a) and (b) of FIG. 1, a front door 61 supported so as to be openable by the printer main assembly 100, a tray portion 62, an intermediary plate 63, a tray spring 64, and a pick-up roller 65. The tray portion 62 constitutes a bottom of a recording material accommodating space which appears by opening the front door 61, and the intermediary plate 63 is supported by the tray portion 62 so as to be capable of being raised and lowered. The tray spring 64 urges the intermediary plate 63 upward and presses the recording materials P, stacked on the intermediary plate 63, against the pick-up roller 65. Incidentally, the front door 61 closes the recording material accommodating space in a state in which the front door 61 is closed relative to the printer main assembly 100, and supports the recording materials P together with the tray portion 62 and the intermediary plate 63 in a state in which the front door 61 is opened relative to the printer main assembly 100.

The fixing portion 70 is a heat fixing type in which an image fixing process is performed by heating and melting the toner on the recording material. The fixing portion 70 includes a fixing film 71, a fixing heater such as a ceramic heater for heating the fixing film 71, a thermistor for measuring a temperature of the fixing heater, and a pressing roller 72 press-contacting the fixing film 71.

Next, an image forming operation of the image forming apparatus 1 will be described. When an instruction of image formation is inputted to the image forming apparatus 1, on the basis of the image information inputted from an external computer connected to the image forming apparatus 1 or from the reading device 200, an image forming process by the image forming portion 10 is started. The scanner unit 11 emits the laser light toward the photosensitive drum 21 on the basis of the inputted image information. At this time, the photosensitive drum 21 is charged in advance by the charging roller 22, and is irradiated with the laser light, so that the electrostatic latent image is formed on the photosensitive drum 21. Thereafter, this electrostatic latent image is developed by the developing roller 31, so that the toner image is formed on the photosensitive drum 21.

In parallel to the above-described image forming process, the pick-up roller 65 of the feeding portion 60 sends the recording material P supported by the front door 61, the tray portion 62, and the intermediary plate 63. The recording material P is fed to the registration roller pair 15 by the pick-up roller 65, and is abutted against a nip of the registration roller pair 15, so that oblique movement of the recording material P is corrected. Further, the registration roller pair 15 is driven by being timed to a transfer timing of the toner image, and is conveyed toward a transfer nip formed by a transfer roller 12 and the photosensitive drum 21.

To the transfer roller 12 as a transfer means, a transfer voltage is applied from a high transfer voltage source, so that the toner image carried on the photosensitive drum 21 is transferred onto the recording material P conveyed by the registration roller pair 15. The recording material P onto which the toner image is transferred is conveyed to the fixing portion 70, where the toner image is heated and pressed when the recording material P passes through a nip between the fixing film 71 and the pressing roller 72 of the fixing portion 70. By this, the recording material P passes through the fixing portion 70 is thereafter fixed, so that the toner image is fixed on the recording material P. The recording material P passed through the fixing portion 70 is discharged to an outside of the image forming apparatus 1 (outside of the printer) by a discharging roller pair 80 as a discharging means, so that the discharged recording materials P are stacked on a discharge tray 81 as a stacking portion formed at an upper portion of the printer main assembly 100.

The discharge tray 81 is inclined upward toward a downstream in a discharging direction of the recording material, and the recording material discharged on the discharge tray 81 slides down on the discharge tray 81, so that a trailing end of the recording material is aligned by a restricting surface 84.

Figure 4:
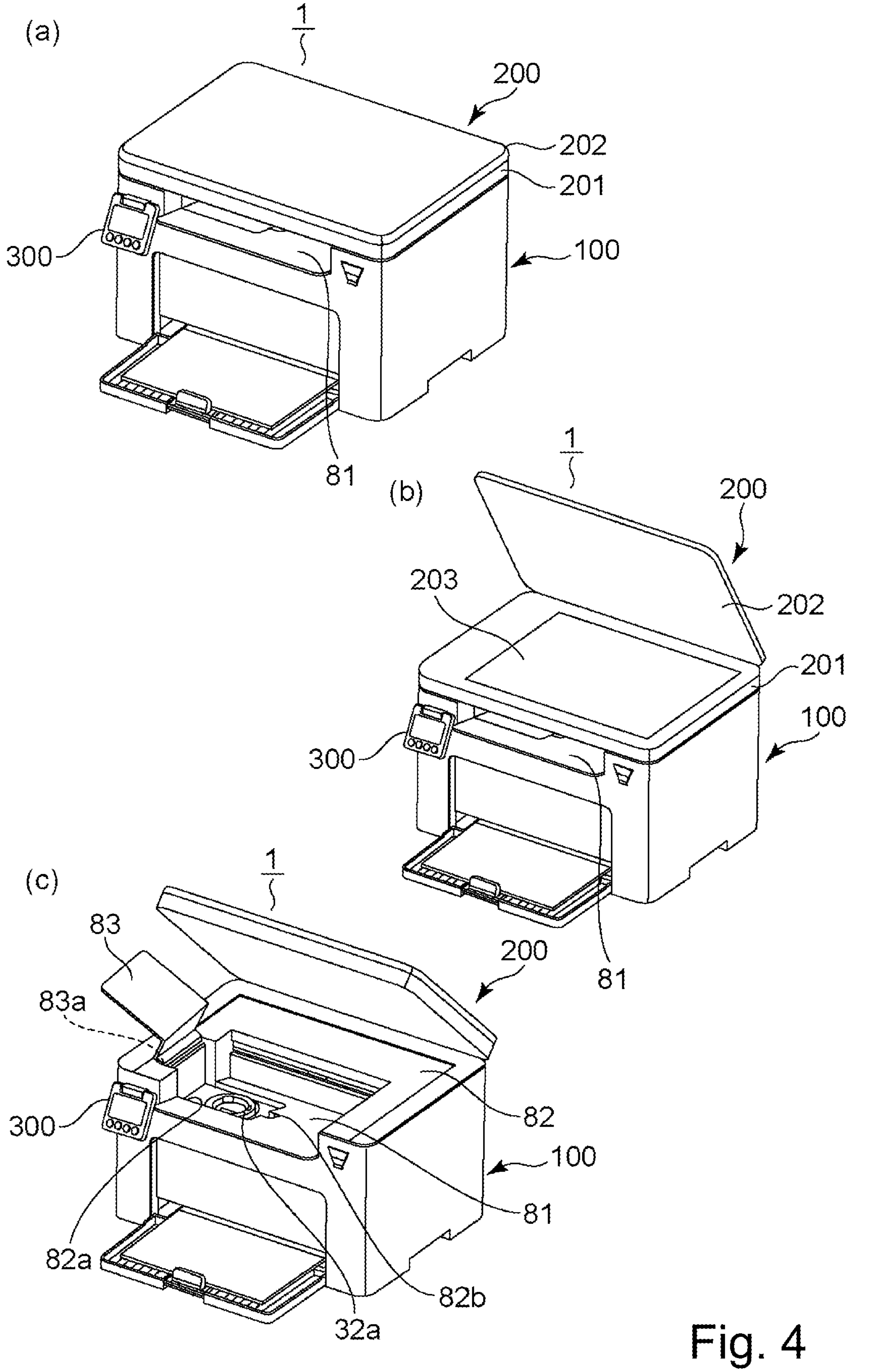
In FIG. 4, part (a) is a perspective view showing the image forming apparatus in a state in which a platen of a reading device is closed, part (b) is a perspective view showing the image forming apparatus in a state in which the platen is opened, and part (c) is a perspective view showing the image forming apparatus in a state in which the reading device is opened.

The reading device 200 includes, as shown in parts (a) and (b) of FIG. 4, a read unit 201 in which an unshown reading portion is built, and a platen 202 supported by the reading unit 201 so as to be openable closable. At an upper surface of the reading unit 201, an original supporting platen glass 203 which permits transmission of light emitted from the reading portion and on which an original is to be placed.

In the case where a user intends to cause the reading device 200 to read an image of the original, the user places the original on the original supporting platen glass 203 in a state in which the platen 202 is opened. Then, the platen 202 is closed and a positional deviation of the original on the original supporting platen glass 203 is prevented, so that a reading instruction is outputted to the image forming apparatus 1 by operating the operating portion 300, for example. When a reading operation is started, the reading portion in the reading unit 201 reciprocates in a sub-scan direction, i.e., the reading portion reciprocates in a left-right direction in a state in which the user faces the operating portion 300 of the image forming apparatus 1 on a front (surface) side. The reading portion receives light reflected by the original by a light receiving portion while emitting light from a light emitting portion toward the original, and photoelectrically converts the light, so that the reading portion reads the image of the original. Incidentally, in the following, on the basis of a state in which the user faces the operating portion 300 on the front side, a front-rear direction, the left-right direction, and an up-down direction are defined.

Figure 2:
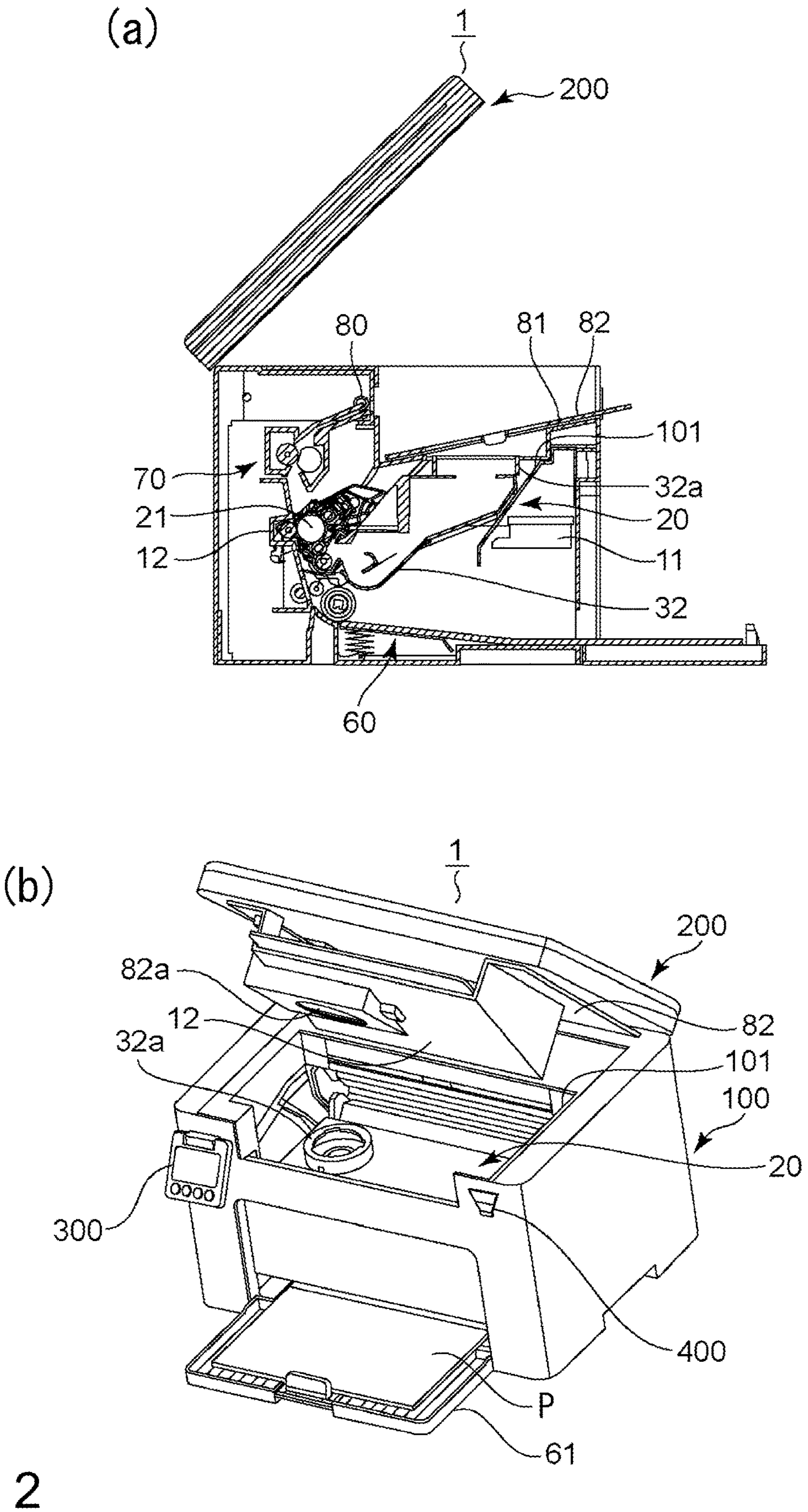
In FIG. 2, part (a) is a sectional view showing the image forming apparatus, and part (b) is a perspective view showing the image forming apparatus in a state in which a top cover is opened.
Figure 3:
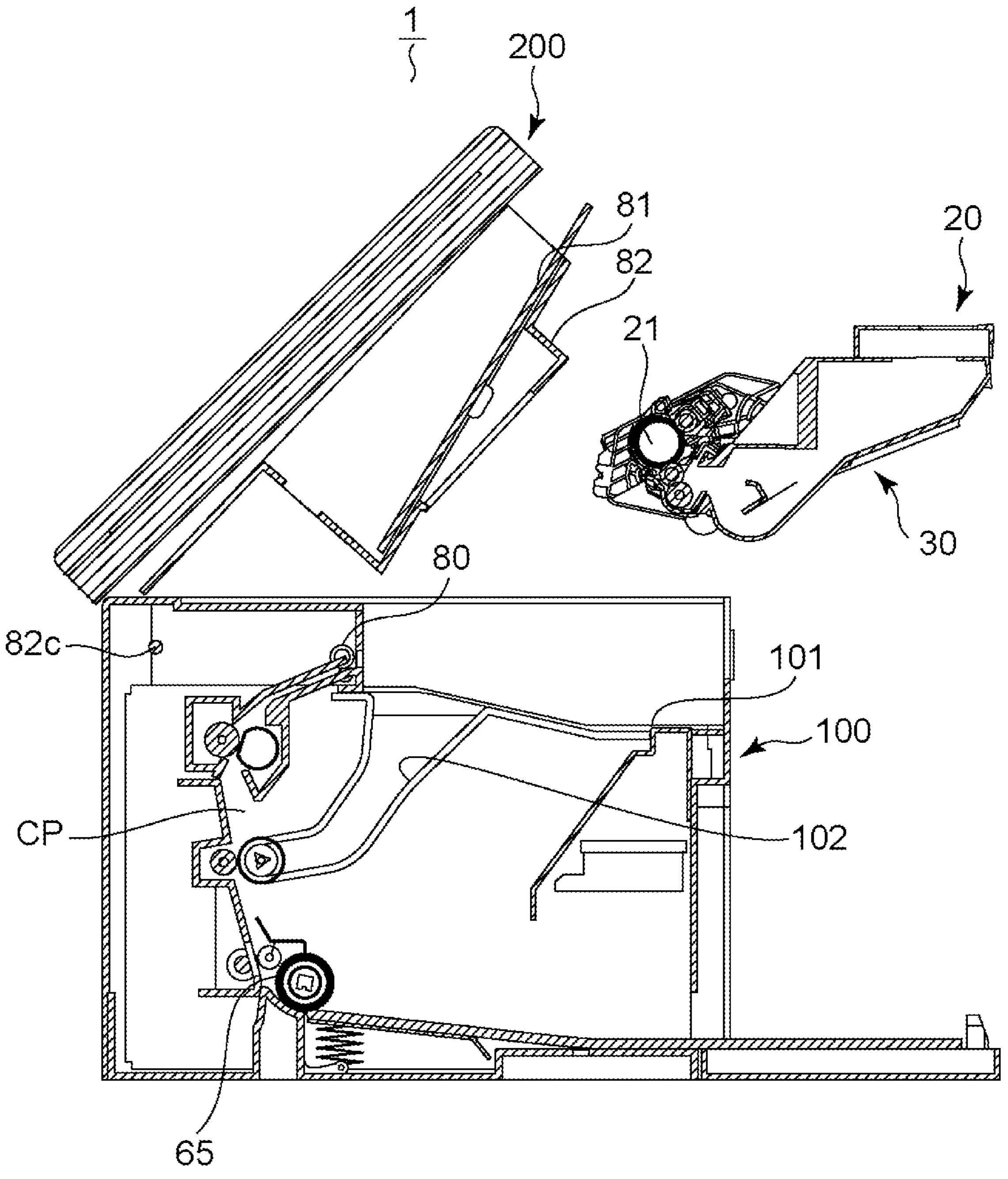
FIG. 3 is a sectional view showing the image forming apparatus in a state in which a process cartridge is dismounted.

As shown in part (b) of FIG. 2 and FIG. 3, at an upper portion of the printer main assembly 100, a first opening 101 which opened upward is formed, and the first opening 101 is covered with a top cover 82. The top cover 82 as a stacking tray is supported so as to be openable and closable relative to the printer main assembly 100, about a rotation shaft **82*e* extending in the left-right direction, and at an upper surface, the discharge 81 is formed as a stacking surface. The top cover 82 is opened from the front side toward a rear side in a state in which the reading device 200 is opened relative to the printer main assembly 100. Incidentally, the reading device 200 and the top cover 82** may also be constituted so as to be held in an opened state and a closed state by a holding mechanism such as a hinge mechanism.

For example, in the case where the recording material is jammed by paper jam or the like in a feeding (conveying) passage CP along which the recording material fed by the pick-up roller 65 passes, the user opens the top cover 82 together with the reading device 200. Then, the user has access to the process cartridge 20 from the first opening 101 exposed by opening the top cover 82, and pulls out the process cartridge 20 along a cartridge guide 102. The cartridge guide 102 slides with a projected portion **21*a* (see part (a) of FIG. 5) provided at an end portion in an axial direction of the photosensitive drum 21 of the process cartridge 20 and guides the process cartridge 20**.

Then, the process cartridge 20 is pulled out to the outside portion through the first opening 101, so that a space in which the user can put his (her) hand(s) into the feeding passage CP can be formed. The user is capable of processing (clearing) the jammed recording material by putting his (her) hand(s) from the first opening 101 into the inside of the printer main assembly 100 and by having access to the recording material jammed in the feeding passage CP.

Further, in this embodiment, as shown in part (a) of FIG. 1 and part (c) of FIG. 4, the top cover 82 is provided with an openable (and closable) member 83 so as to be openable and closable. On the discharge tray 81 of the top cover 82, a second opening **82*a* as an opening which opened upward is formed. The openable member 83 is constituted so as to be movable between a closed position where the openable member 83 covers a supply opening 32*a* so that a toner pouch 40 cannot be mounted on the developing container 32 and an openable position where the supply opening 32*a* is exposed so that the toner pouch 40 can be mounted on the developing container 32. The openable member 83 functions as a part of the discharge tray 81 in the closed position. The openable member 83 and the second opening 82*a* are formed on a left(-hand) side of the discharge tray 81. Further, the openable member 83 is supported by the top cover 82 so as to be openable and closable about a rotation shaft 83*a* extending in the front-rear direction, and is opened in a left(-hand) direction by being hooked with user's finger(s) from a groove portion 82*b* provided on the top cover 82. The openable member 83 is formed in a substantially L-shape along a shape of the top cover 82**.

The second opening **82*a* of the discharge tray 81 opens so that the supply opening 32*a* for toner supply formed at the upper portion of the developing container 32 is exposed, and the openable member 83 is opened, so that the user can access to the supply opening 32***a* without opening the top cover 82. Incidentally, in this embodiment, a type (direct supply type) in which the toner is supplied from the toner pouch 40 (parts (a) and (b) of FIG. 1) as a toner container to the developing device 30 in a state in which the developing device 30 is mounted in the image forming apparatus 1 is employed. For this reason, in the case where a remaining toner amount of the process cartridge becomes small, an operation in which the process cartridge 20 is taken out of the printer main assembly 100 and is exchanged with a new process cartridge becomes unnecessary, so that usability can be improved. Further, the toner can be supplied to the developing container 32 more inexpensively than exchange of entirety of the process cartridge 20. Incidentally, the direct supply type can be reduced in cost since there is no need to exchange various rollers and gears, and the like even when compared with the case where only the developing device 30 of the process cartridge 20 is exchanged. Incidentally, the image forming apparatus 1 and the toner pouch 40 constitute an image forming system.

[Collection of Transfer Residual Toner]

This embodiment employs a cleaner-less type in which transfer residual toner remaining on the photosensitive drum 21 without being transferred onto the recording material P is collected in the developing device 30 and is utilized again. The transfer residual toner is removed in the following step. In the transfer residual toner, toner charged to the positive polarity and toner which is charged to the negative polarity out which does not have sufficient electric charges are present in mixture. The photosensitive drum 21 after the transfer is charge-removed by the pre-exposure device 23, and the charging roller 22 is caused to generate uniform electric discharge, so that the transfer residual toner is charged again to the negative polarity. The transfer residual toner charged again to the negative polarity at the charging portion reaches a developing portion with rotation of the photosensitive drum 21. Then, a surface region of the photosensitive drum 21 passed through the charging portion is exposed to light by the scanner unit 11 while being in a state in which the transfer residual toner is deposited on the surface, so that the electrostatic latent image is written (formed).

Here, behavior of the transfer residual toner reached the developing portion will be described by dividing a portion of the photosensitive drum 21 into an exposure portion and a non-exposure portion. The transfer residual toner deposited on the non-exposure portion of the photosensitive drum 21 is transferred onto the developing roller 31 at the developing portion by a potential difference between a non-exposure portion potential (dark-portion potential) of the photosensitive drum 21 and the developing voltage, and is collected in the developing container 32. This is because the developing voltage applied to the developing roller 31 on the assumption that a normal charge polarity of the toner is negative is a positive polarity relative to the non-exposure portion potential. Incidentally, the toner collected in the developing container 32 is stirred and dispersed with the toner in the developing container by the stirring member 34, and is carried on the developing roller 31, so that the toner is used again in the developing step.

On the other hand, the transfer residual toner deposited on the exposure portion of the photosensitive drum 21 remains on the drum surface without being transferred from the photosensitive drum 21 onto the developing roller 31 at the developing portion. This is because the developing voltage applied to the developing roller 31 on the assumption that the normal charge polarity of the toner is the negative polarity becomes a further negative potential than an exposure portion potential (light-portion potential). The transfer residual toner remaining on the drum surface is carried on the photosensitive drum 21 together with another toner transferred from the developing roller 31 onto the exposure portion, and is moved to a transfer portion, so that the toner is transferred onto the recording material S at the transfer portion.

Thus, this embodiment employs the cleaner-less constitution in which the transfer residual toner is collected in the developing device 30 and is utilized again, but may also employ a conventionally well-known constitution in which the transfer residual toner is collected using a cleaning blade contacting the photosensitive drum 21. In that case, the transfer residual toner collected by the cleaning blade is collected in a collecting container provided separately from the developing device 30. However, by employing the cleaner-less constitution, a mounting space for collecting container for collecting the transfer residual toner or the like becomes unnecessary and further downsizing of the image forming apparatus 1 becomes possible, and further, it is also possible to realize printing cost reduction by re-utilizing the transfer residual toner.

[Constitution of Developing Container and Threshold]

Figure 5:
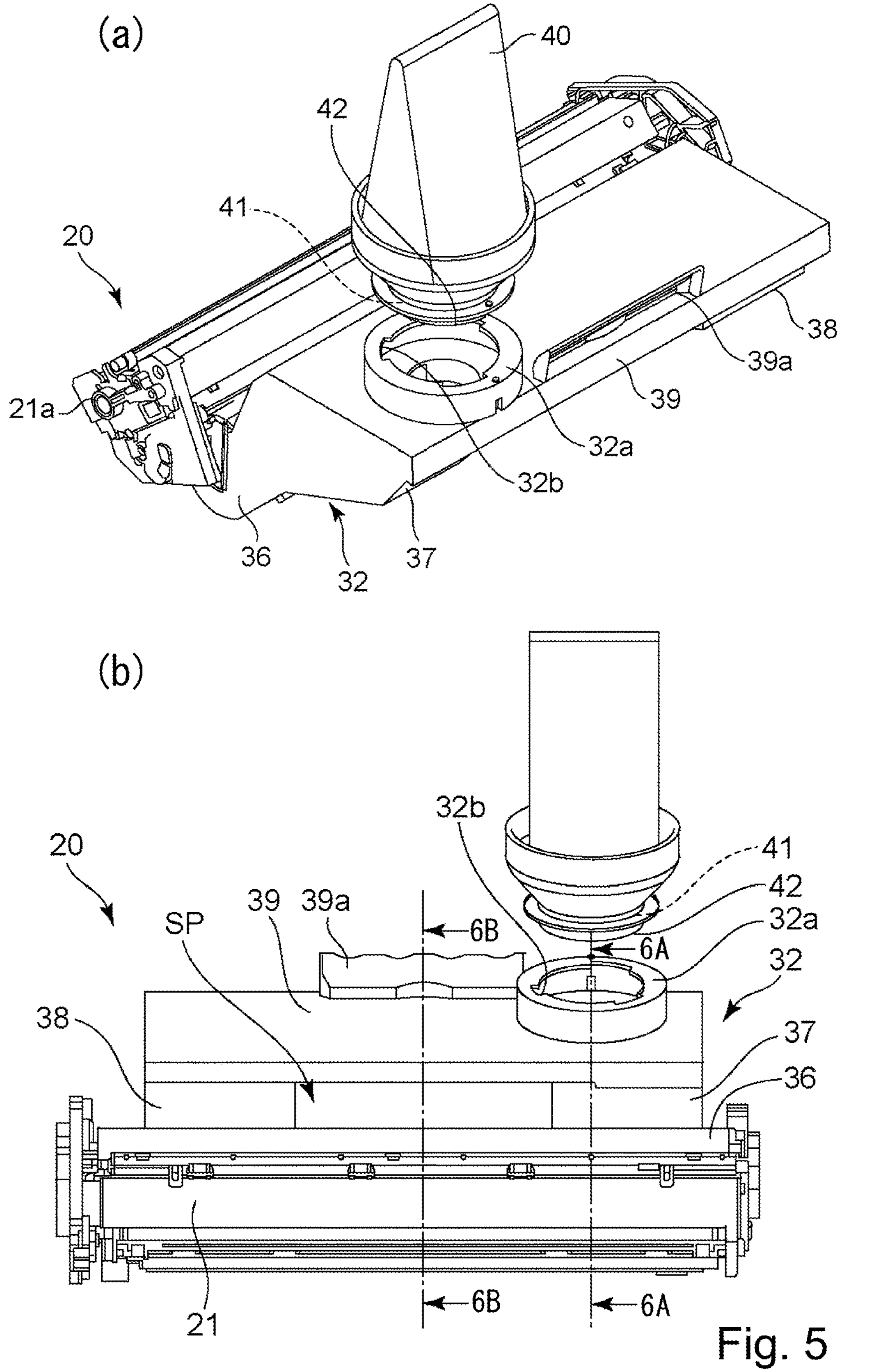
In FIG. 5, part (a) is a perspective view showing a developing container and a toner pouch, and part (b) is a front view showing the developing container and the toner pouch.

Next, constitutions of the developing container 32 and the toner pouch 40 will be described. Part (a) of FIG. 5 is a perspective view showing the developing container 32 and the toner pouch 40, and part (b) of FIG. 5 is a front view showing the developing container 32 and the toner pouch 40. Part (a) of FIG. 6 is a 6A-6A sectional view of part (b) of FIG. 5, and part (b) of FIG. 6 is a 6B-6B sectional view of part (b) of FIG. 5.

Figure 6:
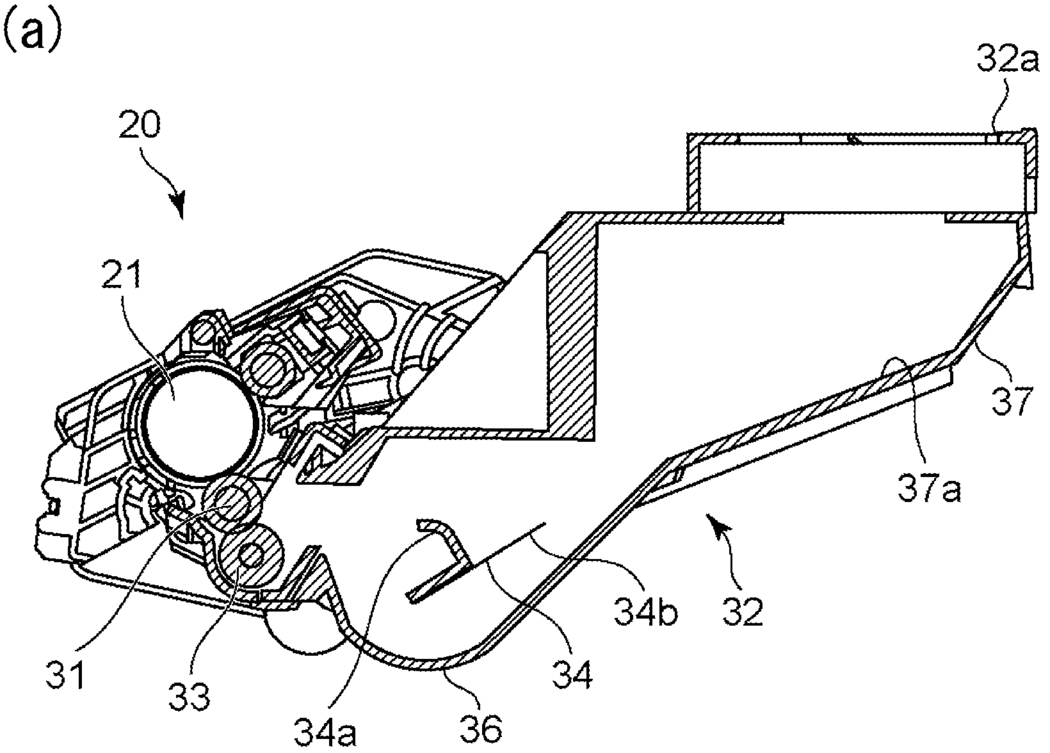
In FIG. 6, part (a) is a sectional view of 6A-6A (line) of part (b) of FIG. 5, and part (b) is a sectional view of 6B-6B (line) of part (b) of FIG. 5.
Figure 6:
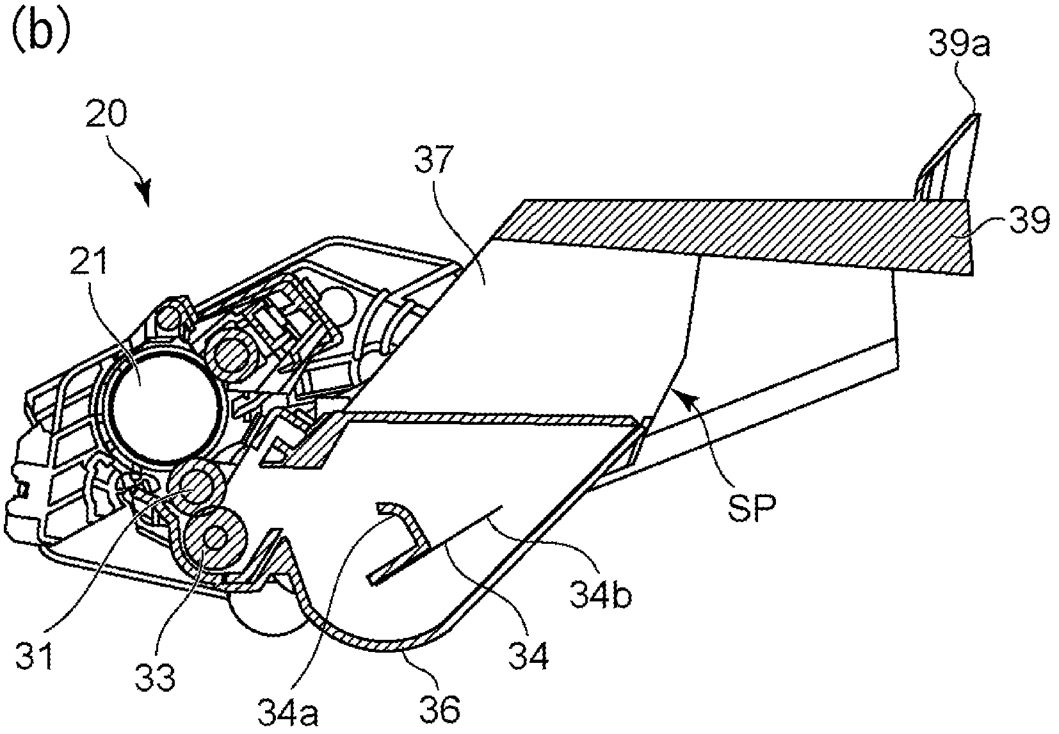

As shown in part (a) of FIG. 5 to part (b) of FIG. 6, the developing container 32 includes a stirring chamber 36 for accommodating the stirring member 34, and the stirring chamber 36 as an accommodating portion for accommodating the toner extends over a full length of the developing container 32 in a longitudinal direction (left-right direction). Further, the stirring chamber 36 not only rotatably supports the developing roller 31 and the supplying roller 33 but also accommodates the developer for being carried on the developing roller 31. Further, the developing container 32 includes a first projected portion 37 as a projected portion which projects upward from one end portion of the stirring chamber 36 in the longitudinal direction and which communicates with the stirring chamber 36, and a second projected portion 38 projecting upward from the other end portion of the stirring chamber 36 in the longitudinal direction. That is, the first projected portion 37 is provided at one end portion of the developing container 32 in the rotational axis direction of the developing roller 31 and projects toward the discharge tray 81 than a central portion projects in a crossing direction crossing the above-described rotational axis direction. The second projected portion 38 is provided at the other end portion of the developing container in the rotational axis direction of the developing roller 31 and projects toward the discharge tray 81 than the central portion projects in the crossing direction. In this embodiment, the first projected portion 37 is formed on a left side of the developing container 32, and the second projected portion 38 is formed on the right side of the developing container 32. At an upper end portion (top end portion) of the first projected portion 37, a mounting portion 57 where the toner pouch 40 is mountable is provided, and at the mounting portion 57, the supply opening 32*a* for permitting supply of the developer from the toner pouch 40 to the feeding chamber 36 is formed. To the mounting portion 57, the toner pouch 40 can be mounted in a state in which the toner pouch 40 is exposed to an outside of the apparatus.

The first projected portion 37 and the second projected portion 38 obliquely extend from the stirring chamber 36 toward the front of and above the apparatus. That is, the first projected portion 37 and the second projected portion 38 project toward a downstream in a discharge direction of the discharging roller pair 80 and upward. For this reason, the supply opening 32*a* formed at the first projected portion 37 is disposed on the front side of the image forming apparatus 1, so that a supplying operation of the toner to the developing container 32 can be easily carried out.

Particularly, in this embodiment, above the openable member 83, the reading device 200 openable (and closable) about the apparatus rear side, and therefore, a space between the supply opening 32 and the reading device 200 can be effectively utilized when the supply opening is disposed on the apparatus front side. For this reason, an operating property when the toner is supplied through the supply opening 32*a* can be improved.

An upper portion of the first projected portion 37 and an upper portion of the second projected portion 38 are connected to a gripping portion as a connecting portion. Between the gripping portion 39 and the feeding chamber 36, a laser passing space SP as a gap in which laser (light) L (see part (a) of FIG. 1) emitted from the scanner unit 11 (see part (a) of FIG. 1) toward the photosensitive drum 21 is capable of passing is formed.

The gripping portion 39 including a tab portion 39*a* capable of being gripped by the user who hooks the tab portion 39*a* with his (her) fingers, and the tab portion 39*a* is formed by being projected upward from atop surface of the gripping portion 39. The first projected portion 37 is formed in a hollow shape at an inner portion thereof, and on an upper surface, the supply opening 32*a* is formed. The supply opening 32*a* is constituted so as to be connectable to the toner pouch 40.

The first projected portion 37 where the supply opening 32*a* is formed at the top end portion is provided on one end side in the longitudinal direction of the developing container 32, so that itis possible to ensure the laser passing space SP through which the laser (light) L emitted from the scanner unit 11 is capable of passing, and the image forming apparatus 1 can be downsized. Further, the second projected portion 38 is provided on the other side in the longitudinal direction of the developing container 32, and the gripping portion 39 for connecting the first projected portion 37 and the second projected portion 38, so that usability when the process cartridge 20 is taken out of the printer main assembly 100 can be improved. Incidentally, the second projected portion 38 may also be formed in a hollow shape similarly as the first projected portion 37, and may have a solid shape.

The toner pouch 40 is constituted so as to be mountable to and dismountable from the mounting portion 57 of the first projected portion 37. Further, the toner pouch 40 includes a second shutter 41 which is provided at an opening and which is openable and closable, and a plurality (three in this embodiment) of projections 42 formed corresponding to a plurality (three in this embodiment) of grooves 32*b* formed at the mounting portion 57. In the case where the user supplies the toner to the developing container 32, the user performs alignment so that the projections 42 of the toner pouch 40 pass through the grooves 32*b* of the mounting portion 57, so that the user connects the toner pouch 40 with the mounting portion 57. Then, when the toner pouch 40 is rotated 180 degrees in this state, the second shutter 41 of the toner pouch 40 is abutted against an unshown abutting portion of the mounting portion 57 and is rotated relative to the toner pouch 40, so that the second shutter 41 is opened. By this, the toner accommodated in the toner pouch 40 leaks down from the toner pouch 40, and the toner which leaked down enters the first projected portion 37. Incidentally, the second shutter 41 may also be provided on the supply opening side 32*a*.

The first projected portion 37 includes an inclined surface 37*a* at a position opposing the opening of the supply opening 32*a*, and the inclined surface 37*a* is inclined downward toward the feeding chamber 36. For this reason, the toner supplied from the supply opening 32*a* is guided to the feeding chamber 36 by the inclined surface 37*a*. Further, the stirring member 34 includes a stirring shaft 34*a* extending in the longitudinal direction and a blade portion 34*b* extending toward an outside in a radial direction than the stirring shaft 34*a*.

The toner supplied from the supply opening 32*a* disposed on an upstream side in a (recording material) feeding direction of the stirring member 34 is sent toward the developing roller 31 and the supplying roller 33 with rotation of the stirring member 34. The feeding direction of the stirring member 34 is a direction parallel to the longitudinal direction of the developing container 32. The supply opening 32*a* and the first projected portion 37 are disposed at one end portion of the developing container 32 in the longitudinal direction, but the toner is spread over a full length of the developing container 32 by repeating the rotation of the stirring member 34. Incidentally, in this embodiment, the stirring member 34 is constituted by the stirring shaft 34*a* and the blade portion 34*b*, but as a constitution for spreading the toner over the full length of the developing container 32, a helical-shaped stirring shaft may also be used.

Figure 7:
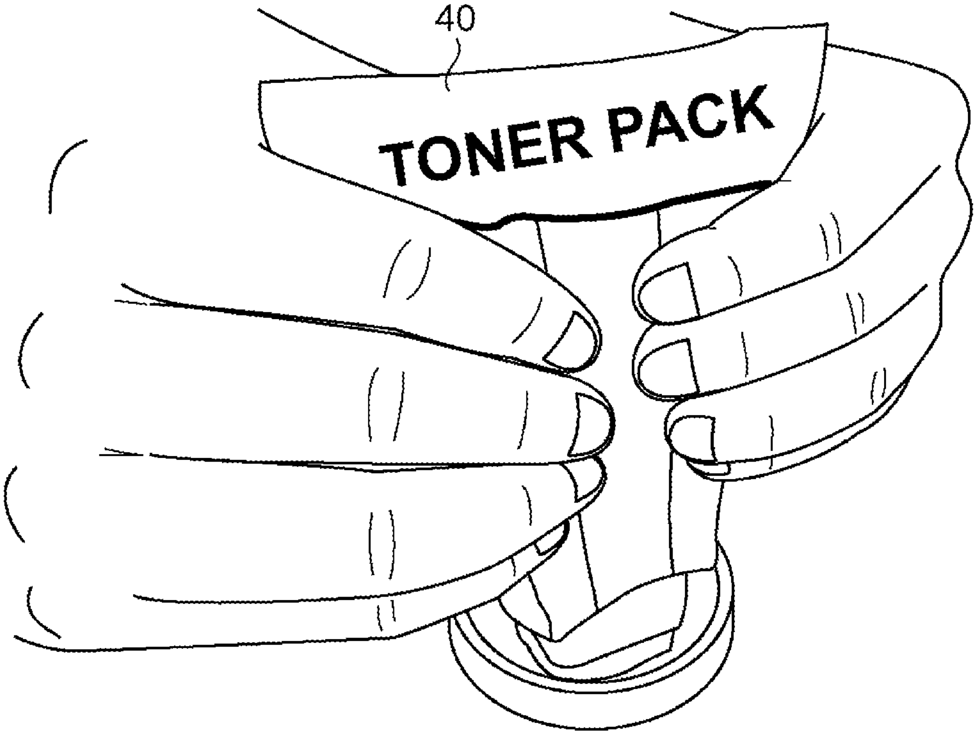
FIG. 7 is a perspective view showing the toner pouch.
Figure 8:
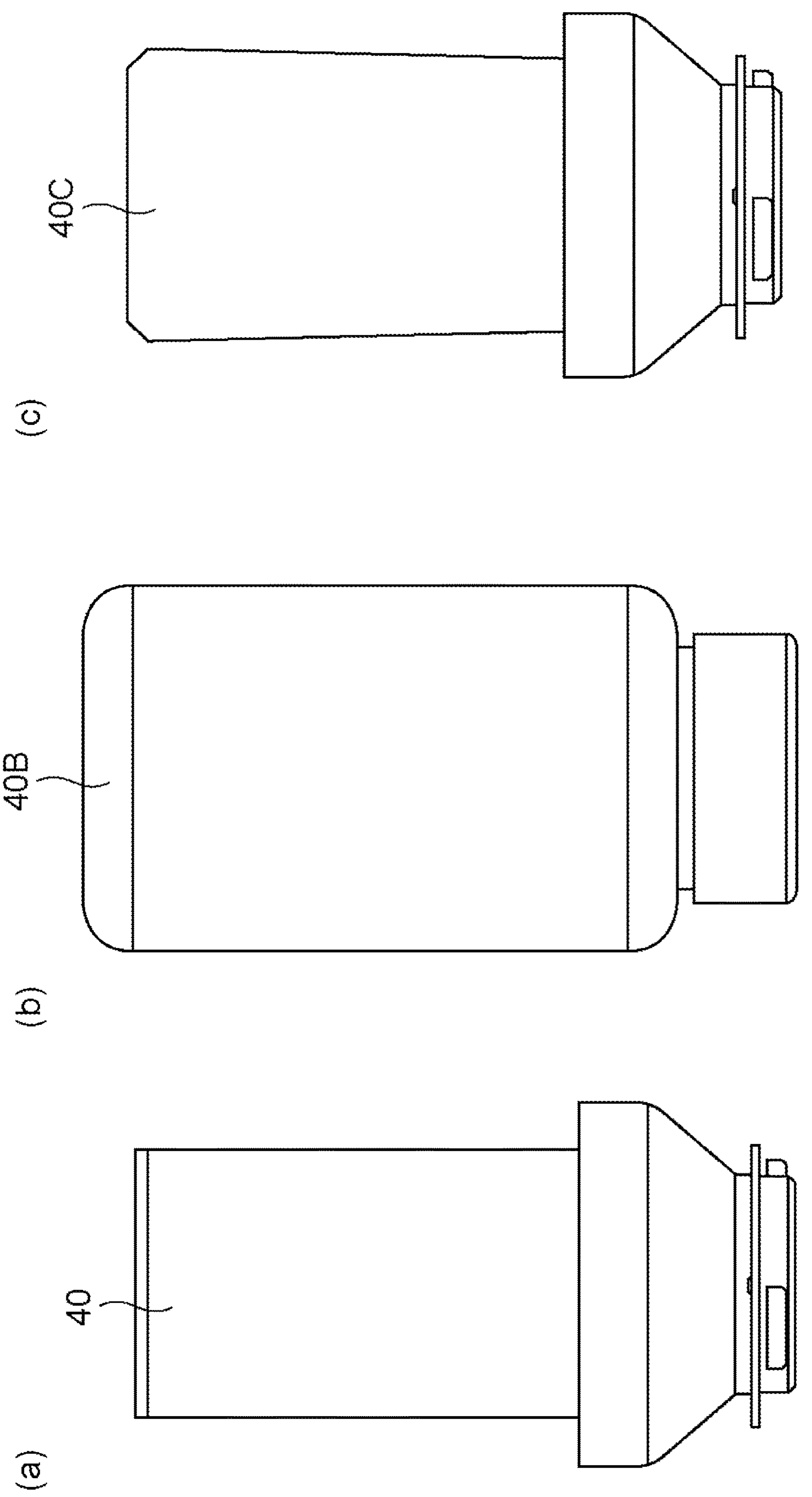
In FIG. 8, part (a) is a front view showing the toner pouch, part (b) is a front view showing a first modified example of the toner pouch, and part (c) is a front view showing a second modified example of the toner pouch.

In this embodiment, the toner pouch 40 is constituted by a deformable (flexible) bag member made of plastic as shown in FIG. 7 and part (a) of FIG. 8, but the present invention is not limited thereto. For example, the toner pouch 40 may be constituted by a substantially conical-shaped bottle container 40B as shown in part (b) of FIG. 8, and may be constituted by a paper container 40C made of paper as shown in part (c) of FIG. 8. In either case, the toner pouch may be any one in material and shape. Further, as regards a method of ejecting the toner from the toner pouch, a method such that the user squeezes the toner pouch with fingers if the toner pouch is the toner pouch 40 or the paper container 40C is suitable, and a method such that the user leaks down the toner by tapping the container or the like while vibrating the container if the toner pouch is the bottle container 4B is suitable. Further, in order to discharge the toner from the bottle container 40B, a discharging mechanism may be provided in the bottle container 40B. Further, the discharging mechanism may be a constitution for receiving a driving force from the printer main assembly 100 by engaging with the printer main assembly 100.

Further, in either toner pouch, the second shutter 41 may be omitted, or a shutter of a slide type may be applied instead of the second shutter 41. Further, the second shutter 41 may be a constitution in which the second shutter 41 is broken by mounting the toner pouch on the supply opening 32*a* or by rotating the toner pouch in a mounted state, or may be a dismountable cap structure such as a seal.

[Detecting Method of Remaining Toner Amount]

Next, a method of detecting the remaining toner amount of the developing container 32 will be described using FIG. 9 to FIG. 11. In the developing develop 30 of this embodiment, a first remaining toner amount sensor 51 and a second remaining toner amount sensor 52 which are for detecting a state depending on the remaining toner amount in the developing container 32 are provided.

The first remaining toner amount sensor 51 includes a light-emitting portion 51*a* and a light-receiving portion 51*b*, and the second remaining toner amount sensor 52 includes the light-emitting portion 52*a* and a light-receiving portion 52*b*. FIG. 10 is a circuit diagram showing an example of circuit structures of the remaining toner amount sensors 51 and 52. Incidentally, in the following description, the circuit structure of the first remaining toner amount sensor 51 is described, and description of the circuit structure of the second remaining toner amount sensor 52 will be omitted.

Figure 10:
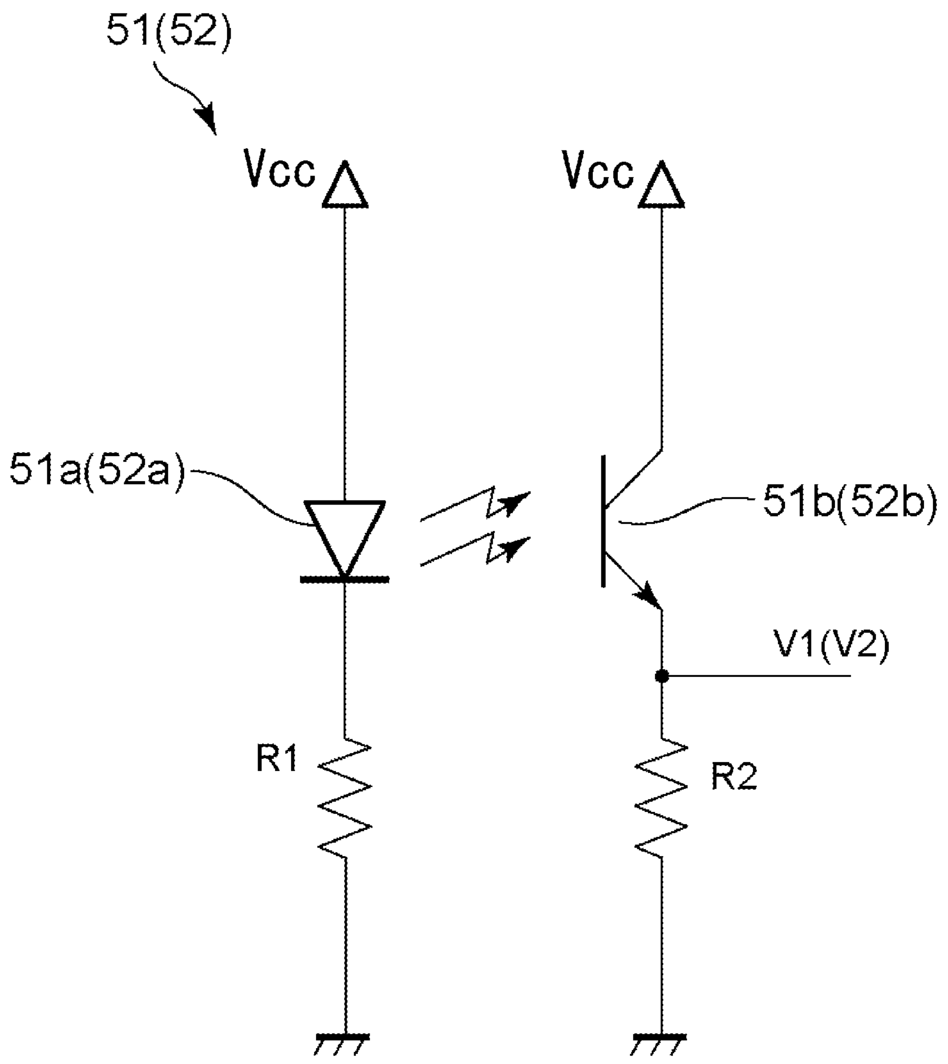
FIG. 10 is a circuit diagram showing the first and second remaining toner amount sensors.
Figure 11:
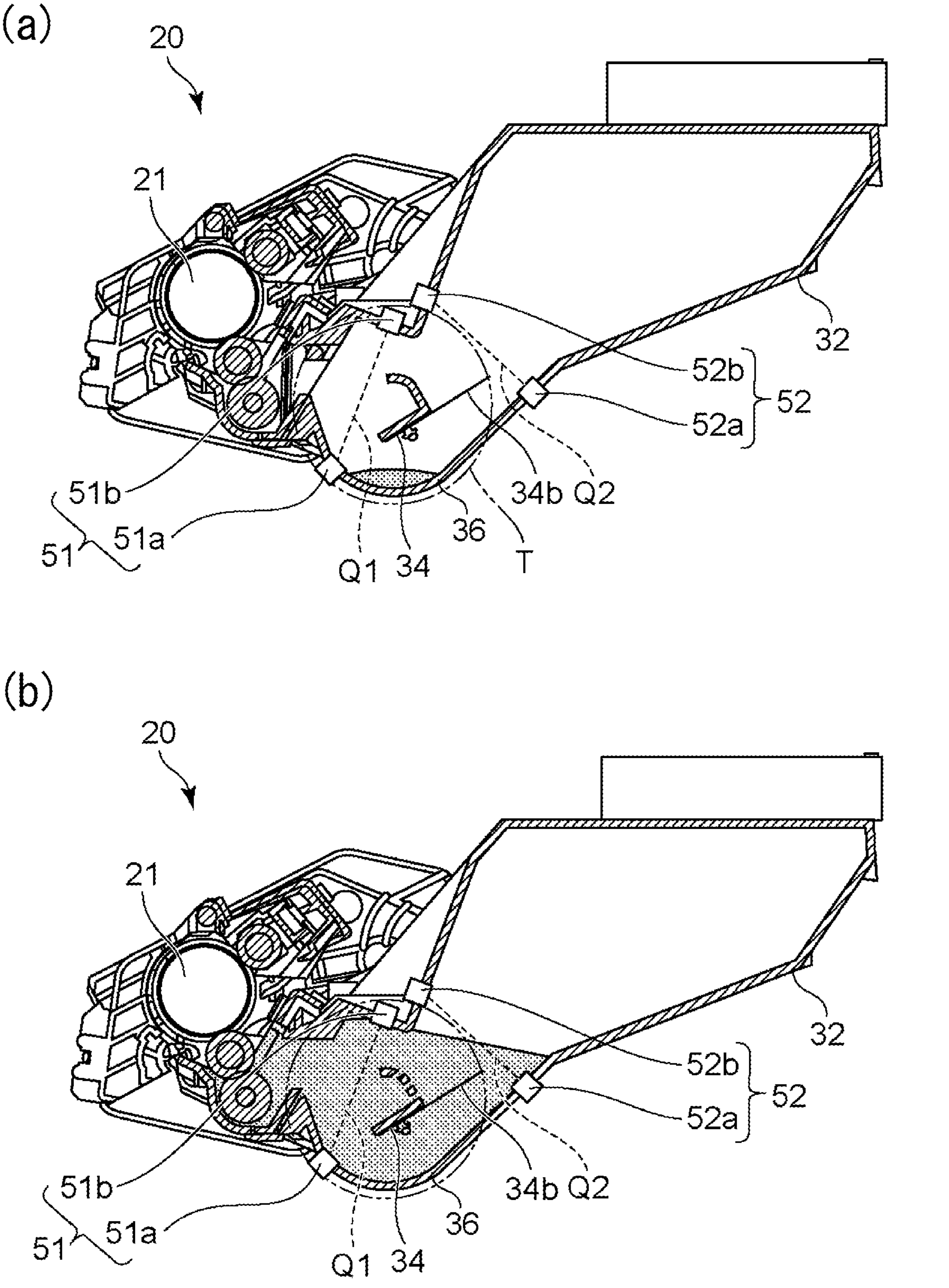
In FIG. 11, part (a) is a sectional view showing a state in which a remaining toner amount is small, and part (b) is a sectional view showing a state in which the remaining toner amount is large.

In FIG. 10, an LED is used as the light-emitting portion 51*a*, and as the light-receiving portion 51*b*, a phototransistor put in an ON state by light from the light-emitting portion 51*a* is used, but the present invention is not limited thereto. For example, a halogen lamp or a fluorescent lamp may be used as the light-emitting portion 51*a*, and a photodiode or an avalanche photodiode may be used as the light-receiving portion 51*b*. Incidentally, between the light-emitting portion 51*a* and a power source voltage (voltage source) Vcc, an unshown switch is provided, and by putting the switch in an ON state, a voltage from the power source voltage Vcc is applied to the light-emitting portion 51*a*, so that the light-emitting portion 51*a* is in a conduction state. On the other hand, the light-receiving portion 51*b* is also provided with an unshown switch between itself and a power source voltage (voltage source) Vcc, and by putting the switch in an ON state, the light-receiving portion 51*b* is in a conduction state by a current depending on a light quantity detected.

To the light-emitting portion 51*a*, the power source voltage Vcc and a current-limiting resistor R1 are connected, and the light-emitting portion 51*a* emits light by a current determined by the current-limiting resistor R1. The light emitted from the light-emitting portion 51*a* passes through an optical path Q1 and is received by the light-receiving portion 51*b* as shown in FIG. 9. To a collector terminal of the light-receiving portion 51*b*, the power source voltage Vcc is connected, and to an emitter terminal, a detection resistor R2 is connected. The light-receiving portion 51*b* which is the phototransistor receives the light emitted from the light-emitting portion 51*a* and outputs a signal (current) depending on a quantity of the received light. This signal is converted into a voltage V1 by the detection resistor R2 and is inputted to an A/D converting portion 95 of a controller 90 (see FIG. 12). Incidentally, the light-receiving portion 52*b* of the second remaining toner amount sensor 52 receives light which is emitted from the light-emitting portion 52*a* and which passes through an optical path Q2, and a voltage V2 is outputted depending on a quantity of the received light and is inputted to the A/D converting portion 95 of the controller 90.

The controller 90 (CPU 91) discriminates, on the basis of an inputted voltage level, whether or not the light-emitting portions 51*b* and 52*b* receive the light from the light-emitting portions 51*a* and 51*b*. The controller 90 (CPU 91) calculates a toner amount in the developing container 32 on the basis of a length of a time in which each light is detected by the light-receiving portion 51*b* or 52*b* and perspective viewed light intensity when the toner in the developing container 32 is stirred for a certain time by the stirring member 34. That is, a ROM 93 stores, in advance, a table capable of outputting a remaining toner amount from a light receiving time and the light intensity when the toner is fed by the stirring member 34, and the controller 90 predicts/calculates the remaining toner amount on the basis of an input to the A/D converting portion 95 and the table.

More specifically, the optical path Q1 of the first remaining toner amount sensor 51 is set so as to cross a rotation locus T of the stirring member 34. Further, a time in which the optical path Q1 is light-blocked by the toner raised by the stirring member 34 when the stirring member 34 rotates once, i.e., a time in which the light-receiving portion 51*b* does not detect the light from the light-emitting portion 51*a* changes depending on the remaining toner amount. Further, the received light intensity at the light-receiving portion 51*b* also changes depending on the remaining toner amount.

That is, the optical path Q1 is liable to be blocked by the toner when the remaining toner amount is large, and therefore, a time in which the light-receiving portion 51*b* receives the light becomes short, and the received light intensity of the light received by the light-receiving portion 51*b* becomes small. On the other hand, the time in which the light-receiving portion 51*b* receives the light contrarily becomes long when the remaining toner amount is small, and the received light intensity of the light received by the light-receiving portion 51*b* becomes strong. Accordingly, the controller 90 is capable of discriminating whether or not thus on the basis of the light receiving time and the received light intensity of the light-receiving portion 51*b*, the remaining toner amount is at a Low level or at a Mid level as described later. For example, as shown in part (a) of FIG. 11, in the case where the toner in the feeding chamber 36 of the developing container 32 is in a slight amount, the remaining toner amount is discriminated as a Low level. Incidentally, in the above-described explanation, the second remaining toner amount sensor 52 is disposed so as not to cross the rotation locus T of the stirring member 34, but similarly as the above-described first remaining toner amount sensor 51, the second remaining toner amount sensor 52 may also be disposed so as to cross the rotation locus T of the stirring member 34.

Further, the optical path Q2 of the second remaining toner amount sensor 52 is set above the rotation locus T so as not to cross the rotation locus T of the stirring member 34. Further, the light-receiving portion 52*b* of the second remaining toner amount sensor 52 does not detect the light from the light-emitting portion 52*a* in the case where the optical path Q2 is light-blocked by the toner and detects the light from the light-emitting portion 52*a* in the case where the optical path Q2 is not light-blocked by the toner. Accordingly, irrespective of a rotation operation of the stirring member 34, on the basis of whether or not the light-receiving portion 52*b* receives the light, the controller 90 discriminates whether or not the remaining toner amount is at a Full level as described later. For example, as shown in part (b) of FIG. 11, the toner in the feeding chamber 36 of the developing container 32 is in a large amount, the remaining toner amount is discriminated as the Full level. Incidentally, in the above-described explanation, the second remaining toner amount sensor 52 is disposed so as not to cross the rotation locus T of the stirring member 34, but similarly as the above-described first remaining toner amount sensor 51, the second remaining toner amount sensor 52 may also be disposed so as to cross the rotation locus T of the stirring member 34.

Figure 9:
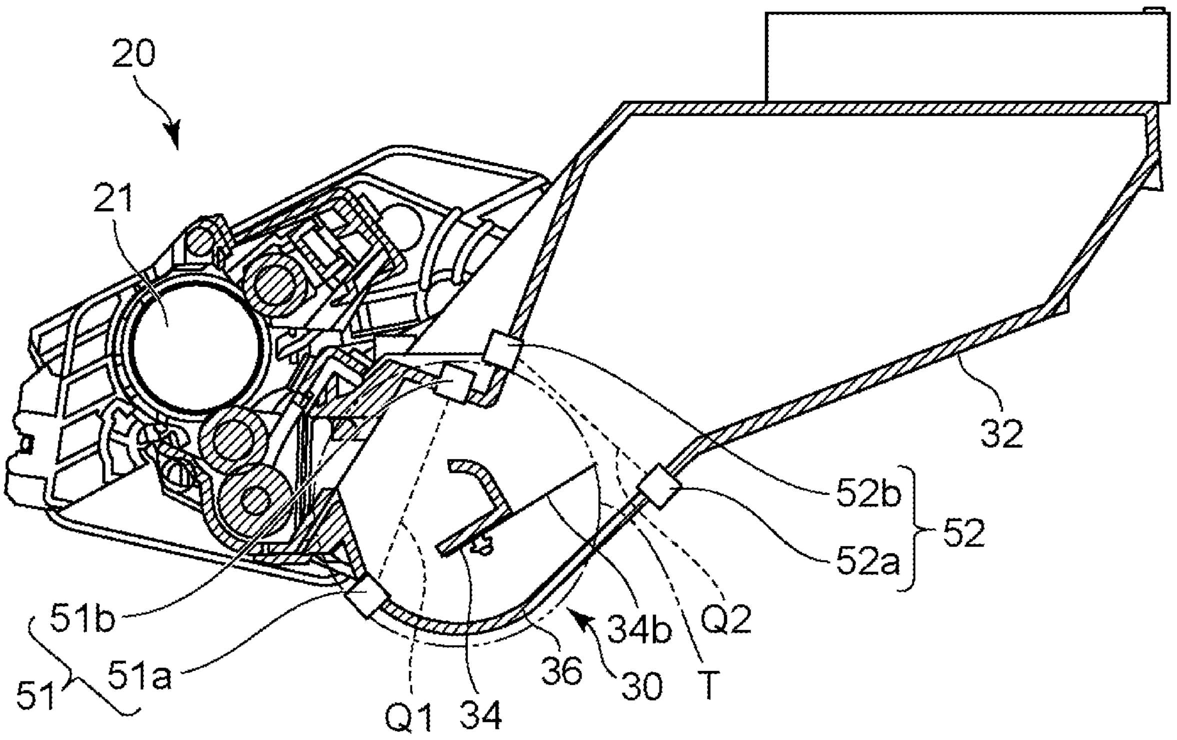
FIG. 9 is a sectional view showing first and second remaining toner amount sensors.

Incidentally, a detecting/estimating method of the remaining toner amount is not limited to a method (type) of an optical remaining toner amount detection described in FIG. 9, but remaining toner amount detecting/estimating methods of various well-known types can be employed. For example, two or more metal plates or electroconductive resin sheets which extending in the developing roller longitudinal direction are disposed on an inner wall of the developing container 32 which is a frame, and electrostatic capacity between the two metal plates or electroconductive resin sheets is measured, and the remaining toner amount may be detected/estimated. Or, a load cell is provided in a form such that the load cell supports the developing device 30 from below, and the CPU 51 subtracts a weight of the developing device 30 in the case where the toner is empty, from a weight measured by the load cell, so that the remaining toner amount may be calculated. Further, the first remaining toner amount sensor 51 is omitted, and from a detection result of the second remaining toner amount sensor 52 and a light emission status of the laser light, the controller 90 (CPU 91) may calculate the remaining toner amount.

[Control System of Image Forming Apparatus]

Figure 12:
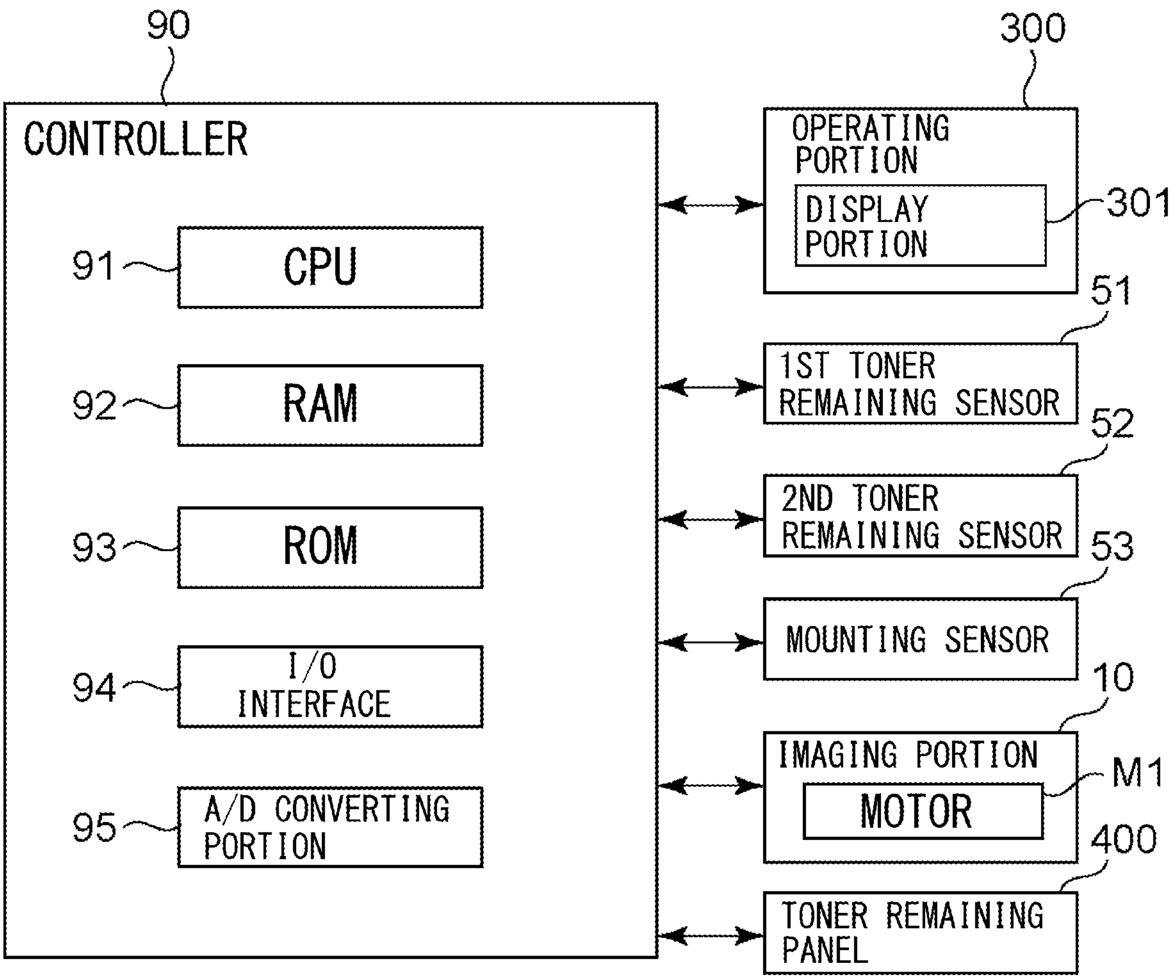
FIG. 12 is a block diagram showing a control system of the image forming apparatus.

FIG. 12 is a block diagram showing a control system of the image forming apparatus 1. The controller 90 as a control means of the image forming apparatus 1 includes the CPU 91 as a calculating device, a RAM 92 used as an operation area of the CPU 91, and the ROM 93 for storing various programs. Further, the controller 90 includes an I/O interface 94 as an input/output port through which the controller 90 is connected to an external device, and an A/D converting portion 95 for converting an analog signal into a digital signal.

To an input side of the controller 90, the first remaining toner amount sensor 51, the second remaining toner amount sensor 52, a mounting sensor 53, and an open/close sensor 54 are connected, and the mounting sensor 53 detects that the toner pouch 40 is mounted on the supply opening 32*a*. For example, the mounting sensor 53 is provided at the supply opening 32*a* and is constituted by a pressure-sensitive switch for outputting a detection signal by being pressed by the projections 42 of the toner pouch 40. Further, the open/close sensor 54 detects whether or not the openable member 83 is opened relative to the top cover 82. The open/close sensor 54 is constituted by, for example, a pressure-sensitive switch or a magnetic sensor.

Further, to the controller 90, the operating portion 300, the image forming portion 10, and a remaining toner amount panel 400 as a notifying means capable of notifying information on the remaining toner amount are connected, and the operating portion 300 includes a display portion 301 capable of displaying various setting screens, and physical keys and the like. The display portion 301 is constituted by a liquid crystal panel, for example. The image forming portion 10 includes a motor M for driving the photosensitive drum 21, the developing roller 31, the supplying roller 33, the stirring member 34, and the like. Incidentally, a constitution in which the photosensitive drum 21, the developing roller 31, the supplying roller 33, and the stirring member 34 are driven by separate motors may also be employed.

Figure 17:
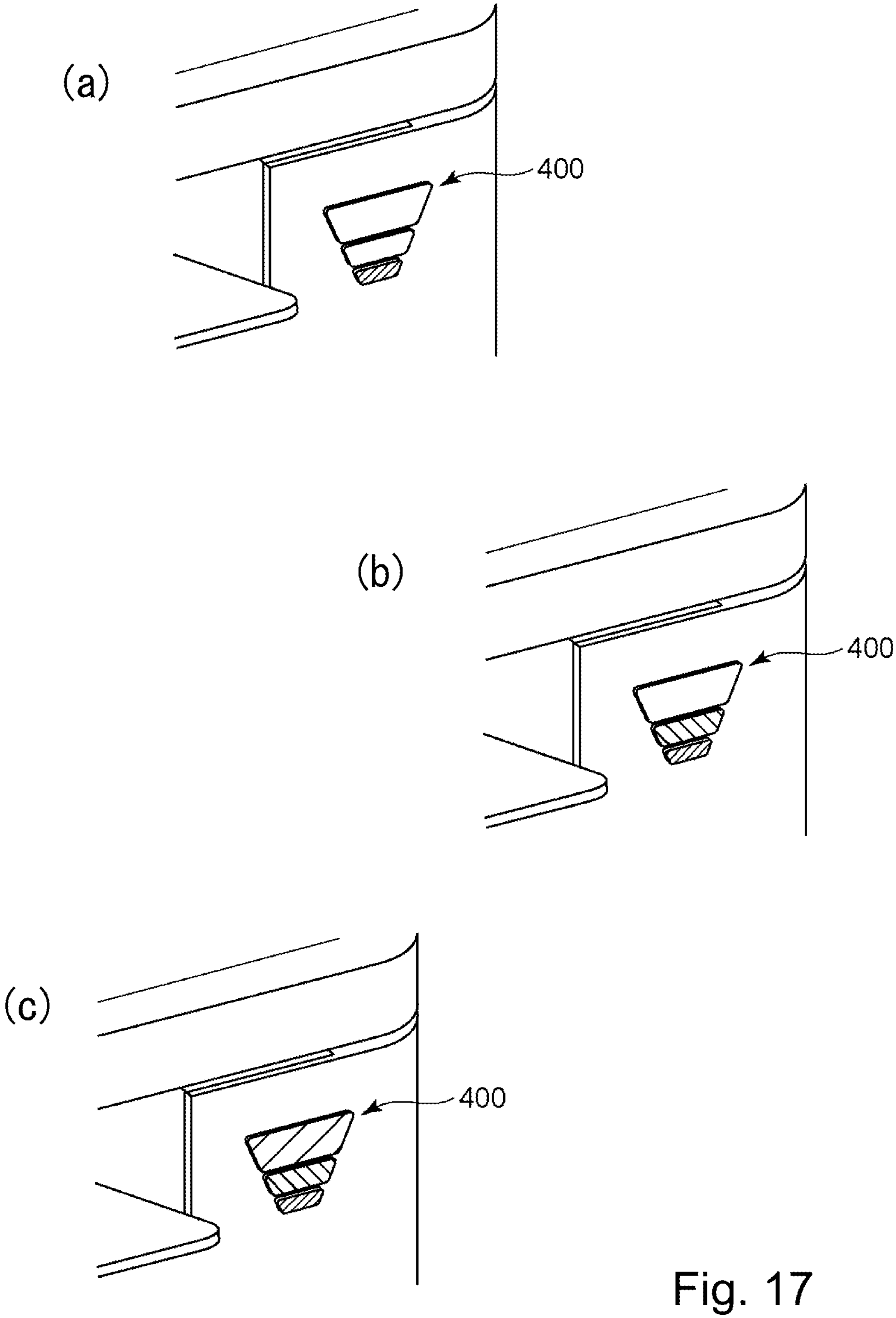
In FIG. 17, part (a) is a perspective view showing a remaining toner amount panel when the remaining toner amount is at a Low level, part (b) is a perspective view showing the remaining toner amount panel when the remaining toner amount is at a Mid level, and part (c) is a perspective view showing the remaining toner amount panel when the remaining toner amount is at a Full level.

The remaining toner amount panel 400 is provided on a right side of a front surface of a casing of the printer main assembly 100, i.e., on a side opposite from the operating portion 300 disposed on a left side, and displays information on the remaining toner amount in the developing container 32 as shown in part (b) of FIG. 1 and FIG. 17. In this embodiment, the remaining toner amount panel 400 is a panel member consisting of a plurality (three in this embodiment) of scales arranged vertically in parallel, and the respective scales correspond to the Low level, the Mid level, and the Full level, which are described above.

That is, as shown in part (a) of FIG. 17, in the case where only a lower scale is lighted, the remaining toner amount of the developing container 32 indicates the Low level as a third state. As shown in part (b) of FIG. 17, in the case where lower and central scales are lighted and an upper scale is turned off, the remaining toner amount of the developing container 32 indicates the Mid level as a second state. As shown in part (c) of FIG. 17, all the three scales are lighted, the remaining toner amount of the developing container 32 indicates the Full level as a first state. Incidentally, the remaining toner amount panel 400 is not limited to the liquid crystal panel, but may also be constituted by a light source such as an LED or an incandescent lamp and by a diffusion lens. Incidentally, in examples shown in FIG. 17, the remaining toner amount panel 400 was described as the notifying means showing the remaining toner amount, but the present invention is not limited thereto. For example, the display of part of FIG. 17 may be changed to a display indicating that toner supply is needed, the display of part (b) of FIG. 17 is changed to a display that the toner supply is not required, and the display of part (c) of FIG. 17 may be changed to a display indicating that the toner supply was sufficiently carried out.

[Toner Supplying Process]

Figure 13:
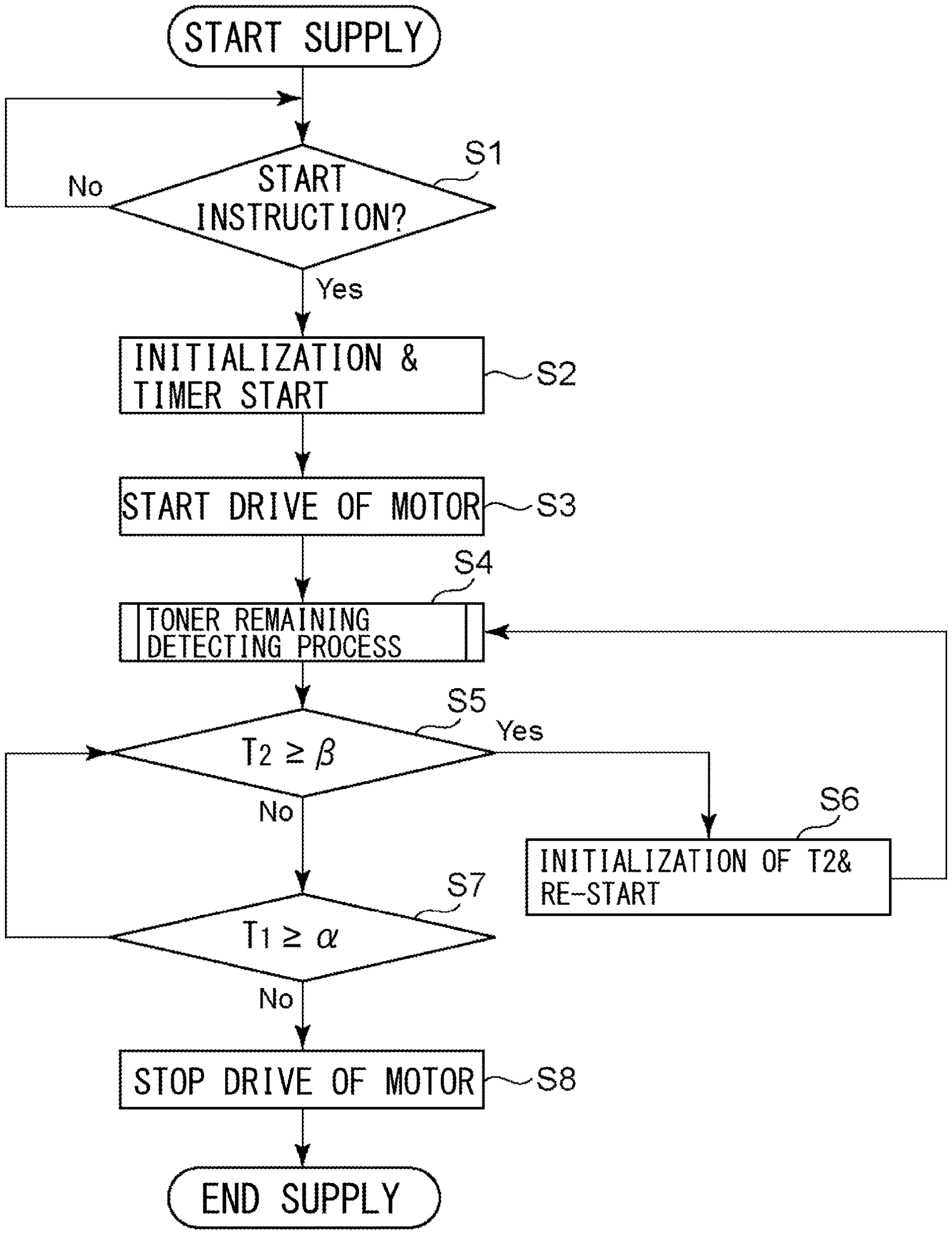
FIG. 13 is a flowchart showing a toner supplying process.
Figure 15:
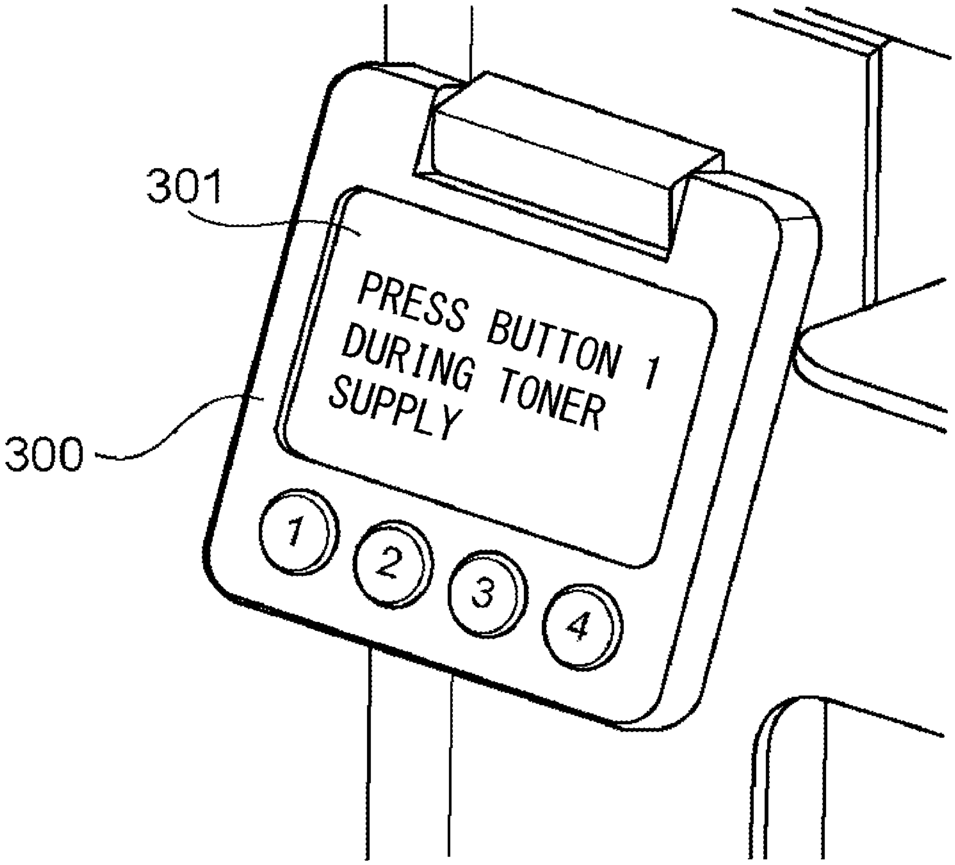
FIG. 15 is a perspective view showing an operating portion.

Next, a toner supplying process for supplying the toner in the toner pouch 40 to the developing container 32 will be described. As shown in FIG. 13, when the toner supplying process is started, the controller 90 discriminates whether or not a supplying operation start instruction was provided (step S1). In this embodiment, the supplying operation start instruction is an operation of the user through the operating portion 30 as shown in FIG. 15. Specifically, the user operates the operating portion 300 and performs a pushing operation of a button 1 in a state in which a message of prompting the user to perform the operation of the button 1 is displayed at the display portion 301, so that the supplying operation start instruction is outputted.

Incidentally, at this time, the toner pouch 40 is in a state in which the toner pouch 40 is mounted the supply opening 32*a* of the developing container 32, and therefore, the openable member 83 is in an openable state. The operating portion 300 and the supply opening 32*a* are both disposed on the right side of the apparatus, and therefore, the user is capable of easily performing the toner supplying operation using the toner pouch 40 while performing an operation of the operating portion 300. Further, when the open/close sensor 54 detects that the openable member 83 is opened, the controller 90 prohibits and stops the image forming operation by the image forming apparatus 1. For this reason, in a state in which, the openable member 83 is opened, the respective feeding rollers, the photosensitive drum 21, and the scanner unit 11 and the like of the image forming apparatus 1 are at rest.

Incidentally, the supplying operation start instruction is not limited to the pressing operation of the button 1, but the supplying operation start instruction may also be outputted by a touch operation in the display portion 301 or in response to detection of mounting of the toner pouch 40 on the supply opening 32*a* by the mounting sensor 53. Further, a sensor for detecting opening of the second shutter 41 of the toner pouch 40 is provided, and the supplying operation start instruction may be outputted on the basis of a detection result of this sensor. Further, the supplying operation start instruction may also be outputted on the basis of detection of an opening operation of the openable member by the open/close sensor 54. Further, when the openable member 83 is opened, a constitution in which the voltage source of the high voltage applied to the process cartridge 20 is turned off, and in which only the motor M1 for driving the stirring member 34 is capable of being driven may be employed.

In the case where discrimination that the supplying operation start instruction was provided (step S1: Yes), the controller 90 initializes parameters of timers T1 and T2 described later to initial values (for example, zero) and causes the timers T1 and T2 to start (step S2). Further, the controller 90 causes the motor M1 to drive (step S3), so that the stirring member 34 is rotated.

Figure 14:
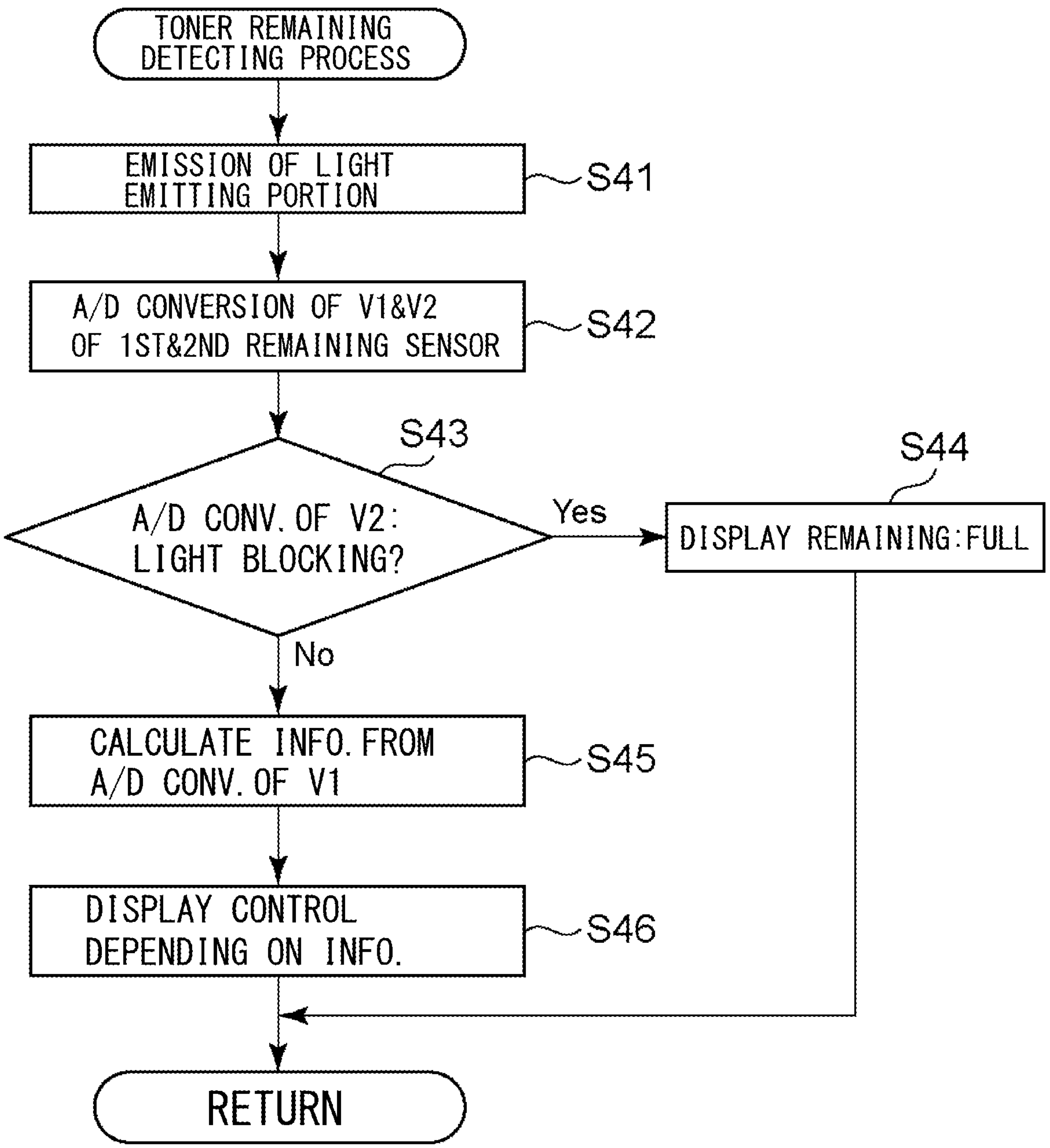
FIG. 14 is a flowchart showing a remaining toner amount detecting process.

When the remaining toner amount detecting process is executed, as shown in FIG. 14, the controller 90 causes the light-emitting portions 51*a* and 52*a* of the first remaining toner amount sensor 51 and the second remaining toner amount sensor 52 to emit light (step S41). Then, the controller 90 causes the A/D converting portion 95 to convert the voltages V1 and V2, outputted by the light-emitting portions 51*a* and 52*a* of the first remaining toner amount sensor 51 and the second remaining toner amount sensor 52, respectively, into digital signals (hereinafter, referred to as A/D converted values) (step S42).

Next, the controller 90 discriminates whether or not the A/D converted value of the voltage V2 indicates light-blocking of the optical path Q2 (step S43). In the case where the value indicates that the optical path Q2 is light-blocked (step S43: Yes), the controller 90 causes the remaining toner amount panel 400 to display that the remaining toner amount is at the Full level (step S44). That is, as shown in part (c) of FIG. 17, all the three scales of the remaining toner amount panel 400 are lighted.

In the case where the A/D converted value of the voltage V2 does not indicate that the optical path Q2 is light-blocked (step S43: No), the controller 90 calculates remaining amount information on the toner in the developing container 32 on the basis of the A/D converted value of the voltage V1 (step S45). Then, on the basis of the calculated remaining amount information on the toner, the controller 90 causes the remaining toner amount panel 400 to display that the remaining toner amount is at the Low level or at the Mid level (step S46). When the step S44 or the step S46 is completed, the remaining toner amount detecting process is ended. That is, the first remaining toner amount sensor 51 and the second remaining toner amount sensor 52 which are as detecting means output the remaining amount information depending on a developer amount accommodated in the developing container 32 during the operation of the stirring member 34.

Next, the controller 90 discriminates whether or not the timer T2 is a threshold β or more as shown in FIG. 13 (step S5). The threshold β is a preset value and corresponds to an interval in which the remaining toner amount detecting process is repetitively executed. Incidentally, α>β holds. In the case where the timer T2 is the threshold β or more (step S5: Yes), the controller 90 initializes the timer T2 and restarts the times T2 (step S6), and the process is returned to the step S4. That is, the remaining toner amount detecting process (step S4) is repetitively performed every time when the timer T2 becomes the threshold β. For example, in the case where the threshold β is set at 1 sec, in the steps S4, S5 and S6, the remaining toner amount detecting process is repetitively performed every 1 sec.

Further, in the case where the timer T2 is less than the threshold β (step S5: No), the controller 90 discriminates whether or not the timer T1 is a threshold α or more (step S7). The threshold α is a preset value and corresponds to a driving time of the motor M1 and the stirring member 34 in the toner supplying operation. In the case where the timer T1 is less than the threshold α (step S7: No), the process is returned to the step S5. In the case where the timer T1 is the threshold α or more (step S7: Yes), the controller 90 stops the drive of the motor M1 (step S8), so that the toner supplying operation is ended. For example, in the case where the threshold α is set at 10 sec, a time from the start of the drive of the motor M1 in the step S3 until the drive of the motor M1 is stopped in the step S8 is 10 sec.

Figure 16:
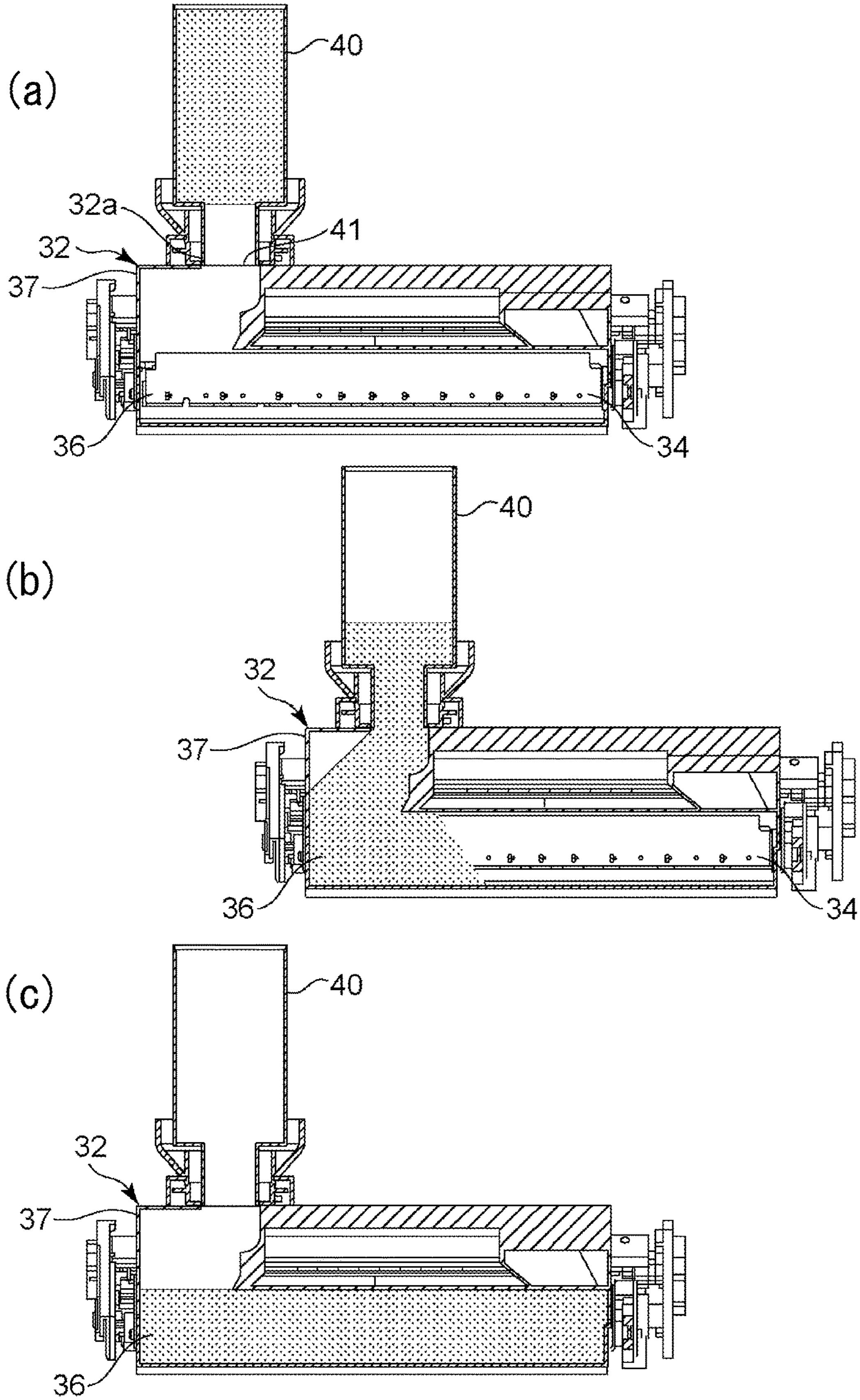
In FIG. 16, part (a) is a sectional view showing a state in which the toner pouch is mounted on a supply opening, part (b) is a sectional view showing a state in which toner started to drop from the toner pouch, and part (c) is a sectional view showing a state in which the toner in the toner pouch is all supplied to the developing container.

In the above-described toner supplying process, when the toner falls from the toner pouch 40 into the developing container 32 as shown in part (a) of FIG. 16, the toner passes through the first projected portions 37 and enters the feeding chamber 36. The supply opening 32*a* and the first projected portions 37 are disposed at one end portion of the developing container 32 in the longitudinal direction, and therefore, into the feeding chamber 36, the toner is supplied collectively toward the one end portion side.

Here, the case where the stirring member 34 is not rotated when the toner is supplied to the feeding chamber 36 will be considered. In the case where the toner is dropped from the toner pouch 40 into the developing container 32, when the stirring member 34 is not rotated in the feeding chamber 36 for accommodating the toner, it takes time that the dropped toner spreads over an entire region with respect to the longitudinal direction of the photosensitive drum 21. When this time becomes long, a time is required until the user who performs the toner supplying operation confirms that the toner was supplied into the feeding chamber 36, so that usability is lowered.

Therefore, in this embodiment, the stirring member 34 is driven for a predetermined time (threshold α) from the time of the start of the (toner) supply in the toner supplying process. By this, as shown in parts (b) and (c) of FIG. 16, the toner supplied from the toner pouch 40 to one end portion of the developing container 32 is early levelled off over a full length in the longitudinal direction of the feeding chamber 36 of the developing container 32 by the stirring member 34. For this reason, the time until the user confirms that the toner supply was carried out is shortened, so that the usability can be improved. Further, the toner accommodated in the developing container 32 is leveled off, so that detection accuracy of the remaining amount information of the toner by the first remaining toner amount sensor 51 and the second remaining toner amount sensor 52 can be improved.

Further, during the toner supplying process, the remaining amount information of the toner in the developing container 32 is detected by the first remaining toner amount sensor 51 and the second remaining toner amount sensor 52 for each predetermined time (threshold β). For example, as shown in part (a) of FIG. 17, in a state in which the remaining toner amount panel 400 displays that the remaining toner amount is at the Low level, the user supplies the toner from the toner pouch 40 to the developing container 32.

Then, the remaining toner amount panel 400 displays that the remaining toner amount is at the Mid level as shown in part (b) of FIG. 17, and thereafter displays that the remaining toner amount is at the Full level as shown in part (c) of FIG. 17. By this, the user can reliably recognize that the toner was supplied from the toner pouch 40 to the developing container 32, so that the usability can be improved.

Here, the sectional views of parts (a) to (c) of FIG. 16 show the 16A-16A cross section of FIG. 6. In parts (a) and (b) of FIG. 16, arrangement of the light-emitting portion 51*a* at a right end with respect to the longitudinal direction of the photosensitive drum 21 is shown. The light-receiving portion 51*b*, the light-emitting portion 52*a*, and the light-receiving portion 52*b* are also disposed at the same/substantially same longitudinal positions of the photosensitive drum 21. Due to restriction of sensor arrangement in the apparatus main assembly, there is a case that the arrangement of the sensors is made as shown in parts (a) and (b) of FIG. 16.

Also, in such a case, by the rotation of the stirring member 34 during the toner supply, improvement is usability as described above is improved.

Further, depending on the case, the sensors are disposed in the vicinity just under the supply opening 32*a* in some instances. In such a case, as shown in part (b) of FIG. 16, the supplied toner is localized on the left side, and it takes time until the toner surface is leveled off in the entire longitudinal region of the photosensitive drum 21 in some instances. In order to detect an accurate toner supply state, there is a need that the toner surface is leveled off in the entire longitudinal region of the photosensitive drum 21. However, even in such a case, in this embodiment, by the rotation of the stirring member 34 during the toner supply, the toner surface is leveled off in a short time in the entire longitudinal region of the photosensitive drum 21.

[Relationship Between Amount of Toner Charged in Toner Pouch 40 and Volume of Developing Container 32]

Next, a relationship between an amount of the toner charged in the toner pouch 40 and a volume of the developing container 32 will be described. The developing container 32 is capable of accommodating the toner of Z[g] as shown in part (a) of FIG. 18. Incidentally, in parts (a) to (c) of FIG. 18, the toner amount is represented by gram (g) conversion, but may also be converted into a unit indicating a volume such as milliliter (ml).

In the case where the toner accommodated in the developing container 32 is 0[g] to X[g] in amount, on the basis of detection results of the first remaining toner amount sensor 51 and the second remaining toner amount sensor 52, the remaining toner amount panel 400 displays the Low level. X[g] corresponds to a second amount, and the toner amount of 0[g] to X[g] corresponds to a toner amount of less than the second amount.

In the case where the toner accommodated in the developing container 32 is X[g] to Y[g] in amount, on the basis of the detection results of the first remaining toner amount sensor 51 and the second remaining toner amount sensor 52, the remaining toner amount panel 400 displays the Mid level. Y[g] corresponds to a first amount, and the toner amount of X[g] to Y[g] corresponds to a first amount, and the toner amount of X[g] to Y[g] corresponds to a toner amount of less than the first amount.

In the case where the toner accommodated in the developing container 32 is Y[g] or more in amount, on the basis of the detection results of the first remaining toner amount sensor 51 and the second remaining toner amount sensor 52, the remaining toner amount panel 400 displays the Full level. A toner amount of Y[g] or more corresponds to a toner amount of the first amount or more.

Figure 18:
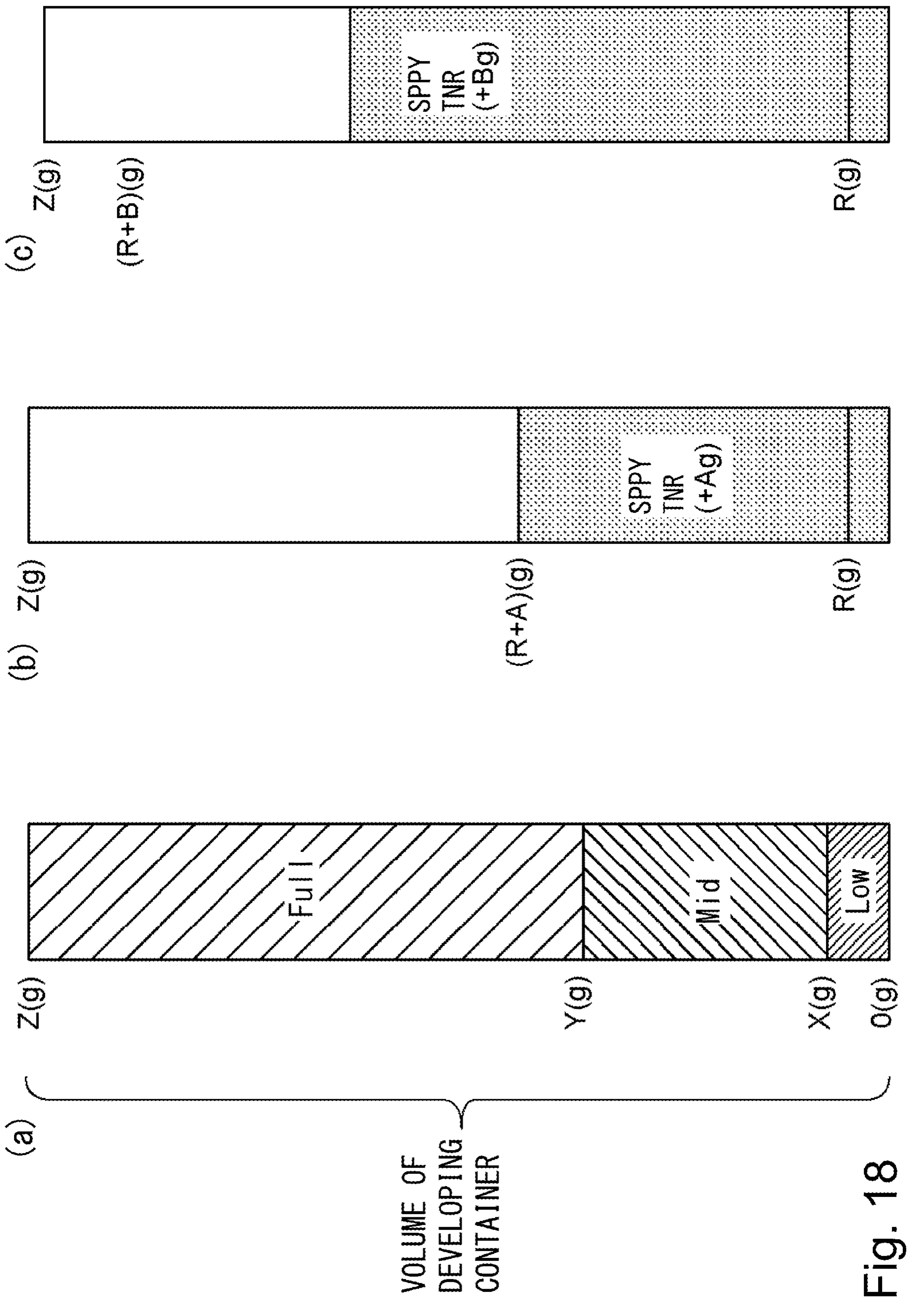
In FIG. 18, part (a) is a graph showing a relationship between a volume of the developing container and a remaining toner amount level, part (b) is a graph showing the remaining toner amount when toner is supplied from a small-volume toner pouch, and part (c) of a graph showing the remaining toner amount when the toner is supplied from a large-volume toner pouch.

Part (b) of FIG. 18 is a graph showing the toner amount in the case where the toner is supplied to the developing container 32 by the toner pouch 40 in which the toner is charged by A[g]. Part (c) of FIG. 18 is a graph showing the toner amount in the case where the toner is supplied to the developing container by the toner pouch 40 in which the toner is charged by B[g] (>A). Incidentally, a product line-up of the toner pouch 40 may be either one or both of a small-volume toner pouch in which the toner is charged by A[g] and a large-volume toner pouch in which the toner is charged by B[g]. Further, the product line-up of the toner pouch 40 is not limited to two kinds, but the three or more kinds of the product line-up may also be prepared.

In this embodiment, the amounts (A, B) of the toner charged in the toner pouch 40 as a supply container satisfy the following formulas (1) and (2).

$$Y \leq A < Z - Y \tag{1}$$

$$Y \leq B < Z - Y \tag{2}$$

As shown in part (b) of FIG. 18, in the case where the toner remaining in the developing container 32 is R[g] between 0[g] to X[g] in amount, when the toner is supplied to the developing container 32 by A[g] by the toner pouch 40, the toner of (R+A) [g] is accommodated in the developing container 32. By the above-described formula (1), Y<[R+A] holds, and therefore, the remaining toner amount panel 400 after the toner supply displays the Full level. That is, Y[g] which is a threshold of the Full level is smaller than the supply amount A[g] of the toner supplied from the toner pouch 40.

Further, as shown in part (c) of FIG. 18, in the case where the toner remaining in the developing container 32 is R[g], when the toner is supplied to the developing container 32 by B[g] by the toner pouch 40, the toner of (R+B) [g] is accommodated in the developing container 32. By the above-described formula (2), Y<(R+B) holds, and therefore, the remaining toner amount panel 400 after the toner supply displays the Full level.

Thus, the volume of the developing container 32, is set so that the remaining toner amount panel 400 is always at the Full level by performing the toner supply when the remaining toner amount panel 400 displays the Mid level or the Low level. Incidentally, there is no need that the volume of the developing container 32 always becomes the Full level by a single toner pouch 40, and for example, the volume of the developing container 32 may also be made at the Full level by a plurality of toner pouch 40 in which the toner in a small amount is accommodated are supplied.

Further, the volume of the developing container 32 is set so that a full amount of the toner charged in the toner pouch 40 can be moved to the developing container 32 when the remaining toner amount panel 400 displays the Mid level or the Low level, by the above-described formulas (1) and (2). That is, a maximum amount of the developer capable of being accommodated in the developing container 32 is larger than a value obtained by adding the amount (A[g] or B[g]) of the developer accommodated in the toner pouch 40 to Y[g] which is a boundary between the Full level and the Mid level. In other words, the amount of the toner charged in the toner pouch 40 is less than a difference between the maximum toner amount (Z[g]) of the toner capable of being accommodated in the developing container 32 and the remaining toner amount (Y[g]) which is the boundary between the Mid level and the Full level.

By this, the toner does not become full in the developing container 32 during the supply of the toner into the developing container 32 with use of the toner pouch 40, so that leakage of the toner from the supply opening 32*a* during the toner supply can be reduced.

As described above, in this embodiment, the second opening 82*a* is formed on the discharge tray 81 of the top cover 82, and the top cover 82 is provided with the openable member 83 which is supported so as to be openable and closable relative to the top cover 82. The openable member 83 covers the second opening 82*a* in a closed state and exposes the supply opening 32*a* of the developing container 32 in an open(ed) state. For this reason, the user can access to the supply opening 32*a* only by opening the openable member 83.

This embodiment employs a type (direct supply type) in which the toner is directly supplied from the supply opening 32*a* to the developing container 32 by the toner pouch 40, and therefore, for supply of the toner to the developing container 32, there is no need to take out the process cartridge 20. Further, the supply opening 32*a* of the developing container 32 is formed at the upper surface of the first projected portion 37 projecting upward from one end portion of the feeding chamber 36 with respect to the longitudinal direction, and therefore, is disposed close to the second opening 82*a*. For this reason, the user is capable of easily performing the toner supplying operation to the developing container 32 through the supply opening 32*a*. Further, for supply of the toner to the developing container 32, parts such as the developing roller 31 and the supplying roller 33 are not exchanged, and therefore, costs thereof can be reduced.

Further, the laser passing space SP is formed so as to be surrounded by the first projected portion 37, the second projected portion 38, the gripping portion 39, and the feeding chamber 36, so that the developing container 32 and the scanner unit 11 can be disposed close to each other, and the image forming apparatus 1 can be downsized.

Further, when the toner pouch 40 is mounted on the supply opening 32*a* and the toner supplying operation is performed, the stirring member 34 is driven, and therefore, even when the supply opening 32*a* is disposed on the one end portion side of the developing container 32 in the longitudinal direction, a packing phenomenon can be reduced. By this, image defect can be reduced and detection accuracy of the remaining toner amount information can be improved.

Further, the maximum amount of the developer capable of being accommodated in the developing container 32 is set so as to become larger than the value obtained by adding the amount (A[g] or B[g]) of the developer accommodated in the toner pouch 40 to Y[g] which is the boundary between the Full level and the Mid level. For this reason, the toner does not become full in the developing container 32 during the supply of the toner in the developing container 32 with use of the toner pouch 40, so that leakage-out of the toner through the supply opening 32*a* during the toner supply can be reduced. The image forming apparatus 1 is thus constituted, so that it is possible to provide one embodiment of the image forming apparatus satisfying needs required for the user.

Incidentally, in this embodiment, in the toner supplying process, the stirring member 34 was driven for the predetermined time (threshold $\alpha$) on the basis of the operation of the button 1 of the operating portion 300 by the user, but the present invention is not limited thereto. For example, the drive of the stirring member 34 is started by pressing the button 1 one, and the drive of the stirring member 34 may be stopped by pressing the button 1 again. Further, the stirring member 34 may also be driven only in a period in which the button 1 is continuously pressed.

Further, when the remaining toner amount of the developing container 32 becomes the Low level, supply notification for prompting the user to supply the toner may be displayed on the display portion 301. Further, when the toner runs out, the supply notification for prompting the user to supply the toner may also be displayed on the display portion 301.

Further, the remaining toner amount of the developing container 32 is notified to the user by the remaining toner amount panel 400, but as in this embodiment, the remaining toner amount panel 400 is not required to be constituted by the three scales. For example, the remaining toner amount panel 400 may be constituted by one, two, or four or more scales. Further, the remaining toner amount panel 400 may be constituted so as to display the remaining toner amount continuously by percentage display or gage display. Further, notification of the remaining toner amount to the user may be carried out by voice (sound) with use of a speaker.

[Toner Pouch]

Here, a constitution of the toner pouch 40, as the toner container for accommodating the toner, which is capable of mountable in and dismountable from the image forming apparatus 1 and which is constituted so as to be mountable on the supply opening 32*a* of the developing container 32 will be described specifically using the figures.

Figure 26:
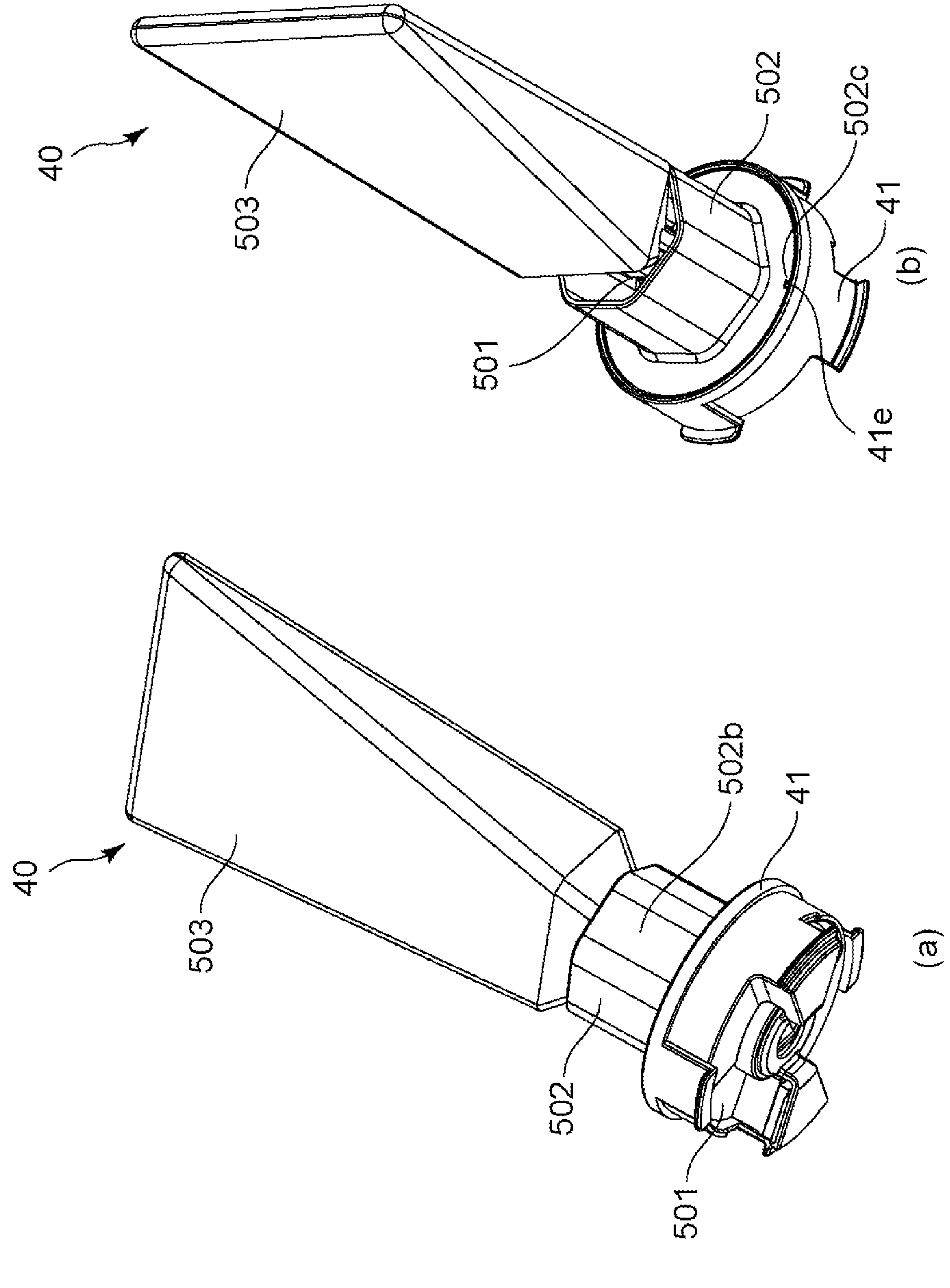
FIG. 26 includes perspective views showing entirety of the toner pouch.

FIG. 26 includes perspective views showing entirety of the toner pouch 40. The toner pouch 40 includes a pouch 503 as a container for accommodating the toner therein, a supply base 501 as a cap mounted on the pouch, the rotatable second shutter 41, and a shutter holder 502 rotatable together with the second shutter 41 while holding the second shutter 41.

Figure 27:
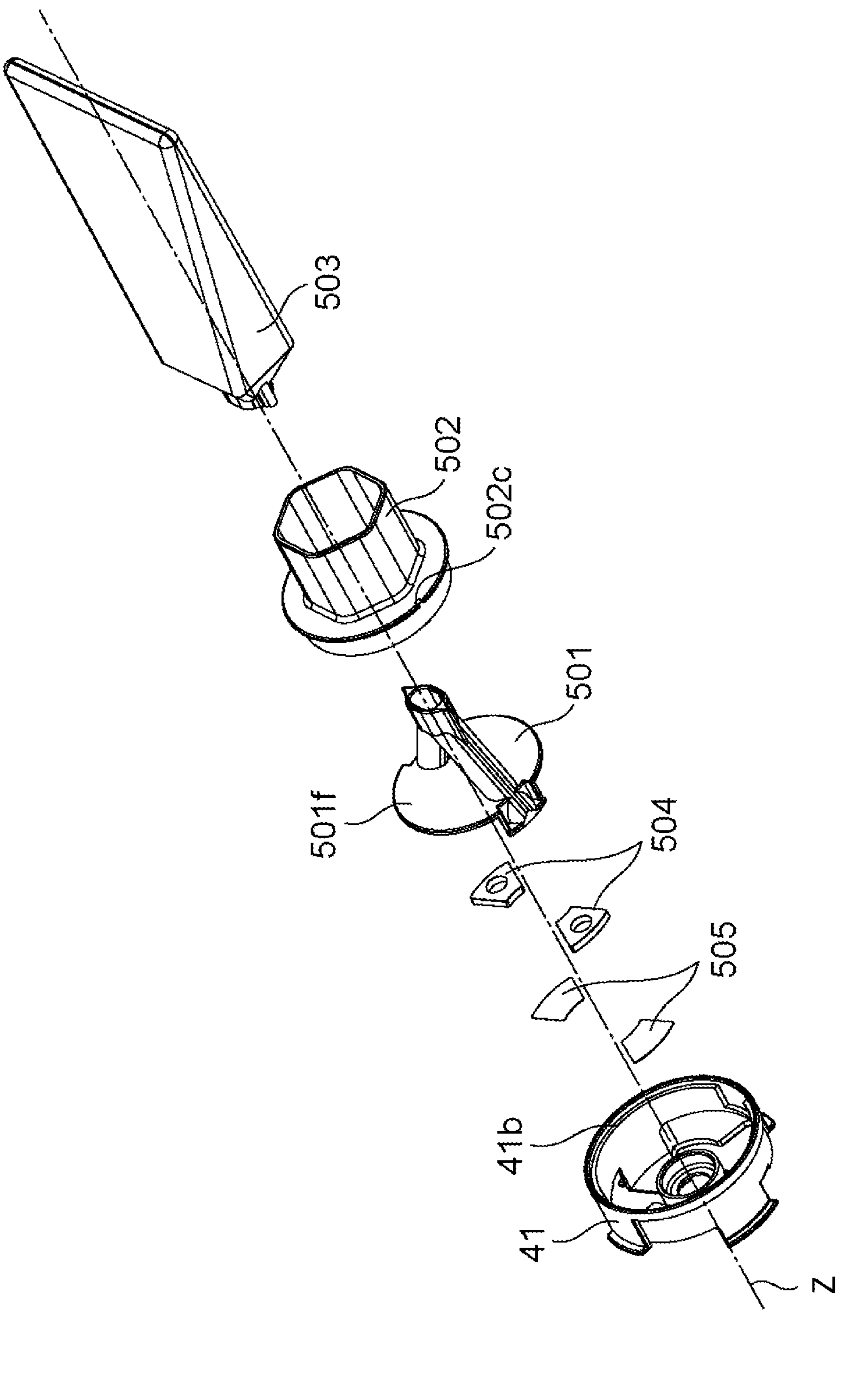
FIG. 27 is an exploded perspective view showing parts constituting the toner pouch.
Figure 28:
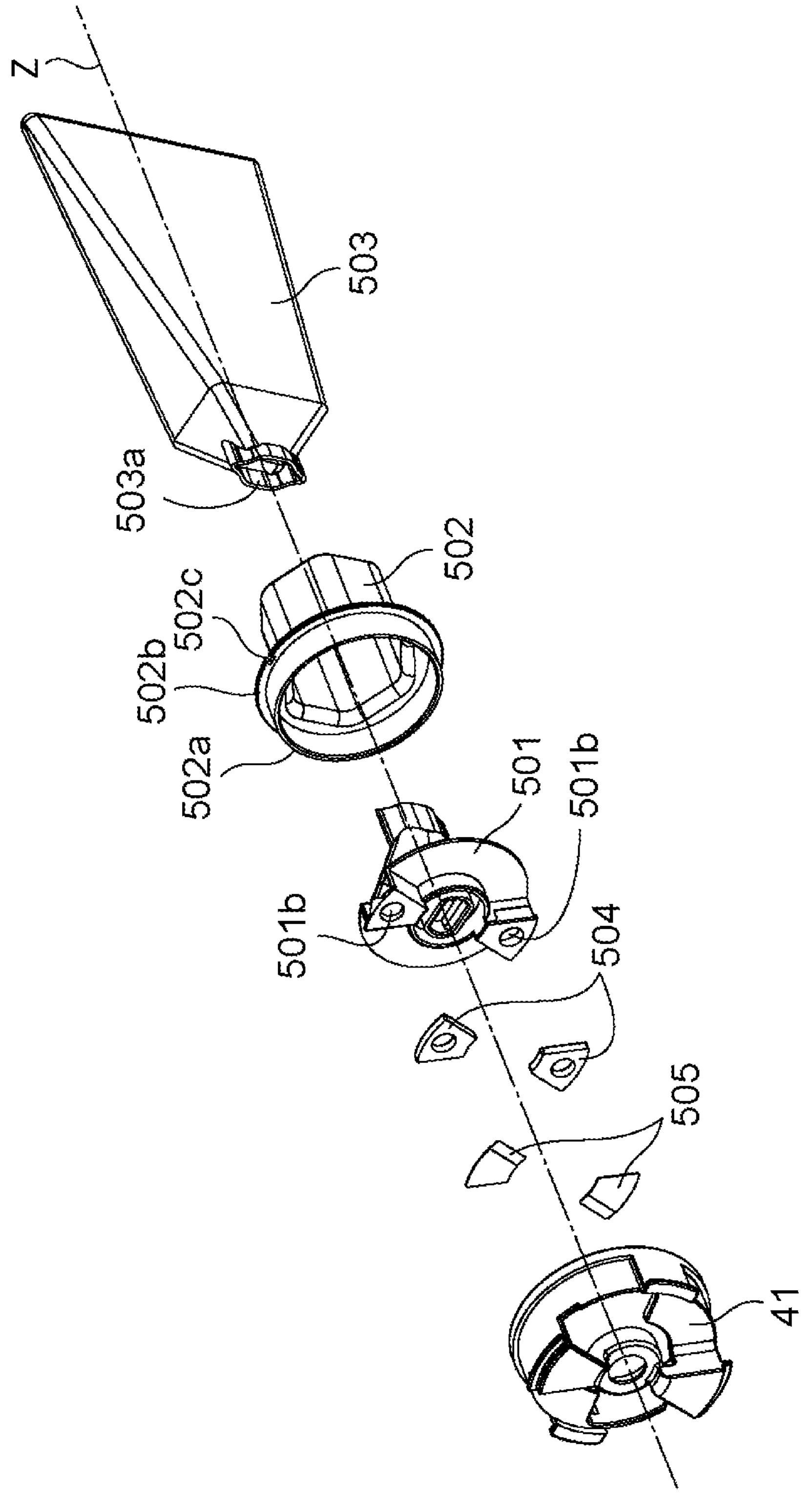
FIG. 28 is an exploded perspective view showing parts constituting the toner pouch.

FIG. 27 and FIG. 28 are exploded perspective views showing parts constituting the toner pouch 40. The toner pouch 40 is constituted sequentially from one end portion thereof in the order of the second shutter 41, a second sheet 505, a second seal 504, the supply base 501, the shutter holder 502, and the pouch 503. The second shutter 41 is constituted so as to be rotatable about a rotational axis z shown in FIGS. 27 and 28. The pouch 503 includes a pouch opening 503*a* as a first opening. The second shutter 41 includes a shielding portion 41*f*, a second shutter opening 41*i*, and a center hole 41*j*.

The toner pouch 40 further includes the second sheet 505. The second sheet 505 is a 100 μm-thick film of PET (polyethylene terephthalate) resin, and is applied to the shielding portion 41*f* of the second shutter 41 by a double-side tape. The film used in the second sheet 505 may preferably be formed of PET resin or PP (polypropylene) resin having a thickness of 50-300 μm.

Figure 29:
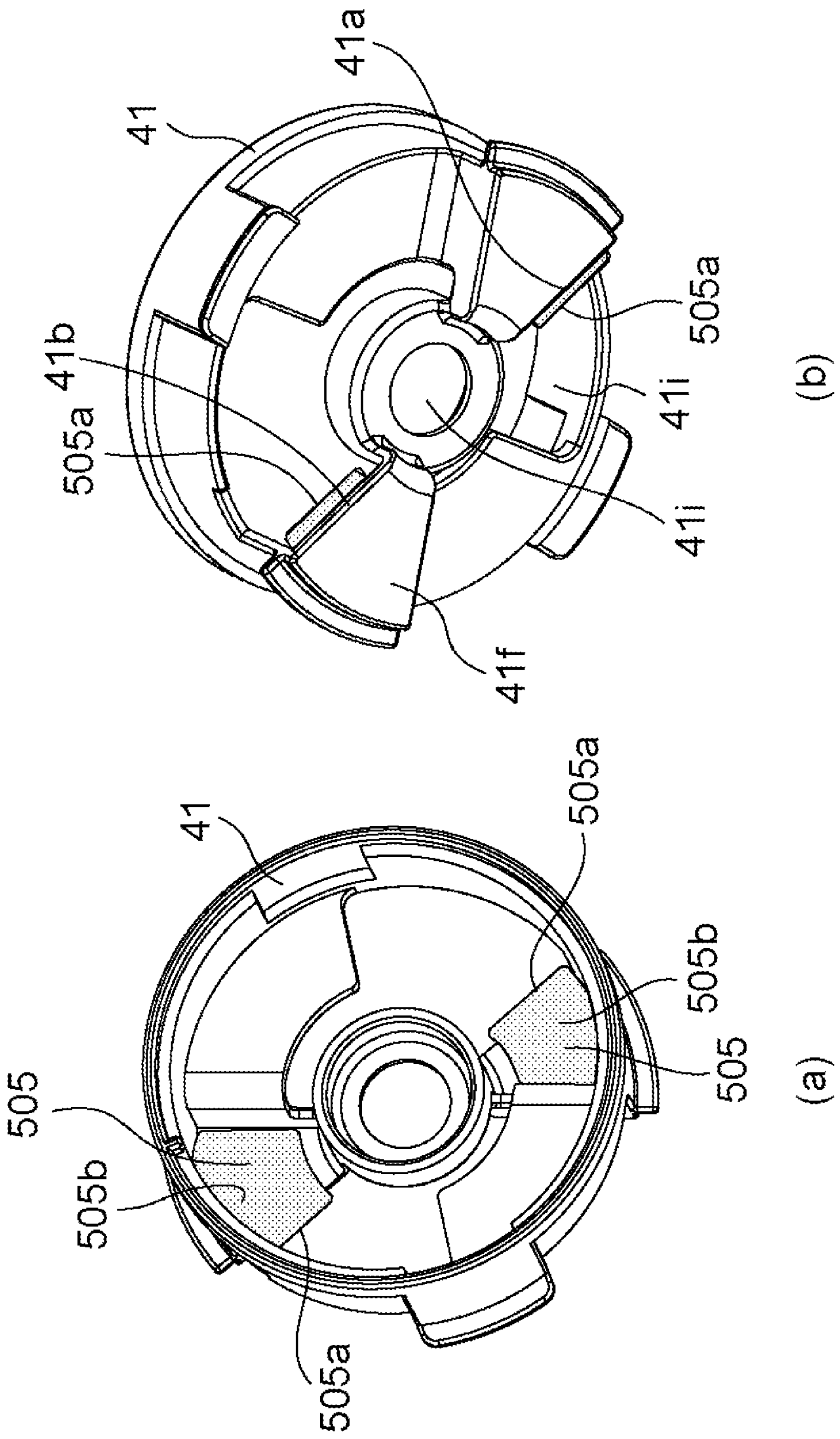
FIG. 29 includes perspective views showing a state in which a second sheet is fixed to a second shutter.

FIG. 29 includes perspective views of the second shutter 41 to which the second sheet 505 is fixed. Part (a) of FIG. 29 is the perspective view of the second shutter 41 as viewed from an inside (side where the pouch 503 exists), and part (b) of FIG. 29 is the perspective view of the second shutter 41 as viewed from an outside (side opposite from the side where the pouch 503 exists). The second sheet 505 is fixed to the shielding portion 41*f* so that an end portion 505*a* in the rotational direction of the second shutter 41 protrudes from an end surface 41*h* of the shielding portion 41*f* in the rotational direction of the second shutter 41.

Figure 30:
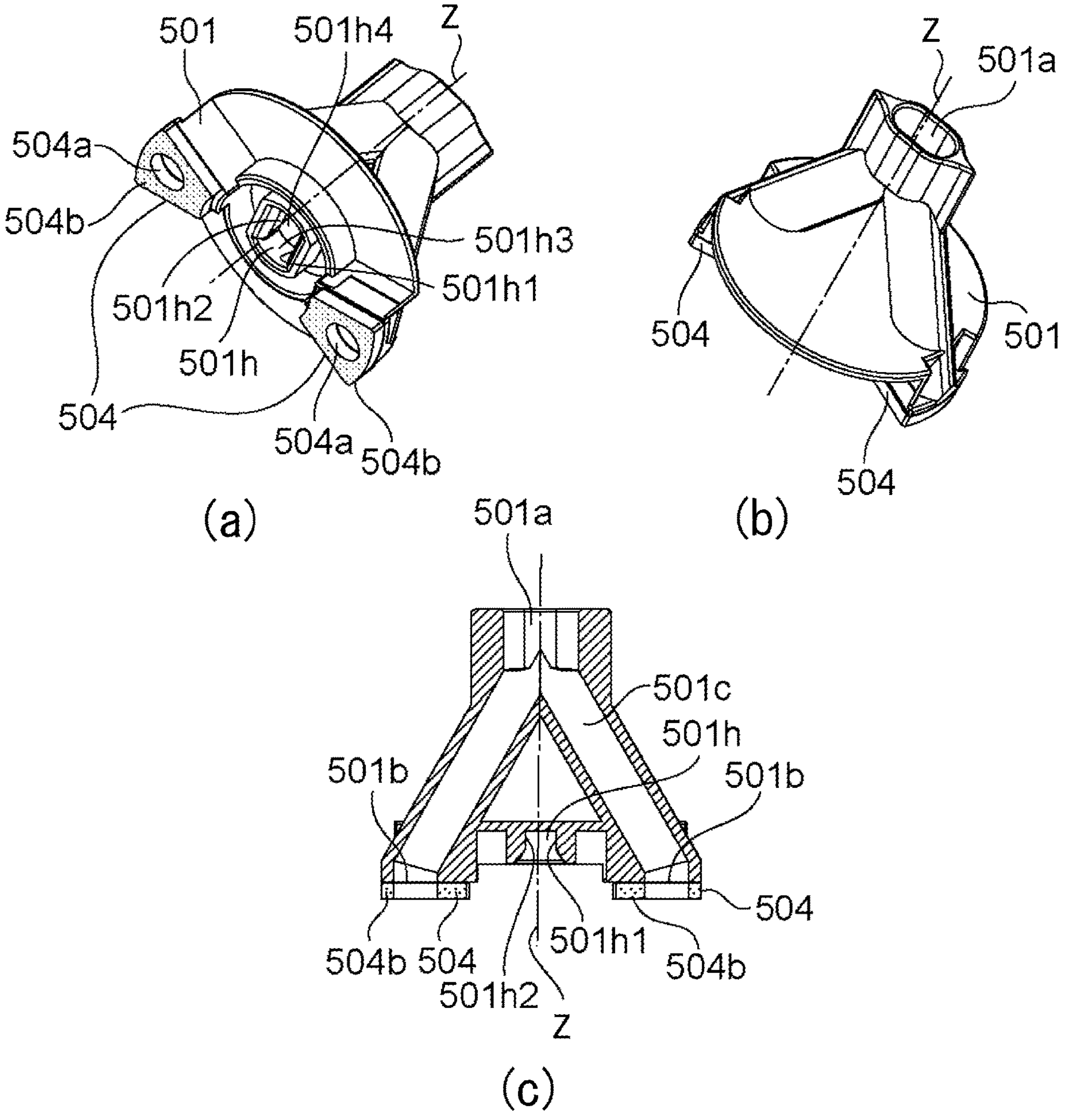
FIG. 30 includes perspective views and a sectional view of a supply base.

FIG. 30 shows the supply base 501 to which the second seal 504 is applied. Parts (a) of FIG. 30 and part (b) of FIG. 30 show perspective views of the supply base 501, and part (c) of FIG. 30 shows a sectional view of the supply base 501. The second seal 504 is constituted by a deformable material such as foam urethane or nonwoven fabric, and is fixed to the supple base 501 by the double-side tape or the like. The supply base 501 includes, an upstream-side opening 501*a*, a downstream-side opening 501*b*, and a pipe portion 501*c* connecting the upstream-side opening 501 and the downstream-side opening 501*b*. The upstream-side opening 501*a* is a receiving opening for receiving the toner from the pouch 503 via the pouch opening 503*a* and is a communication hole for communicating with an inside of the pouch 503. The downstream-side opening 501*b* is a supplying opening (discharging opening) for permitting supple (discharge) of the toner, received through the upstream-side opening 501*a*, to the developing container 32. The pipe portion 501*c* is a hollow pipe (passage) constituted so that the toner received through the upstream-side opening 501*a* can be moved to the downstream-side opening 501*b*. The pipe portion 501*c* of the supply base 501 shown in FIG. 30 is constituted so as to branch from a single upstream-side opening 501*a* into two downstream-side openings 501*b*. The two pipe portions 501*c* are provided symmetrically with respect to the rotational axis z. The opening 503*b* of the pouch 503 and the upstream-side opening 501*a* of the supply base 501 are provided at positions crossing the rotational axis z as viewed in a direction of the rotational axis z. On the other hand, the downstream-side opening 501*b* of the supply base 501 is provided at a position which does not cross the rotational axis z. That is, the pipe portion 501*c* extends in a direction inclined with respect to the rotational axis z. The toner in the pouch 503 passes through the inclined pipe portion 501*c*, whereby intermittent toner supply to the developing device 30 becomes possible than in the case where the toner passes through a pipe portion extending in the direction of the rotational axis z, so that a supply amount is stabilized. In this embodiment, when the supply base 501 is viewed in the direction of the rotational axis z, the two downstream-side openings 501*b* are provided so as not to overlap with the upstream-side opening 501*a* of the supply base 501. Incidentally, even when a part of the downstream-side opening 501*b* overlaps with the upstream-side opening 501*a* of the supply base 501, the pipe portion 501 may only be required to extend in a direction inclined relative to the rotational axis z.

The second seal 504 fixed to the supply base 501 is provided with an opening 504*a* corresponding to a position of the downstream-side opening 501*b*. The toner supplied from the pouch 503 through the upstream-side opening 501*a* of the supply base 501 passes through the pipe portion 501*c*, the downstream-side opening 501*b*, and the opening 504*a* of the second seal 504, and is moved to the developing container 32.

The second seal 504 is fixed to the supply base 501, and therefore, toner leakage at an interface therebetween does not readily occur. On the other hand, a constitution in which a sliding surface 504*b* of the second seal 504 fixed to the supply base 501 is slidable with a sliding surface 505*b* (FIG. 29) of the second sheet 504 fixed to the second shutter 41 is employed. A constitution in which the second seal 504 is deformed by being pressed in the direction of the rotational example z by the second sheet 505 and in which a contact (bearing) pressure is generated between the sliding surface 504*b* of the second seal 504 and the sliding surface 505*b* of the second sheet 505 is employed. By this, toner leakage at an interfere between the second seal 504 and the second sheet 505 is suppressed.

Figure 31:
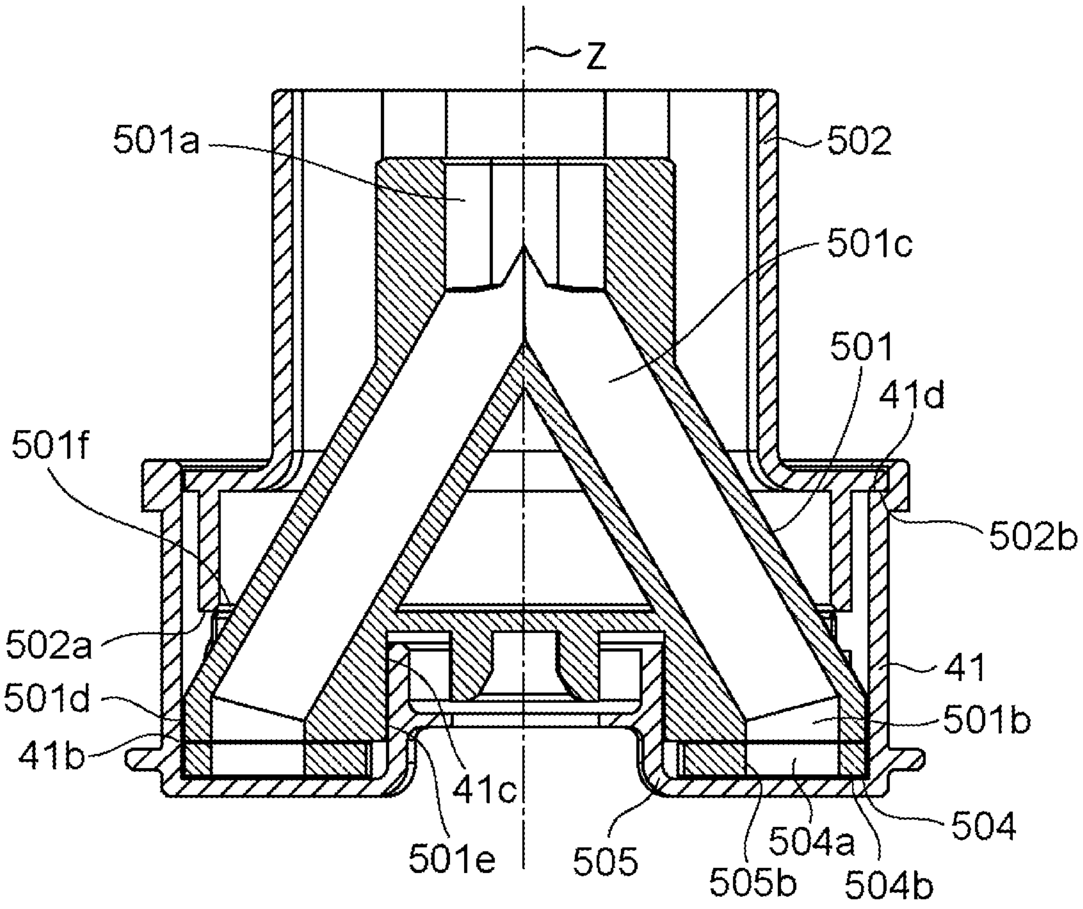
FIG. 31 is a sectional view of the toner pouch.

The second shutter 41 to which the second sheet 505 is fixed is constituted so that the second shutter 41 is rotatable about the rotational axis z relative to the supply base 501 to which the second seal 504 is fixed. In the following, details will be described. In FIG. 31, a sectional view perpendicular to a discharge perpendicular to the rotational axis z of the toner pouch 40 is shown. An inner-diameter portion 41*b* of the second shutter 41 and an outer-diameter portion 501*d* of the supply base 501 are cylindrical parts coaxial with each other about the rotational axis z, and are constituted so as to be slidable with each other. Further, a cylindrical portion 41*c* of the second shutter 41 and an inner-diameter portion 501*e* of the supply base 501 are cylindrical parts coaxial with each other about the rotational axis z, and are constituted so as to be slidable with each other. Here, the shutter holder 502 is disposed on a side opposite from the second shutter 41 relative to the supple base 501 in the direction of the rotational axis z. Specifically, a surface 502*b* of the shutter holder 502 is bonded to a surface 41*d* of the second shutter 41. Further, a recessed portion 502*c* (FIG. 27) of the shutter holder 502 is engaged with a projected portion 41*e* (see FIG. 26) of the second shutter 41, so that the shutter holder 502 is fixed to the second shutter 41 with respect to the rotational direction. The shutter holder 502 is constituted so as to rotate together with the second shutter 41 about the rotational axis z relative to the supply base 501. A rib 502*a* (FIG. 31) of the shutter holder 502 contacts a surface 501*f* of the supply base 501, so that movement of the supply base 501 in the rotational axis z direction is restricted.

That is, the second seal 504 is deformed by being pressed by the second sheet 505, and the supple base 501 is supported between the second shutter 41 and the shutter holder 502 so as to maintain a deformation amount thereof. Accordingly, a contact pressure generates between the sliding surface 504*b* of the second seal 504 and the sliding surface 505*b* of the second sheet 505. By the above-described constitution, in a state of the toner pouch 40 alone, leakage-out of the toner, accommodated in the pouch 503 of the toner pouch, toward the outside is suppressed.

Figure 32:
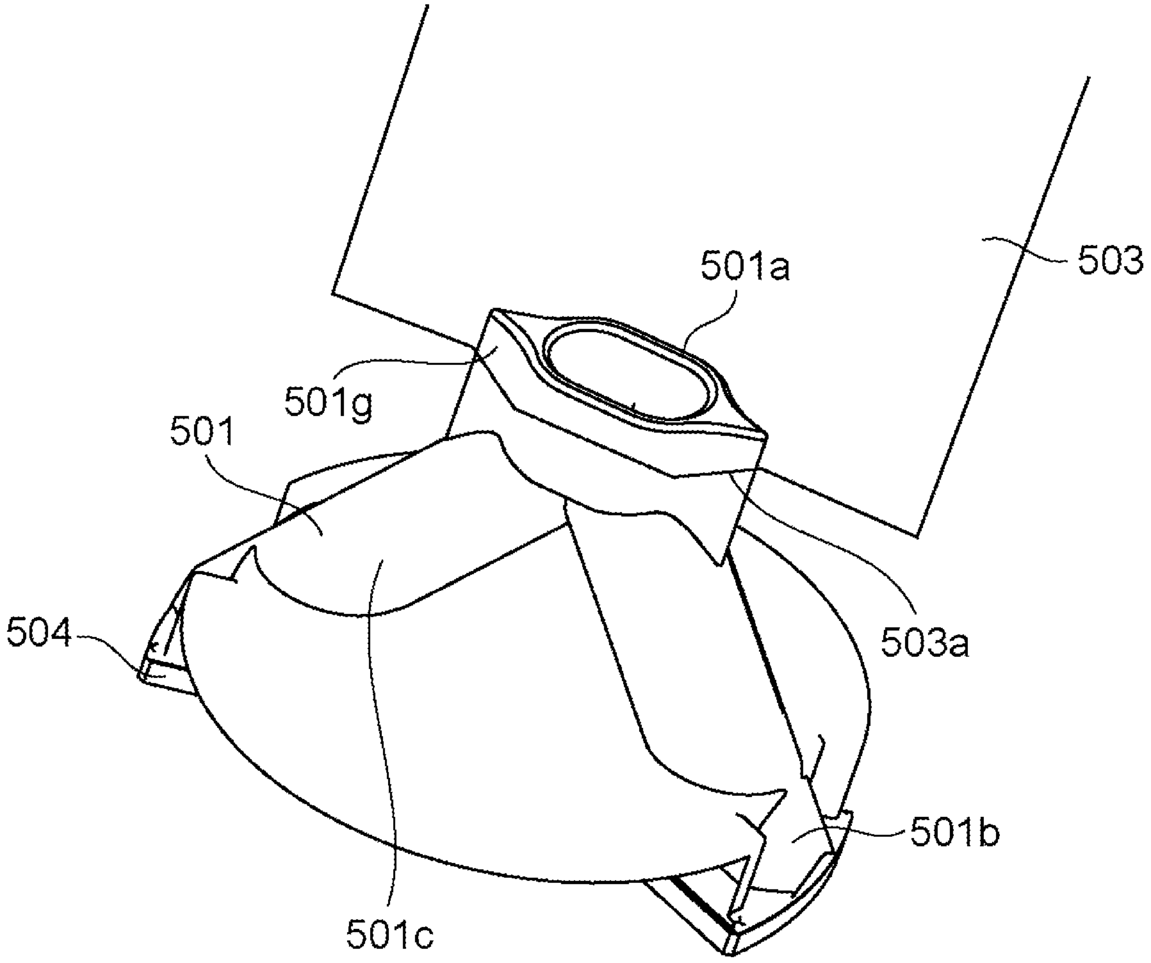
FIG. 32 is a perspective view showing a connection state between the supply base and the toner pouch.

FIG. 32 shows a connection state between the supple base 501 and the pouch 503. To an outer ring 501*g* of the upstream-side opening 501*a* of the supply base 501, the opening 503*a* of the pouch 503 is connected. The upstream-side opening 501*a* of the supply base 501 and the opening 503*a* of the pouch 503 are connected to each other by a method using thermal welding or an adhesive. The toner in the pouch 503 moves toward the supple base 501 through the opening 503*a* of the pouch 503 and the upstream-side opening 501*a* of the supply base 501. This toner passes through the pipe portion 501*c*, the downstream-side opening 501*b*, and the like of the supply base 501 and moves to the developing container 32.

A material of the pouch 503 may preferably be a sheet of PE (polyethylene) resin, PP resin, or PET resin, composite materials of these, nonwoven fabric paper, and composite materials with these resins. In the case where the pouch 503 is constituted by a material which is capable of being deformed by the user, the user presses or squeezes the pouch 503 with fingers, so that the toner in the pouch 503 can be easily supplied to the outside of the toner pouch 40. Incidentally, as described above, when the toner pouch 40 is the bottle container 40B, it is suitable that the user taps the container or the like and drops the toner while vibrating the container.

As described heretofore, the second shutter 41 and the shutter holder 502 are fixed to each other, and further, the supply base 501 and the pouch 503 are fixed to each other. On the other hand, the second shutter 41 is constituted so as to be rotatable about the rotational axis z relative to the supply base 501. In the following, a shielding state and an open state of the downstream-side opening 501*b* of the supply base 501 (the opening 504*a* of the second seal 504) by the second shutter 41 (the second sheet 505) will be described.

Figure 33:
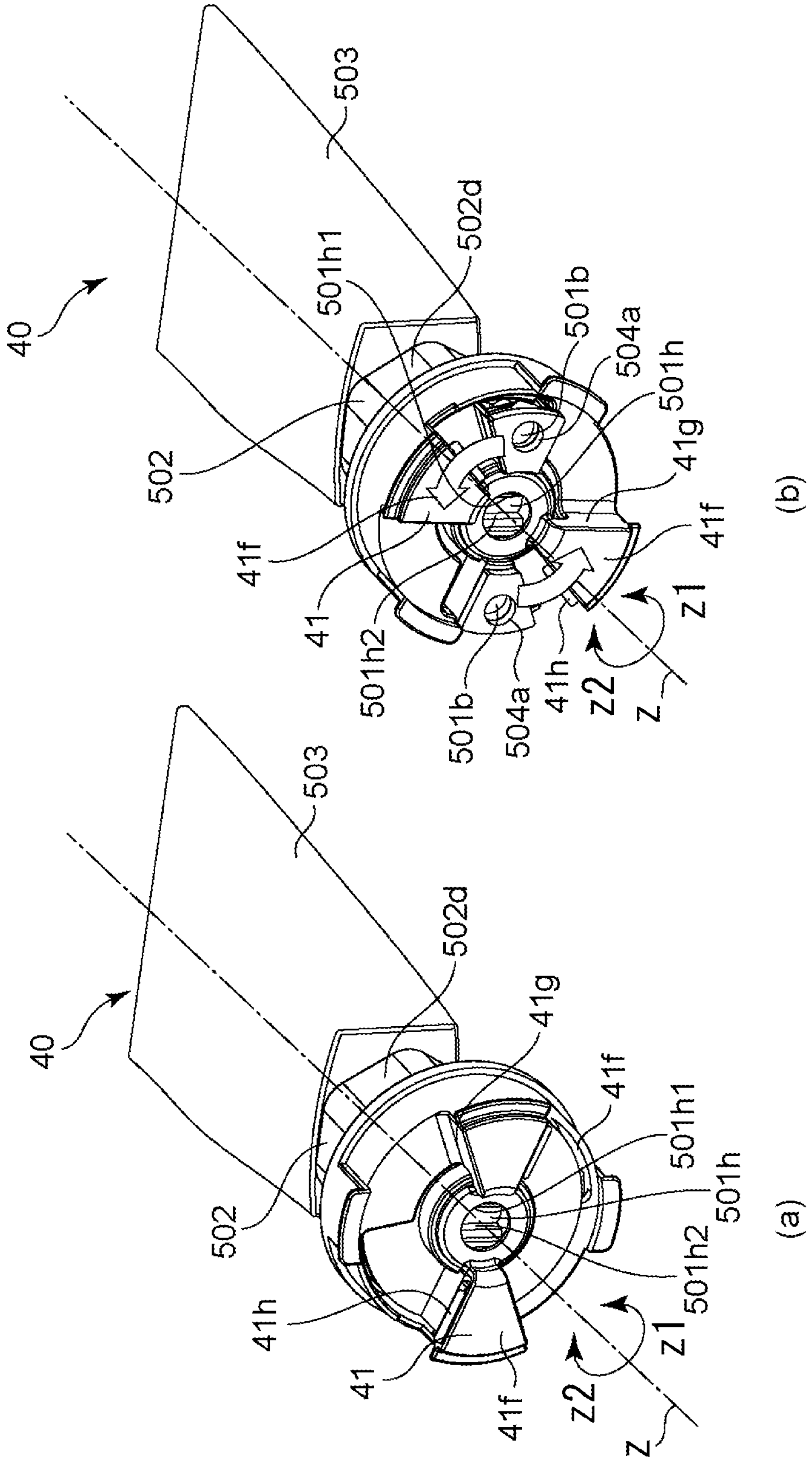
In FIG. 33, part (a) is a perspective view showing a state in which a toner supplying opening of the toner pouch is closed, and part (b) is a perspective view showing a state in which the toner supplying opening of the toner pouch is opened.

Part (a) of FIG. 33 is a perspective view of the toner pouch 40 when the second shutter 41 is in a closed position where the second shutter 41 shields the downstream-side opening 501*b* as a supplying opening of the toner pouch 40. Part (b) of FIG. 33 is a perspective view of the toner pouch 40 when the second shutter 41 is in a closed position where the second shutter 41 is retracted from the closed position so as to open the downstream-side opening 501*b*. Part (b) of FIG. 33 shows a state in which the second shutter 41 is rotated together with the shutter holder 502 about 60 degrees from an open position in an arrow z1 direction about the rotational axis z. This state is a state in which the downstream-side opening 501*b* of the supply base 501 is exposed to the outside of the toner pouch 40 and the toner accommodated in the pouch 503 capable of being supplied. From this state of part (b) of FIG. 33, by rotating the second shutter 41 and the shutter holder 502 about the rotational axis z in an arrow z2 direction, the toner pouch 40 can be returned again to the state in which the downstream-side opening 501*b* of the toner pouch 40 is shielded by the shutter 41 (part (a) of FIG. 33). After the toner pouch 40 is mounted on the developing container 32, a body portion 502*d* of the shutter holder 502 is rotated about the rotational axis z in the arrow z1 direction by the user, whereby the second shutter 41 is rotated. By this, a constitution in which the downstream-side opening 501*b* of the supply base 501 is exposed and the supply of the toner in the pouch 503 to the developing container 32 becomes possible is formed.

[Developing Container]

Figure 34:
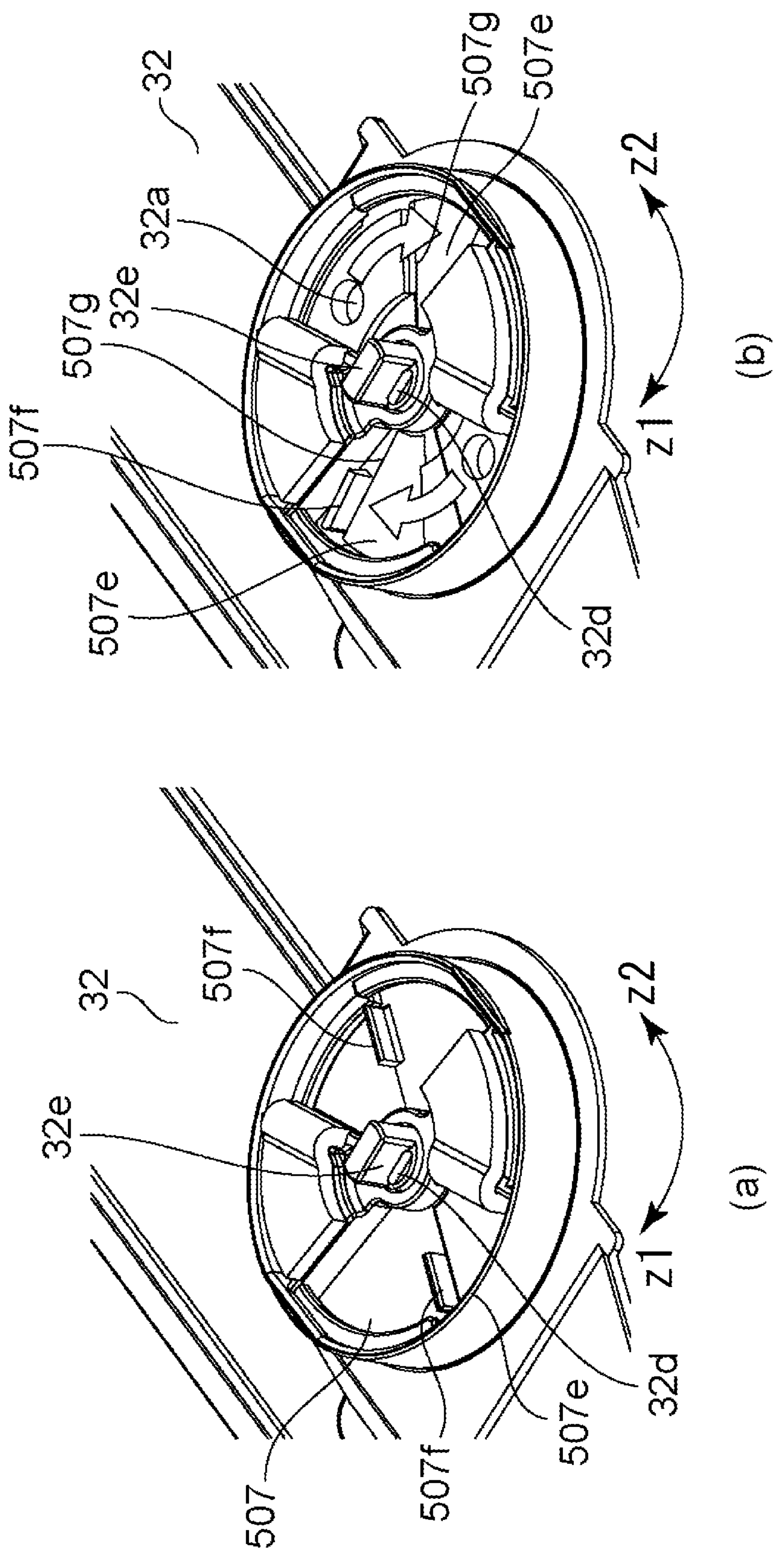
FIG. 34 includes perspective views of a supply opening of a developing container.
Figure 35:
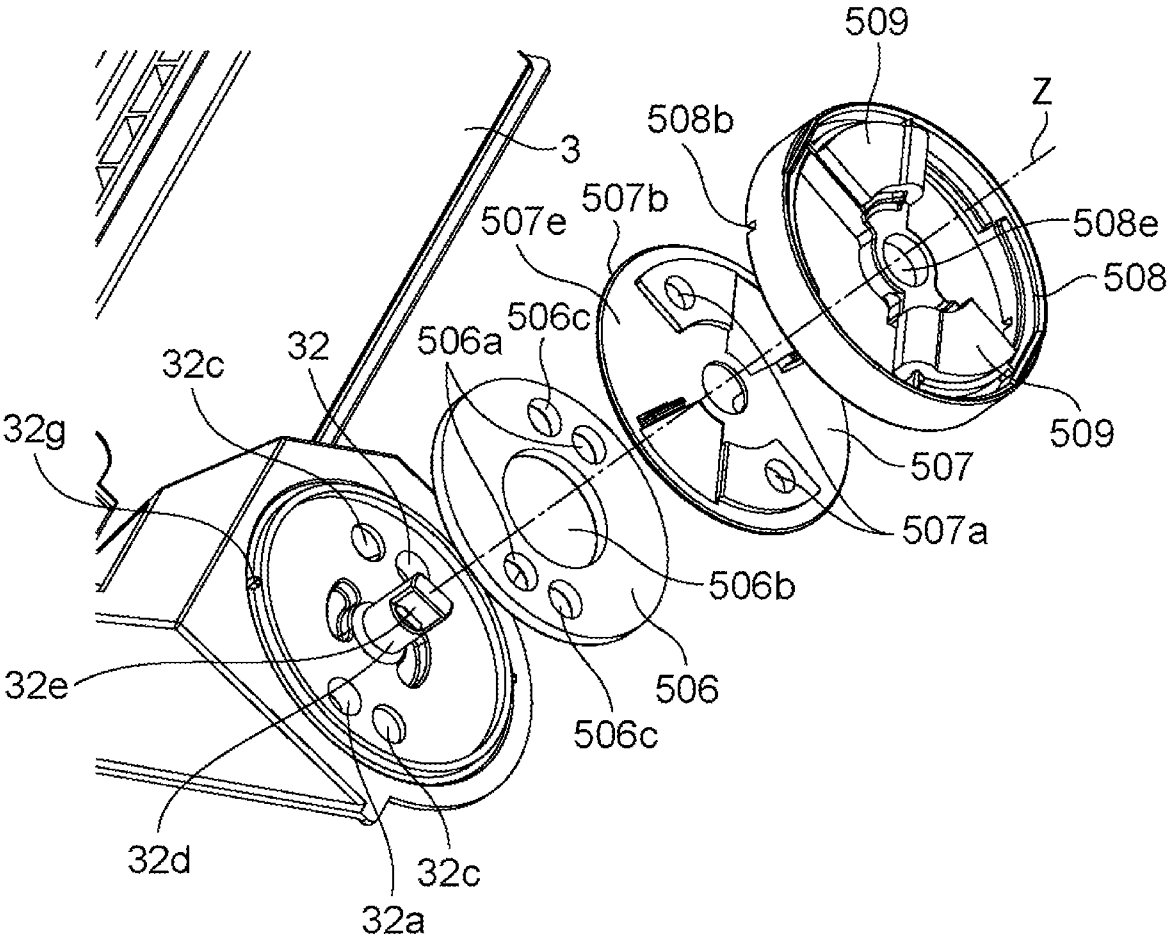
FIG. 35 is an exploded perspective view showing the supply opening of the developing container and peripheral parts.
Figure 36:
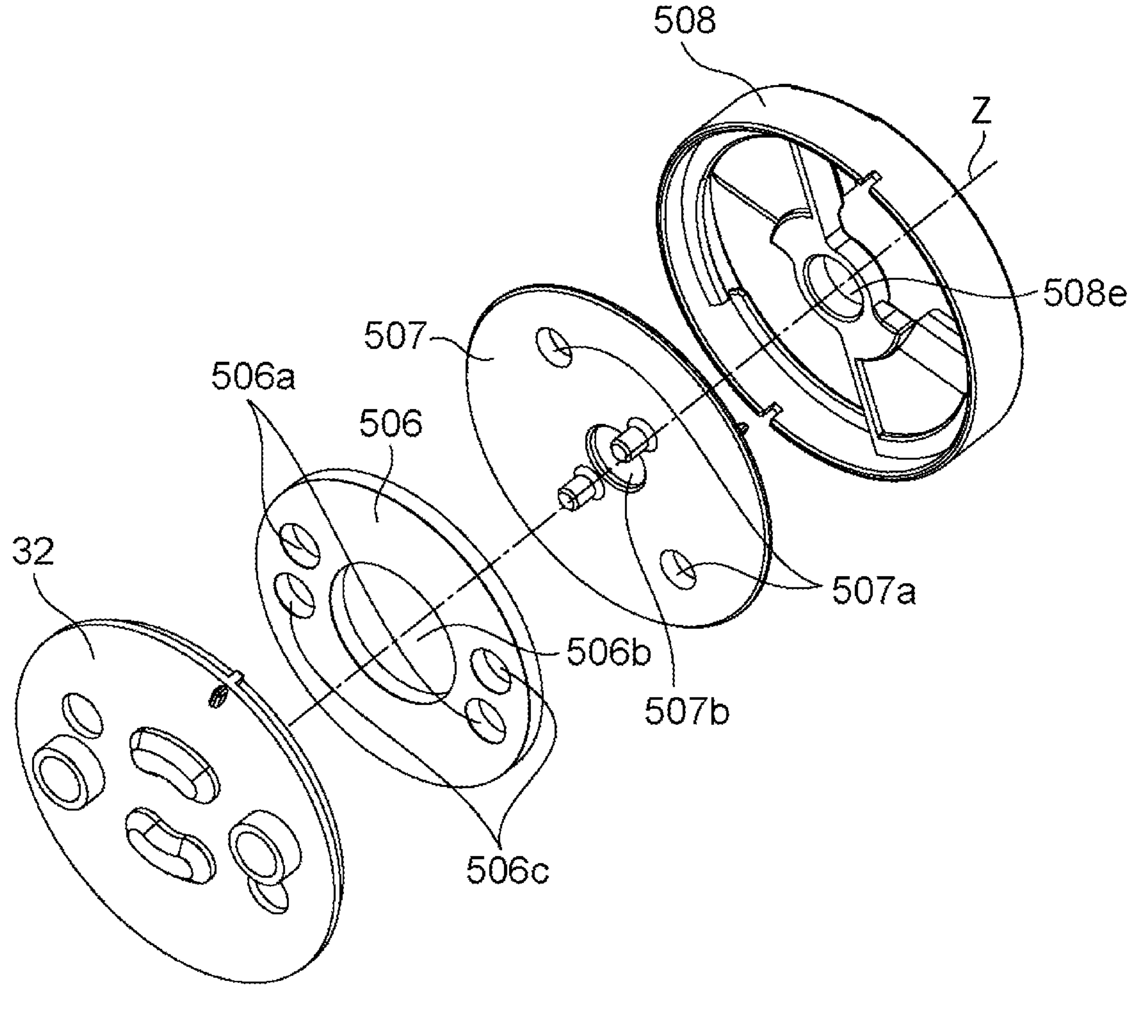
FIG. 36 is an exploded perspective view showing the supply opening of the developing container and the peripheral parts.

A constitution of the developing container 32 as a main assembly accommodation portion (toner accommodating portion) which is an object to which the toner is supplied from the toner pouch 40 will be described using the figures. FIG. 34 includes perspective views of the developing container 32 in the neighborhood of the supply opening 32*a*. The supply opening 32*a* is a receiving opening for receiving toner supply from the toner pouch 40. FIG. 35 is an exploded perspective view showing the supply opening 32*a* of the developing container 32 and a peripheral portion thereof. On the supply opening 32*a*, a first seal 506, a first shutter 507, a shutter cover 508, and a first seal 509 and disposed so as to be superposed in this order. Part (a) of FIG. 34 is a state in which the supply opening 32*a* is shielded by the first shutter 507, and part (b) of FIG. 34 is a state in which the supply opening 32*a* is opened.

Incidentally, as shown in FIGS. 34 and 35, the developing container 32 is provided with a shaft portion 322 which is provided coaxially with the rotation axis z and which extends in the direction of the rotational axis z. The shaft portion 322 includes a cylindrical portion 32*d* and a bidirectional-shaped portion 32*e* provided on atop (free) end side than the cylindrical portion 32*d*. The first shutter 507 includes a surface 507*e* as a substantially sector-shaped shielding portion, first through holes 507*a*, and a center hole 507*e*. The center hole 507*e* engages with the cylindrical portion 32*d* of the shaft portion 322, whereby the first shutter 507 becomes rotatable about an axis (rotational axis z) of the shaft portion 322.

The bidirectional-shaped portion 32*e* of the shaft portion 322 penetrates a center hole 506*b* of the first seal 506, a center hole 507*b* of the first shutter 507, and a center hole 508*e* of the shutter cover 508, and extends to the toner pouch 40 side. A function of the bidirectional-shaped portion 32*e* of the shaft portion 322 will be described later.

The first seal 506 is constituted by a material such as a deformable foam urethane or nonwoven fabric, and is fixed to the developing container 32 by a double-side tape or an adhesive. The first seal 506 is provided with a through hole 506*a* at a position corresponding to the supply opening 32*a* of the developing container 32. The developing container 32 is provided with a discharge opening 32*c* separately from the supply opening 32*a*, and the first seal 506 is provided with a through hole 506*c* at a position corresponding to the discharge opening 32*c* of the developing container 32.

Figure 37:
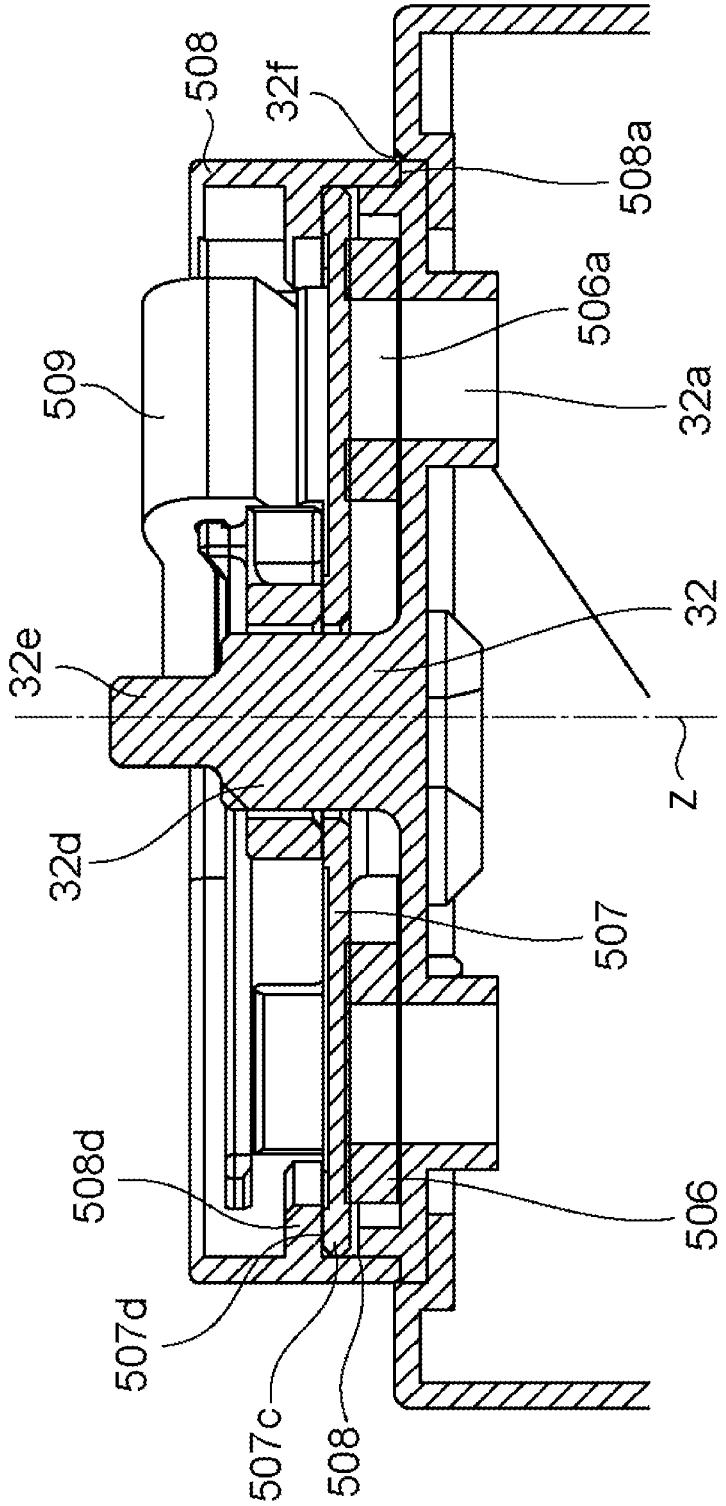
FIG. 37 is a sectional view of the supply opening of the process cartridge and the peripheral parts.

On the first seal 506, the first shutter 507 is disposed. Further, on the first shutter 507, the shutter cover 508 is disposed. FIG. 37 shows a sectional view, perpendicular to the rotational axis z, of a peripheral portion of the supply opening 32*a* of the developing container 32.

The shutter cover 508 is fixed to the developing container 32. In a state in which a recessed portion 508*b* of the shutter cover 508 engages with a projected portion 32*g* (FIG. 35) of the developing container 32, the surface 508*a* of the shutter cover 508 is bonded to a surface 32*f* of the developing container 32. That is, the shutter cover 508 is positioned relative to the developing container 32 at a predetermined rotational phase. The first shutter 507 is disposed between the first seal 506 provided on the developing container 32 and the sheet cover 508, and is supported by the developing container 32 so as to be rotatable about the rotational axis z.

As shown in FIG. 37, an outer ring 507*c* of the first shutter 507 and an inner-diameter portion 508*c* of the shutter cover 508 are cylindrical portions provided coaxially with each other along an axis (rotational axis z) of the shaft portion 322. The first shutter 507 is constituted so that relative to the shutter cover 508, the outer ring 507*c* of the first shutter 507 can rotate while sliding the inner-diameter portion 508*c* of the shutter cover 508. On the other hand, a constitution in which the surface 507*d* of the first shutter 507 contacts the surface 508*d* of the shutter cover 508 and movement of the first shutter 507 in the direction of the rotational axis z is restricted is employed. The first shutter 507 is supported between the shutter cover 508 and the developing container 32 so that the first seal 506 is pressed in the direction of the rotational axis z by the first shutter 507 and thus a compressed state is maintained. By this, in a state of the developing container 32 alone, leakage of the toner from the developing container 32 is suppressed.

Figure 38:
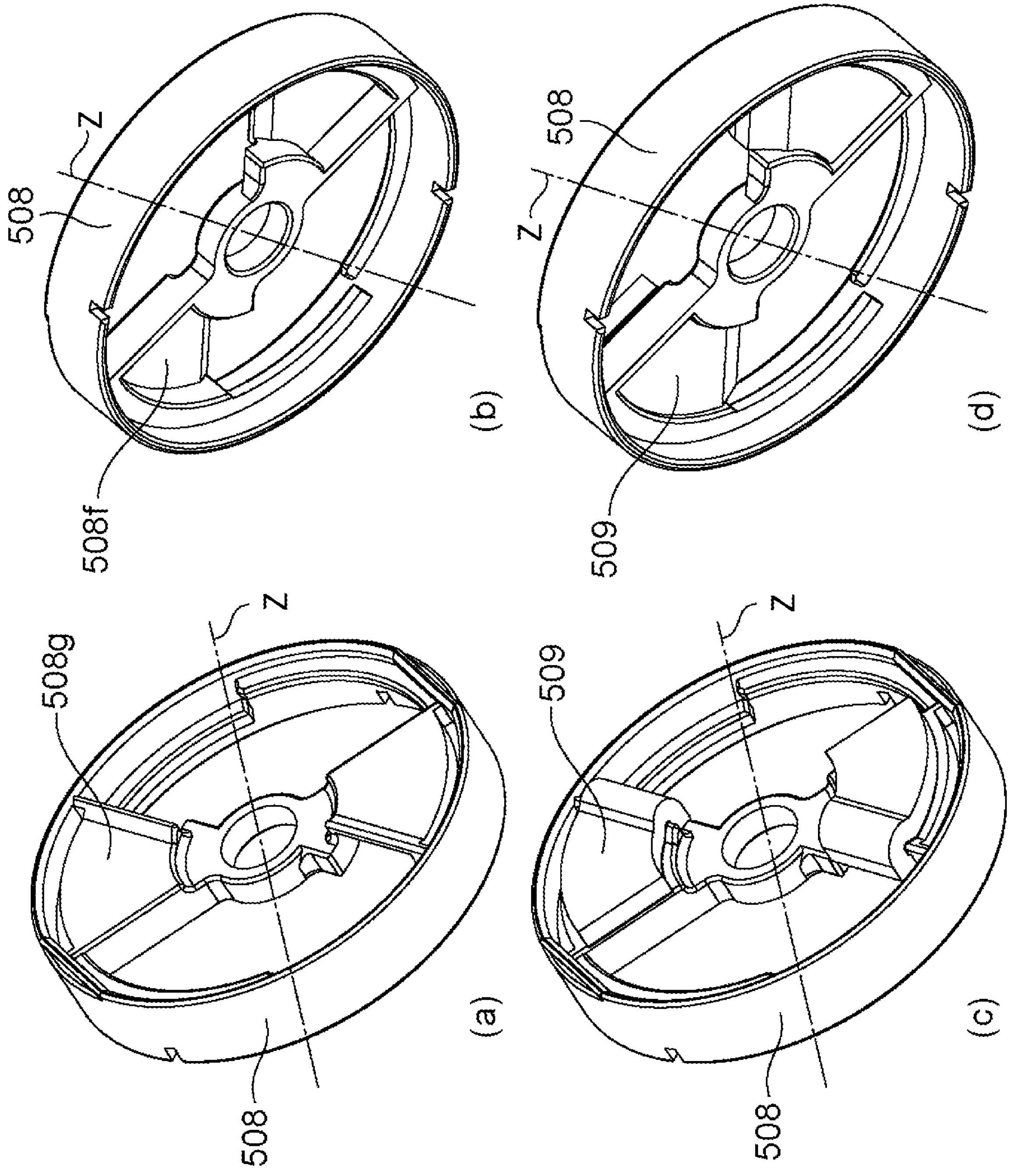
FIG. 38 includes perspective views showing a positional relationship between a shutter cover and a first seal.

Parts (a) and (b) of FIG. 38 are perspective views of the shutter cover 508. Parts (c) and (d) of FIG. 38 shows the shutter cover 508 to which the first seal 509 is mounted. The first seal 509 is constituted by a material such as a deformable foam urethane or a nonwoven fabric. The first seal 509 is applied to the shutter cover 508 over a surface 508*f* and a surface 508*g* with a double-side tap or the like as shown in part (b) of FIG. 38. The surface 508*f* of the shutter cover 508 is the surface 508*f* which opposes the first shutter 507 and which is perpendicular to the rotational axis z. The surface 508*g* of the shutter cover 508 is a surface opposite from the surface 508*f* with respect to the rotational axis z direction.

The first shutter 507 is supported rotatably about the rotational axis z. The first shutter 507 rotates between a shielding position (first position) shown in part (a) of FIG. 34 and an open position (second position) shown in part (b) of FIG. 34. The shielding position is a position where the surface 507*e* overlaps with the supply opening 32*a* when viewed in the direction of the rotational axis z, and is a position where the developing container 32 cannot receive the supply of the toner from the toner pouch 34. The open position (second position) is a position where the first through hole 507*a* overlaps with the supply opening 32*a*, and is a position where the developing container 32 can receive the supply of the toner from the toner pouch 40.

[Engagement of Toner Pouch and Developing Container and Open/Close Operation of Shutter]

Figure 39:
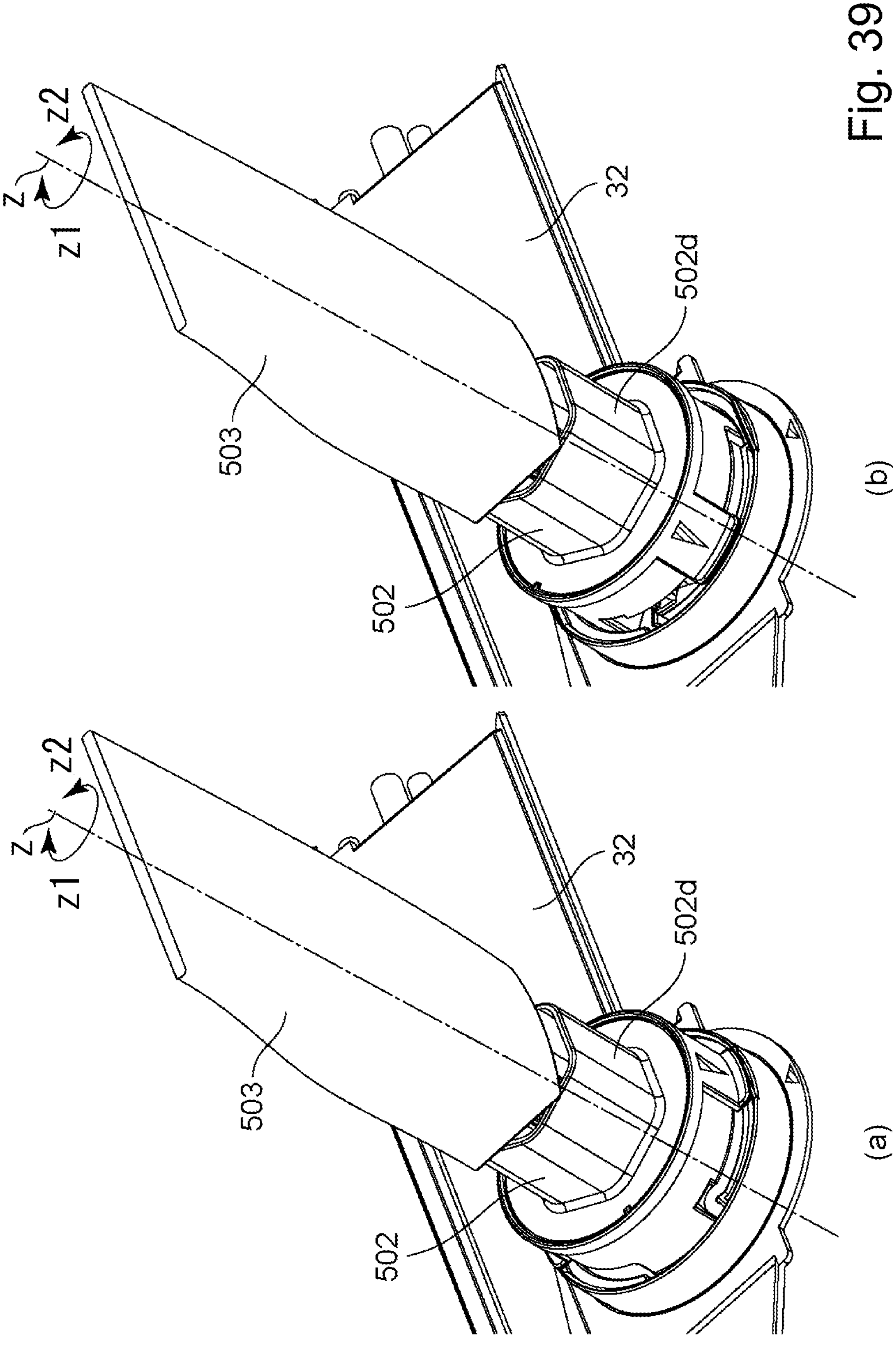
FIG. 39 includes perspective views showing a state in which the supply opening is closed and a state in which the toner pouch is engaged.

A state in which the toner pouch 40 is mounted on the developing container 32 shown in part (a) of FIG. 34, in which the supply opening 32*a* is shielded by the first shutter 507 shown in part (a) of FIG. 39.

When the toner pouch 40 is mounted on the developing container 32, the bidirectional shaft portion 32*e* of the developing container 32 is inserted into a bidirectional hole 501*h* of the supply base 501, so that the bidirectional shaft portion 32*e* is engaged with the bidirectional hole 501*h*. In other words, the bidirectional hole 501*h* of the toner pouch 40 is constituted so as to engageable with the bidirectional shaft portion 32*e* of the developing container 32. Further, to the substantially sector-shaped surface 507*e* (part (a) of FIG. 34) of the first shutter 507, the substantially sector-shaped surface 41*f* (part (a) of FIG. 33) of the second shutter 41 is contacted.

In a state shown in part (a) of FIG. 39, the case where the upstream grips the body portion 502*d* and rotates the shutter holder 502 in the arrow z1 direction will be described. As described above, the shutter holder 502 and the second shutter 41 are fixed to each other, and therefore, in interrelation with the rotation of the shutter holder 502, the second shutter 41 is also rotated in the arrow z1 direction. At this time, the surface 41*g* (FIG. 33) of the second shutter 41 contacts a rib 507*f* (FIG. 34) and presses the first shutter 507 in the arrow z1 direction, so that the first shutter 507 is rotated in the arrow z1 direction. The surface 41*g* of the second shutter 41 and a surface of the rib 507*f* of the first shutter 507 extend in the direction of the rotational axis z.

The surface 41*g* of the second shutter 41 as an engaging portion engages with the rib 507*f* of the first shutter 507 as a portion-to-be-engaged, so that the first shutter 507 is constituted so as to rotate together with the second shutter 41.

Part (a) of FIG. 33 and part (a) of FIG. 34 shows a state of the toner pouch 40 in which the second shutter 41 and the first shutter 507 are rotated from the state shown in part (b) of FIG. 33 and part (b) of FIG. 34, respectively, by 60° about the rotational example z in the arrow z1 direction, and of the developing container 32. The toner pouch 40 of part (b) of FIG. 33 is in a state in which the second predetermined opening 41*i* of the second shutter 41 overlaps with the downstream-side opening 501*b* of the supply base 501 and the downstream-side opening 501*b* is exposed, so that the developing container 32 is in a state in which the developing container 32 is capable of receiving the toner from the toner pouch 40.

The shaft portion 322 of the developing container 32 is fixed so as not to rotate about the rotational axis z. Accordingly, the supple base 501 and the pouch 503 which are engaged with the bidirectional shaft portion 32*e* of the shaft portion 322 in the bidirectional hole 501*h*. That is, in the case where the user rotates the body portion 502*d* of the shutter holder 502, only the second shutter 41 and the first shutter 507 rotate, and the supply base 504 and the pouch 503 do not rotate. As shown in FIG. 7, a constitution in which the user deforms the pouch 503 and supplies the toner of the pouch 503 to the developing device 32 is employed, so that the pouch 503 is constituted so as to be easily deformed. Accordingly, a constitution in which the pouch 503 is fixed to the developing device 32 and in which the body portion 502*d* of the shutter holder 502 is rotated is better in operating property than the case where the user is capable of holding and rotating the pouch 503. Further, there is a case that itis preferred that the pouch 503 is not rotated and always faces toward a predetermined direction. For example, the case where an instruction for the toner supply is displayed on the pouch 503 or an instruction label is applied onto the pouch 503 exists. In such a case, itis meaningful that by employing a constitution in which the pouch 503 does not rotate, viewability of the pouch 503 by the user is enhanced.

Next, an operation for dismounting the toner pouch 40, mounted on the developing container 32, from the developing device 32 will be described. An operation in which from the state shown in part (b) of FIG. 39, the body portion 502*d* of the shutter holder 502 is rotated about the rotational axis z in the arrow z2 direction will be considered. The shutter holder 502 and the second shutter 41 are fixed to each other, and therefore, in interrelation with the shutter holder 501, the second shutter 41 is also rotated in the arrow z2 direction. At this time, the surface 41*h* (FIG. 33) of the second shutter 41 presses the surface 507*g* (FIG. 34) provided on the first shutter 507, so that the first shutter 507 is rotated. Further, the first shutter 507 is supported rotatably about the rotational axis z, and therefore, in interrelation with a rotating operation of the shutter holder 501, the first shutter 507 is also rotated about the rotational axis z in the arrow z2 direction. The shutter holder 502 is rotated 60° in the arrow z2 direction, so that the mounted state can be returned to the state in which the supply opening 32*a* is shielded as shown in part (a) of FIG. 33, part (a9 of FIG. 34, and part (a) of FIG. 39. Incidentally, also, in this case where the first shutter 507 and the second shutter 41 are closed, the toner pouch 40 does not rotate.

Figure 40:
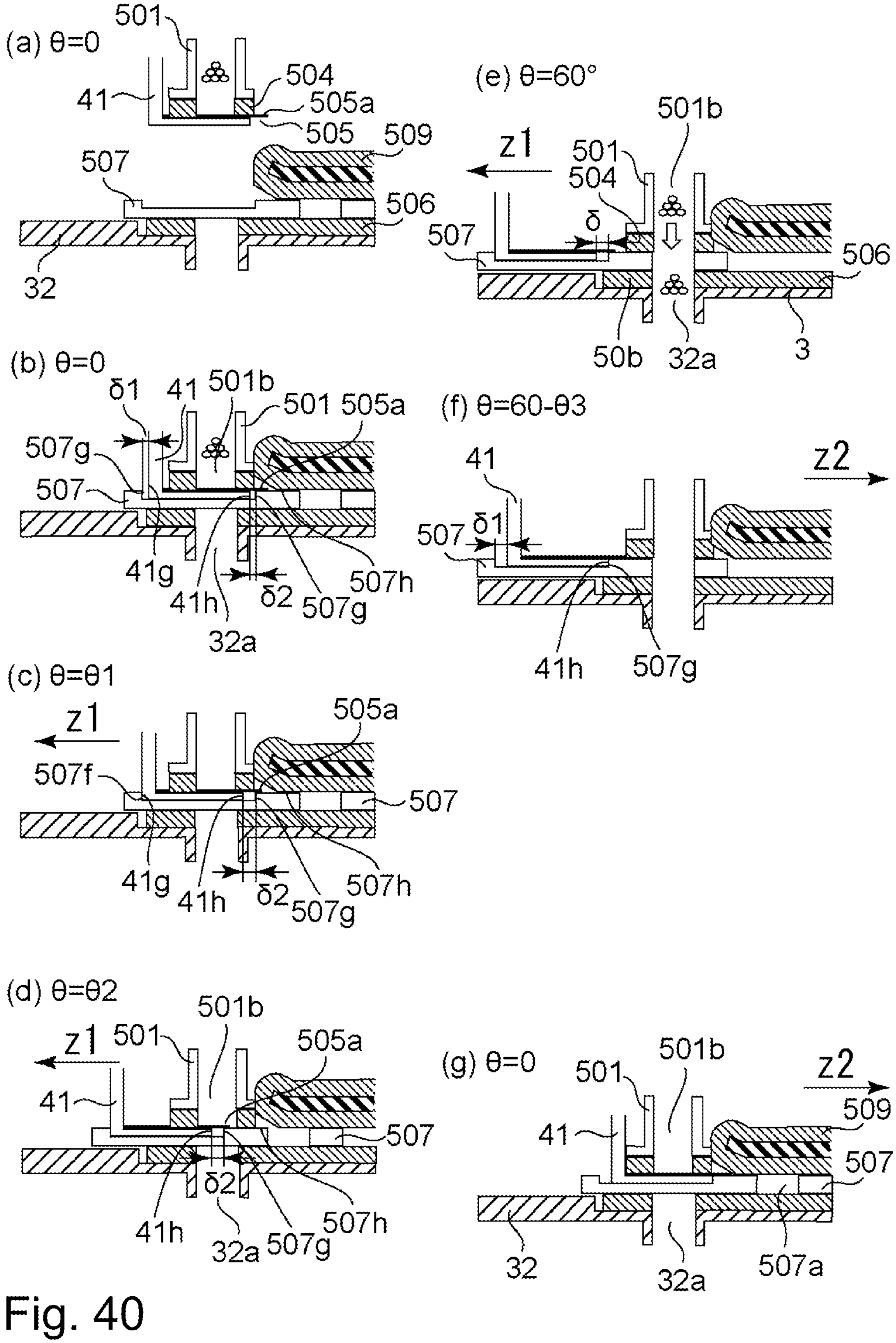
FIG. 40 includes schematic sectional views showing a state in which the toner pouch is mounted on the developing container.

Next, a toner leakage suppressing method during opening/closing of the first shutter 507 and the second shutter 41 will be described. FIG. 40 includes schematic sectional views of an interface portion between the toner pouch 40 and the developing container 32 when the toner pouch 40 is mounted on the developing container 32. In FIG. 40, the pouch 503 is omitted. Part (a) of FIG. 40 shows a state before the toner pouch 40 is mounted. Part (b) of FIG. 40 shows a state in which the toner pouch 40 is mounted on the developing container 32 from the state shown in part (a) of FIG. 40 and before the first shutter 507 and the second shutter 41 are rotated. In this state, the supply opening 32*a* of the developing device 32 and the downstream-side opening 501*b* of the supply base 501 are shielded, so that the toner accommodated in the pouch 503 is not discharged to the outside of the toner pouch 40. Further, part (c) of FIG. 40 shows a state in which from the state shown in part (b) of FIG. 40, the second shutter 41 is rotated about the rotational axis z in the arrow z1 direction by an angle θ1 (0<θ1). Rotation of the shutter 41 about the rotational axis z in the arrow z1 direction is shown as a left(-hand) direction (arrow z1 direction) in the figure, in FIG. 40. Further, part (d) of FIG. 40 shows a state in which from the state shown in part (b) of FIG. 40, the second shutter 41 is rotated about the rotational axis x in the arrow z1 direction by an angle θ2 (θ<θ2). Further, part (e) of FIG. 40 is a state in which from the state shown in part (b) of FIG. 40, the second shutter 41 is rotated about the rotational axis z in the arrow z1 direction by 60°, and shows a state in which the supply opening 32*a* and the downstream-side opening 501*b* of the supply base 501 are exposed. Part (b) of FIG. 40 is a state in which the toner pouch 40 is mounted on the developing container 32, and an end portion 505*a* of the first sheet 505 with respect to the rotational direction of the second shutter 41 is disposed so as to contact a surface 507*h* of the first shutter 507. Further, the rib 507*f* of the first sheet 507 and the surface 41*g* of the second shutter 41 disposed with a gap δ1 in the rotational direction of the second shutter 41. Further, a surface 507*g* of the first shutter 507 and the surface 41*h* of the second shutter 41 are disposed with a gap δ2 in the rotational direction of the second shutter 41. The gap δ1 and the gap δ2 each between the first shutter 507 and the second shutter 41 are play when the user mounts the toner pouch 40 on the developing container 32. By providing the gap δ1 and the gap δ2, a mounting property of the toner pouch 40 relative to the developing container 32 can be improved. When the gap δ1 becomes narrow, the gap δ2 broadens, and when the gap δ1 broadens, the gap δ2 becomes narrow.

After the toner pouch 40 is mounted on the developing container 32, the second shutter 41 is rotated about the rotational axis z in the arrow z1 direction. Part (c) of FIG. 40 is a state in which the gap δ1 which exists in part (b) of FIG. 40 disappears and in which the rib 507*f* of the first shutter 507 contacts the surface 41*g* of the second shutter 41. The rib 507*f* of the first shutter 507 is pressed by the surface 41*g* of the second shutter 41, so that the first shutter 507 is rotated together with the second shutter 41 about the rotational axis z in the arrow z1 direction. Incidentally, the gap δ2 in the state of part (c) of FIG. 40 becomes broader than the gap δ2 in the state of part (b) of FIG. 40. Further, the end portion 505*a* of the second sheet 505 is constituted so as to contact the surface 507*h* without being dismounted (detached) from the surface 507*h* of the first shutter 507. When the second shutter 41 is rotated about the rotational axis z in the arrow z1 direction from the state of part (c) of FIG. 40, the following state is formed. As shown in part (d) of FIG. 40, the gap δ2 formed by the surface 507*g* of the first shutter 507 and the surface 41*h* of the second shutter 41 is positioned below the downstream-side opening 501*b* of the supply base 501. At this time, the end portion 505*a* of the second sheet 505 contacts the surface 507*h* of the first shutter 507, and therefore, a constitution in which entrance of the toner into the gap δ2 is suppressed is formed.

When the second shutter 41 is further rotated about the rotational axis z in the arrow z1 direction from the state of part (d) of FIG. 40, a state of part (e) of FIG. 40 is formed. The state of part (e) of FIG. 40 is a state in which the supply opening 32*a* and the downstream-side opening 501*b* are exposed from the first shutter 507 and the second shutter 41, respectively. The toner accommodated in the pouch 503 (not shown) is supplied from the pouch 503 to the developing container 32 through the opening 503*a* of the pouch 503, the upstream-side opening 501*a* of the supple base 501, the pipe portion 501*c*, the downstream-side opening 501*b*, and the opening 504*a* of the second seal 504. The discharged toner is received in the developing container 32 through the first through hole 507*a* of the first shutter 507, the hole 506*a* of the first seal 506, and the supply opening 32*a* of the developing container 32. In the state of part (e) of FIG. 40, the second seal 504 is constituted so as to suppress entrance of the toner into an interface with the first shutter 507. Further, also, the first seal 506 is constituted so as to suppress the entrance of the toner into the interface with the first shutter 507.

Next, a method in which the toner pouch 40 is dismounted from the developing container 32 after the toner replenishing (supply) from the toner pouch 40 to the developing container 32 is completed will be described using the figures. Part (f) of FIG. 40 shows a state in which from the state shown in part (e) of FIG. 40, the second shutter 41 is rotated about the rotational axis z in the arrow z2 direction by an angle θ3 (0<θ3). This state is a state in which the gap δ2 existing in the state of part (e) of FIG. 40 disappears and in which the surface 507*g* of the first shutter 507 contacts the surface 41*h* of the second shutter 41. The gap δ1 in part (f) of FIG. 40 becomes broader than the gap δ1 in part (e) of FIG. 40.

The surface 507*g* of the first shutter 507 receives a pressing force from the surface 41*h* of the second shutter 41, so that the first shutter 507 is rotated together with the second shutter 41 about the rotational axis z in the arrow z2 direction. The surface 507*g* of the first shutter 507 functions as a portion-to-be-engaged, and the surface 41*h* of the second shutter 41 functions as an engaging portion for engaging with the surface 507*g*. When the first shutter 507 and the second shutter 41 are rotated from the state of part (f) of FIG. 40 in the arrow z2 direction, as shown in part (g) of FIG. 40, the first shutter 507 and the second shutter 41 shield the supply opening 32*a* of the developing container 32 and the downstream-side opening 501*b* of the supple base 501, respectively. The first through hole 507*a* of the first shutter 507 constitutes a part of a toner passage when the toner is supplied from the toner pouch 40 to the developing container 32 in the state shown in part (e) of FIG. 40, and the toner is deposited and left on the inner wall of the first through hole 507*a* in some cases. Therefore, the first seal 509 is constituted so as to suppress the entrance of the toner into the first through hole 507*a* and an interface between the first seal 509 and the first shutter 507.

Incidentally, in this state, the toner pouch 40 can be dismounted from the developing container 32, so that the toner pouch 40 and the developing container 32 are returned to the state shown in part (a) of FIG. 40.

[Connecting Portion Between Toner Pouch 40 and Developing Container 32]

As described above, the toner pouch 40 and the developing container 32 are constituted so as to be connected to each other by engagement between the bidirectional hole 501*h* of the supply base 501 of the toner pouch 40 and the bidirectional(-shaped) shaft portion 32*e* of the shaft portion 322 provided on the developing container 32. When the bidirectional hole 501*h* of the supply base 501 and the shaft portion 322 provided on the developing container 32 are engaged with each other, a constitution in which a position of the rotational axis z of the toner pouch 40 relative to the developing container 32 (image forming apparatus 1) is determined is formed.

Figure 41:
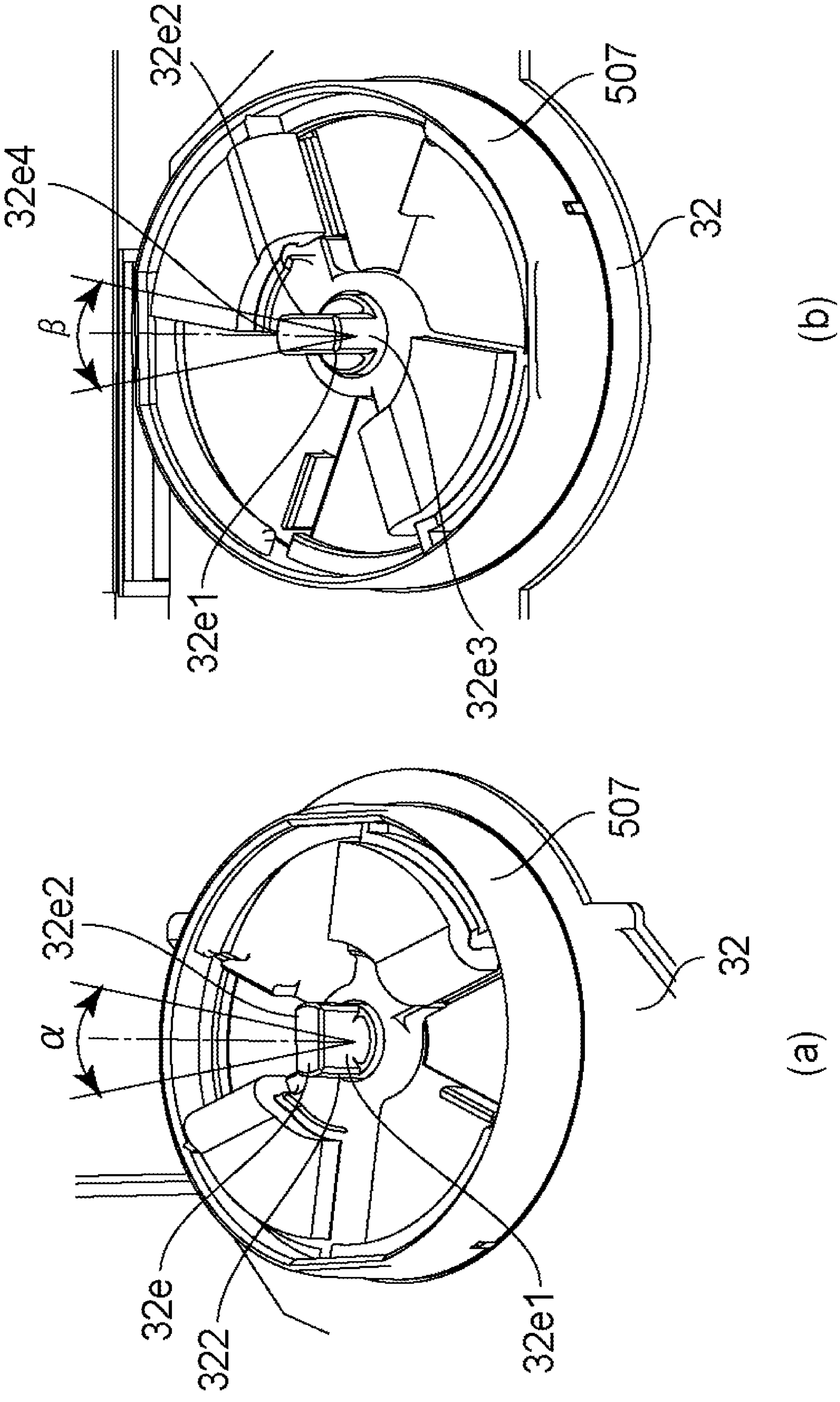
FIG. 41 includes perspective views showing a bidirectional shaft portion and peripheral portions.

In the following, details will be described using the figures. FIG. 41 includes perspective views showing the bidirectional shaft portion 32*e* of the developing container 32 and a peripheral portion thereof. The bidirectional shaft portion 32*e* includes flat surfaces 32*e*1 and 32*e*2 and outer peripheral surfaces 32*e*3 and 32*e*4. The flat surfaces 32*e*1 and 32*e*2 are surfaces extending in the direction of the rotational axis z and are surfaces which are parallel to each other and which opposes each other. The outer peripheral surfaces 32*e*3 and 32*e*4 are surfaces which have the same outer diameter, which constitute parts of cylindrical surfaces provided coaxially with each other along the rotational axis z, and which opposes each other. Part (a) of FIG. 41 is the perspective view in a direction such that the flat surface 32*e*1 of the bidirectional shaft portion 32*e* is on the front side. Part (b) of FIG. 41 is the perspective view in a direction such that the cylindrical surface 32*e*3 of the bidirectional shaft portion 32*e* is on the front side.

The bidirectional hole 501*h* of the supply base 501 shown in FIG. 30 includes a flat surface 501*h* land a flat surface 501*h*2, and inner peripheral surfaces 501*h*3 and 501*h*4. The flat surface 501*h*1 and the flat surface 501*h*2 are surfaces extending in the rotational axis z and are surfaces which are parallel to each other and which oppose each other. The inner peripheral surfaces 501*h*3 and 501*h*4 which have the same inner diameter, which constitute parts of cylindrical surfaces provided coaxially with each other along the rotational axis z, and which oppose each other.

When the toner pouch 40 is mounted on the developing container 32, the flat surfaces 32*e*1 and 32*e*2 of the bidirectional shaft portion 32 oppose the flat surface 501*h*1 and the flat surface 501*h*2, respectively, of the bidirectional hole 501*h* of the supply base 501. On the other hand, the outer peripheral surfaces 32*e*3 and 32*e*4 of the bidirectional shaft portion 32*e* oppose the inner peripheral surface 501*h*3 and the flat surface **501*h*4, respectively, of the bidirectional hole 501*h* of the supply base 501 shown in FIG. 30**.

A difference between a distance between the flat surface **501*h*1 and the flat surface 502*h*2 and a distance between the flat surface 32*e*1 and the flat surface 31*e*2 is smaller than a difference between an inner diameter of the inner peripheral surface 501*h*3 (501*h*4) and an outer diameter of the outer diameter surface 32*e*3 (32*e*4). For that reason, in the case where the toner pouch 40 is mounted on the developing container 32, the toner pouch 40 has a constitution in which the toner pouch 40 is hardly inclined in an arrow p direction shown in part (b) of FIG. 41 than in an arrow &a6 direction shown in part (a) of FIG. 41**.

Incidentally, the connecting portion between the toner pouch 40 and the developing container 32 is not limited to the constitution of this embodiment, and may only be required to have the following constitution. Either one of the portion-to-be-engaged of the toner pouch 40 and the engaging portion of the developing container 32 is a shaft portion and the other one is a hole. When the shaft portion and the hole are viewed in the rotational axis z direction, if it is assumed that a direction perpendicular to the rotational axis z is a first direction and that a direction perpendicular to the first direction is a second direction, a constitution in which a gap between the shaft portion and the hole in the first direction is larger than a gap between the shaft portion and the hole in the second direction may only be required.

As shown in part (b) of FIG. 33, the two downstream-side openings **501*b* (openings 504*a* of the second seal 504) of the supple base 501 of the toner pouch 40 are provided at positions opposing the flat surface 501*h*1 and the flat surface 501*h*2, respectively, of the bidirectional hole 501 of the supple base 501. Further, as shown in part (b) of FIG. 34, the two supply openings 32*a* of the developing container 32 are provided at positions opposing the flat surface 32*e*1 and the flat surface 32*e*2, respectively, of the bidirectional shaft portion 32*e* of the developing container 32. The reason why the two downstream-side openings 501*b* of the supply base 501 of the toner pouch 40 and the two supply openings 32*a* of the developing container 32** are disposed as described above will be described.

The following is preferred in order to suppress toner contamination in the connecting portion between the toner pouch 40 and the developing container 32. When the first shutter 507 and the second shutter 41 are in positions where these shutters open the supply openings **32*a* and the downstream-side openings 504, respectively, a deformation amount of the second seal 504 provided with the openings 504*a* with respect to a thickness direction (direction of the rotational axis z) is maintained in a predetermined range. By this, it is preferable that a contact pressure between the sliding surface 504*b* of the second seal 504 of the supply base 501 and the first shutter 507 is stabilized. The following problem arises if the two openings 504*a* of the second seal 504 are disposed in a direction in which an inclination becomes large when the toner pouch 40 is mounted in the developing container 32. In the case where the toner pouch 40 is inclined, although the deformation amount of the second seal 504 in the neighborhood of one opening 504*a* becomes large, the deformation amount of the second seal 504 in the neighborhood of the other opening 504*a* becomes small. As a result, the toner contamination is liable to occur in the neighborhood of the other opening 504*a***.

Therefore, in this embodiment, the two openings **504*a* (downstream-side openings 501*b* of the supply base 501) are provided in the arrow R direction in which the inclination of the toner pouch 40 is suppressed as shown in part (b) of FIG. 41. By this, it is possible to suppress the toner contamination between the toner pouch 40 and the developing container 32**.

Figure 42:
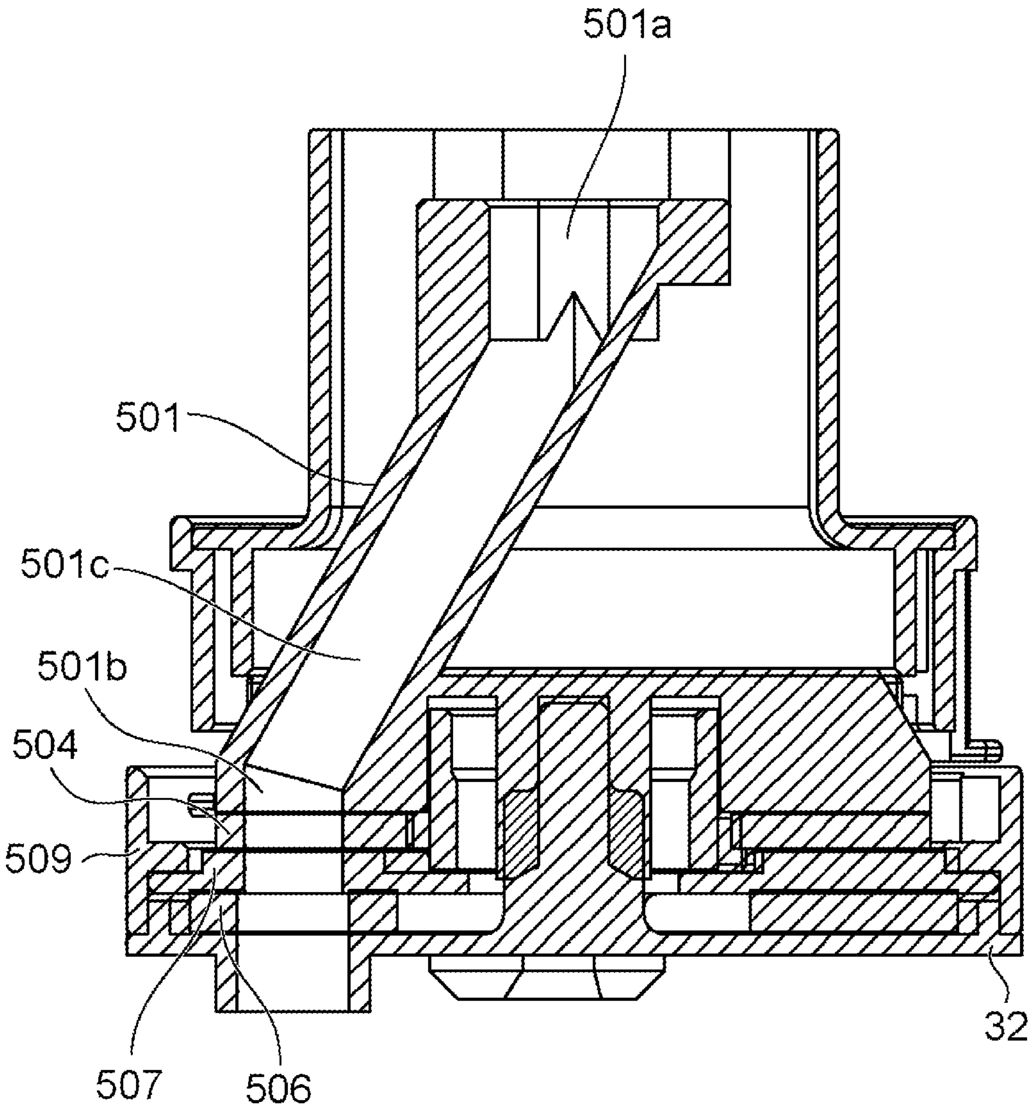
FIG. 42 is a perspective view showing another example of a downstream-side opening.

Incidentally, in this embodiment, although the two downstream-side openings **501*b* of the supple base 501 are provided, the present invention is not limited to this. The number of the downstream-side openings 501*b* may be one as shown in FIG. 42, or may be three or more. Incidentally, in this case, the number of the supply openings 32*a* or the like of the developing container 32** is caused to correspond to a form on the toner pouch side.

MODIFIED EMBODIMENT

Figure 43:
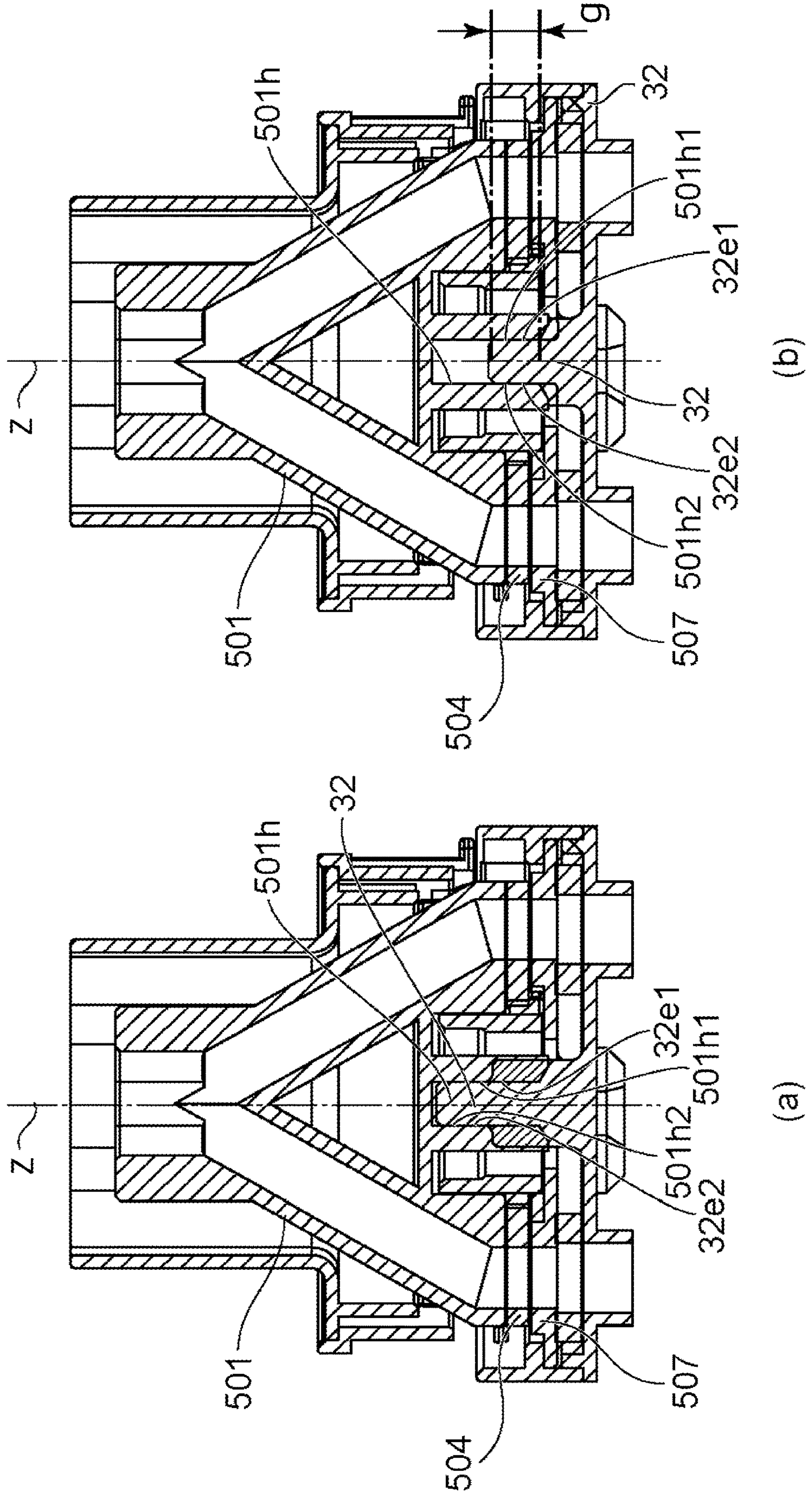
FIG. 43 includes sectional views showing a state in which the toner pouch and the developing container are connected to each other.

FIG. 43 includes sectional views which show a state in which the toner pouch 40 and the developing container 32 are connected to each other and which are perpendicular to the direction of the rotational axis z. Parts (a) and (b) of FIG. 43 are the sectional views for the embodiment 1 and a modified embodiment, respectively. The modified embodiment is different from the embodiment 1 in position, in the direction of the rotational axis z, of an engaging region g where the bidirectional shaft portion **32*e* of the developing container 32 and the bidirectional hole 501*h* of the toner pouch 40 engage with each other. In the modified embodiment, as shown in part (b) of FIG. 43, with respect to the rotational axis z direction, the second seal 504 and the first shutter 507** contact each other in the engaging region g.

After the toner pouch 40 is mounted on the developing container 32, even when the toner pouch 40 is inclined relative to the developing container 32 in the arrow a direction and the arrow R direction shown in FIG. 41, the influence of the second seal 504 on the deformation amount with respect to the rotational axis z can be made small.

(Discharge Opening of Developing Container 32)

Figure 44:
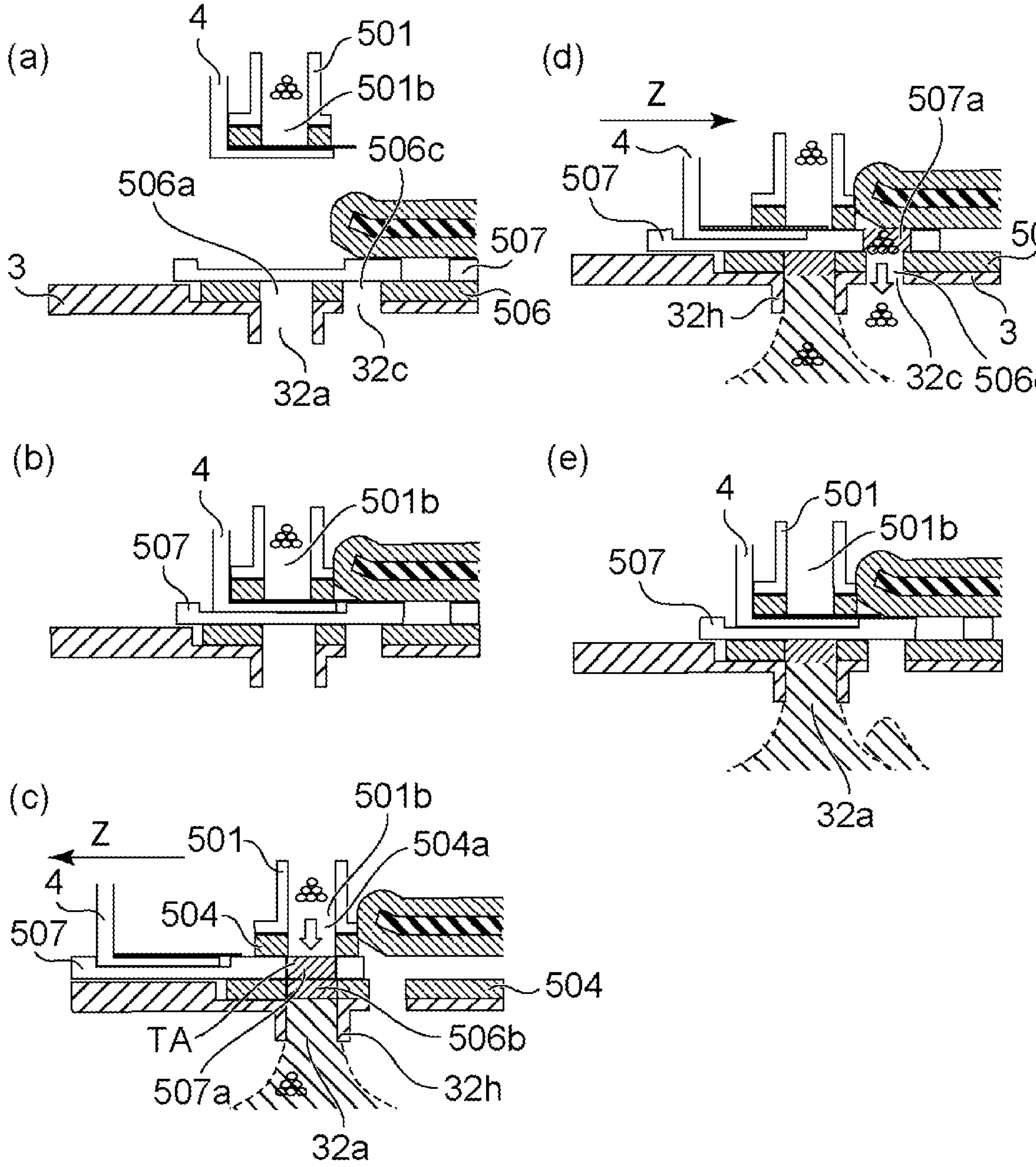
FIG. 44 includes schematic sectional views showing a state in which the toner pouch is mounted on the developing container.

FIG. 44 includes schematic sectional views showing the state in which the toner pouch 40 is mounted on the developing container 32. Part (a) of FIG. 44 shows a state before the developing container 32 and the toner pouch 40 are connected to each other. Part (b) of FIG. 44 is a state before the toner pouch 40 is mounted on the developing container 32, and the second shutter 41 of the toner pouch 40 and the first shutter 507 are rotated. A position of the first shutter 507 at this time is a second position. In this state, the supply opening **32*a* and the downstream-side opening 501*b* of the supple base 501 are shielded by the first shutter 507 and the second shutter 41, respectively, so that the toner accommodated in the pouch 503 is not supplied to the developing container 32**.

Part (c) of FIG. 44 shows a state in which the second shutter 41 is rotated about the rotational axis z in the arrow z1 direction by 60° from the state shown in part (b) of FIG. 44 and shows a state in which the supply opening **32*a* and the downstream-side opening 501*b* are opened. A position of the first shutter 507 is a first position. The toner accommodated in the pouch 503 (not shown) is supplied from the toner pouch 40 to the developing container 32 through the opening 503*a* of the pouch 503, the upstream-side opening 501*a* of the supple base 501, the pipe portion 501*c*, the downstream-side opening 501*b*, and the opening 504*a* of the second seal 504. The toner supplied from the toner pouch 40 is supplied into the developing container 32 through the first through hole 507*a* of the first shutter 507, the supplying opening 506*a* of the first seal 506, and the supply opening 32*a***.

The developing container 32 includes the supply opening **32*a* and the discharge opening 32*c*. In the state in which the toner pouch 40 is mounted on the developing container 32, when these openings are viewed in the direction of the rotational axis z, the supply opening 32***a* is in a position overlapping with the downstream-side opening 501*b* of the toner pouch 40, but the discharge opening 32*c* is provided in a position which does not overlap with the downstream-side opening 501*b*.

Here, the case where the toner is supplied from the toner pouch 40 to the developing container 32 and the toner in the developing container 32 becomes full will be considered. Part 8*c*) of FIG. 44 is a state in which the toner is supplied from the toner pouch 40 to the developing container 32 and in which the toner in the developing container 32 and the toner in the toner pouch 40 are connected to each other. The supply opening 32*a* of the developing container 32 is formed by the cylindrical rib 32*h* extending toward the inside of the developing container 32. Incidentally, the rib 32*h* may only be required to be a wall constituting the supply opening 33*a* and is not necessarily be cylindrical in shape. The toner supplied from the toner pouch 40 is moved from the supply opening 32*a* into the developing container 32, and as shown in part (c) of FIG. 44, is deposited in a state in which the toner broadens downward from the rib 32*h* of the developing container 32. In this state, even when the pouch 503 of the toner pouch 40 is deformed, the toner is continuously piled, and therefore, powder pressure of the toner generates, with the result that all the toner in the toner pouch 40 cannot be supplied to the developing container 32, so that the toner remains in the pouch 503.

Part (d) of FIG. 44 shows a state in which from the state shown in part (c) of FIG. 44, the second shutter 41 is rotated about the rotational axis z in the arrow z2 direction by an angle θ4 (0<θ4<60°). The following state is formed when the first shutter 507 is rotated in a state in which the toner in the pouch 503 is piled so as to be connected to the toner in the developing container 32. As shown in part (c) of FIG. 44, the first through hole 507*a* of the first shutter 507 and the toner (in the figure, the toner existing in a region TA) existing therein are rubbed and cut with each other and the toner is moved together with the first shutter 507. In part (d) of FIG. 44, below the first through hole 507*a* of the developing-side shutter 507 with respect to a vertical direction, the discharge opening 506*c* of the first seal 506 and the discharge opening 32*c* of the developing container 32 are provided. A position of the first shutter 507 at this time is a third position. With movement of the first shutter 507, the toner existing in the first through hole 507*a* and rubbed and cut by the first shaft 507 is constituted so as to fall into the developing container 32 through the discharge opening 506*c* of the first seal 506 and the discharge opening 32*c* of the developing container 32. Further, a lower end of a wall portion constituting the discharge opening 32*c* of the developing container 32 is constituted so as to be positioned on an upper side than a lower end of the rib 32*h* with respect to the vertical direction. This is because the toner deposited in the state in which the toner broadens downward below the rib 32*h* is avoided and the toner is dropped into a space portion in the developing container 32.

Part (e) of FIG. 44 shows a state in which the second shutter 41 is rotated about the rotational axis z in the arrow z2 direction by 60° from the state shown in part (d) of FIG. 44. The position of the first shutter 507 at this time is the second position which is the same as the position of part (b) of FIG. 44. This state is a state in which the supply opening 32*a* of the developing container 32 and the downstream-side opening 501*b* of the supple base 501 are shielded. That is, the third position of the first shutter 507 is between the first position and the second position.

As described hereinabove, even in the case where the opening/closing operation of the first shutter 507 is repeated in a state in which the supplying opening through which the toner is supplied from the toner pouch 40 to the developing container 32 is filled with the toner, it is possible to suppress the contamination with the toner and the toner leakage.

(Reinforcement of Pouch)

Figure 45:
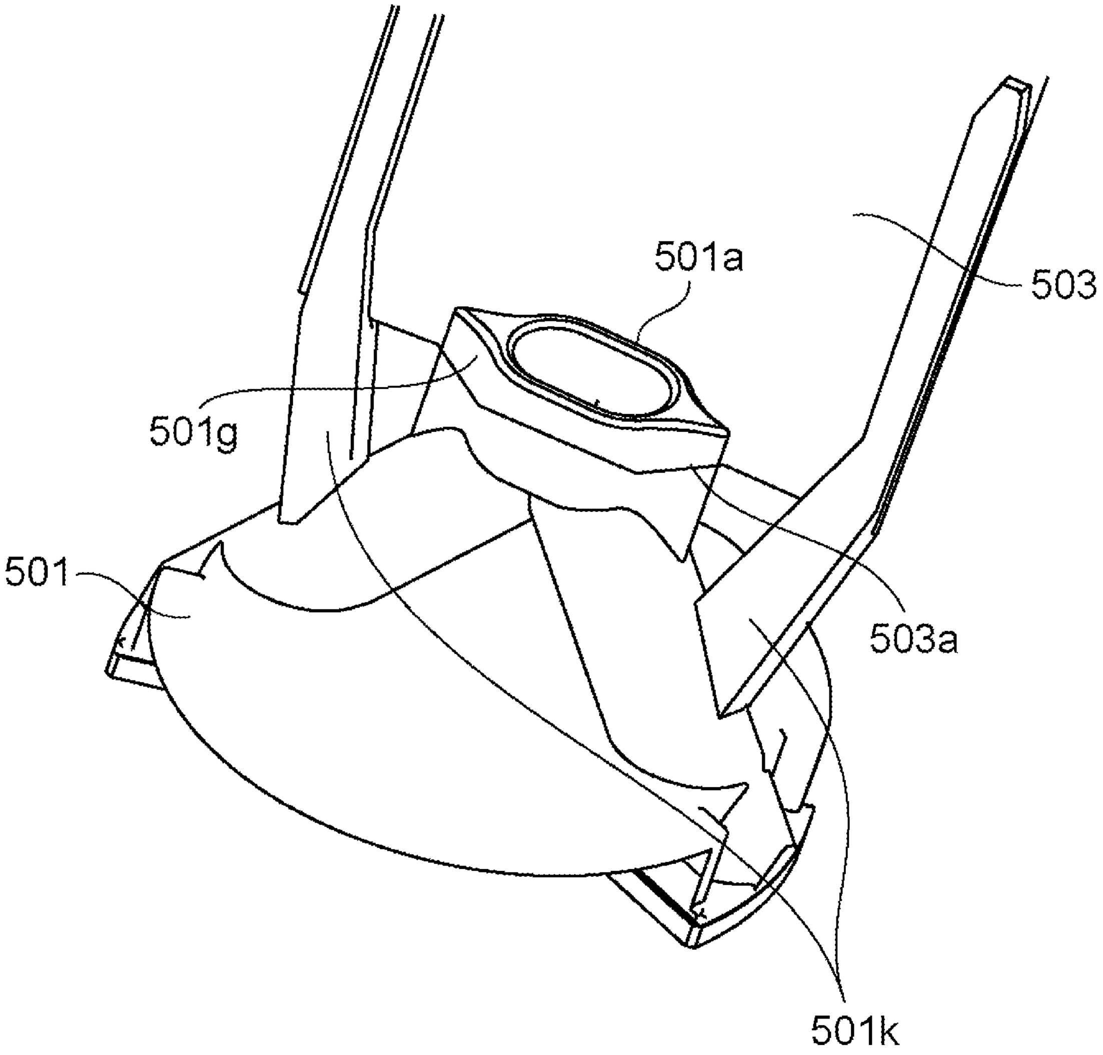
FIG. 45 is a perspective view showing another embodiment as to a connecting portion between the toner pouch and a supply base 501.

FIG. 45 shows another embodiment regarding the connecting portion between the pouch 503 of the toner pouch 40 and the supply base 501.

The supply base 501 is provided with reinforcing ribs 501*k* which sandwich the pouch 503 therebetween and for reinforcing the pouch 503. The supply base 501 is mounted to an end portion of the pouch 503 with respect to the longitudinal direction on a side where the pouch opening 503*a* is provided so that the upstream-side opening 501*a* and the pouch opening 503*a* communicate with each other. The supply base 501 is provided with two reinforcing ribs 501*k* as supporting portions for sandwiching and supporting, over the longitudinal direction of the pouch 503, one end portion of the pouch 503 with respect to the direction perpendicular to the longitudinal direction of the pouch 503. In the direction perpendicular to the longitudinal direction of the pouch 503, the two reinforcing ribs 501*k* as a first supporting portion and a second supporting portion are provided on opposite sides from each other while sandwiching the upstream-side opening 501*a* therebetween. The reinforcing ribs 501*k* may preferably extend to a longitudinal center of the pouch 503 in the longitudinal direction of the pouch 503. The pouch 503 is constituted by a resin sheet such as PE, or a composite material of these, or the like, and has a form such that the pouch 503 is capable of being easily deformed by the user. On the other hand, a constitution in which the pouch 503 is reinforced (supported) by the reinforcing ribs 501*k* in order that the pouch 503 and the supply base 501 are connected to each other with reliability and that the pouch is caused to stand by itself is employed.

Incidentally, a constitution in which the reinforcing ribs 501*k* support the pouch 503 by being bonded to the pouch 503 without sandwiching the pouch 503 may be employed.

First Modified Embodiment

Figure 19:
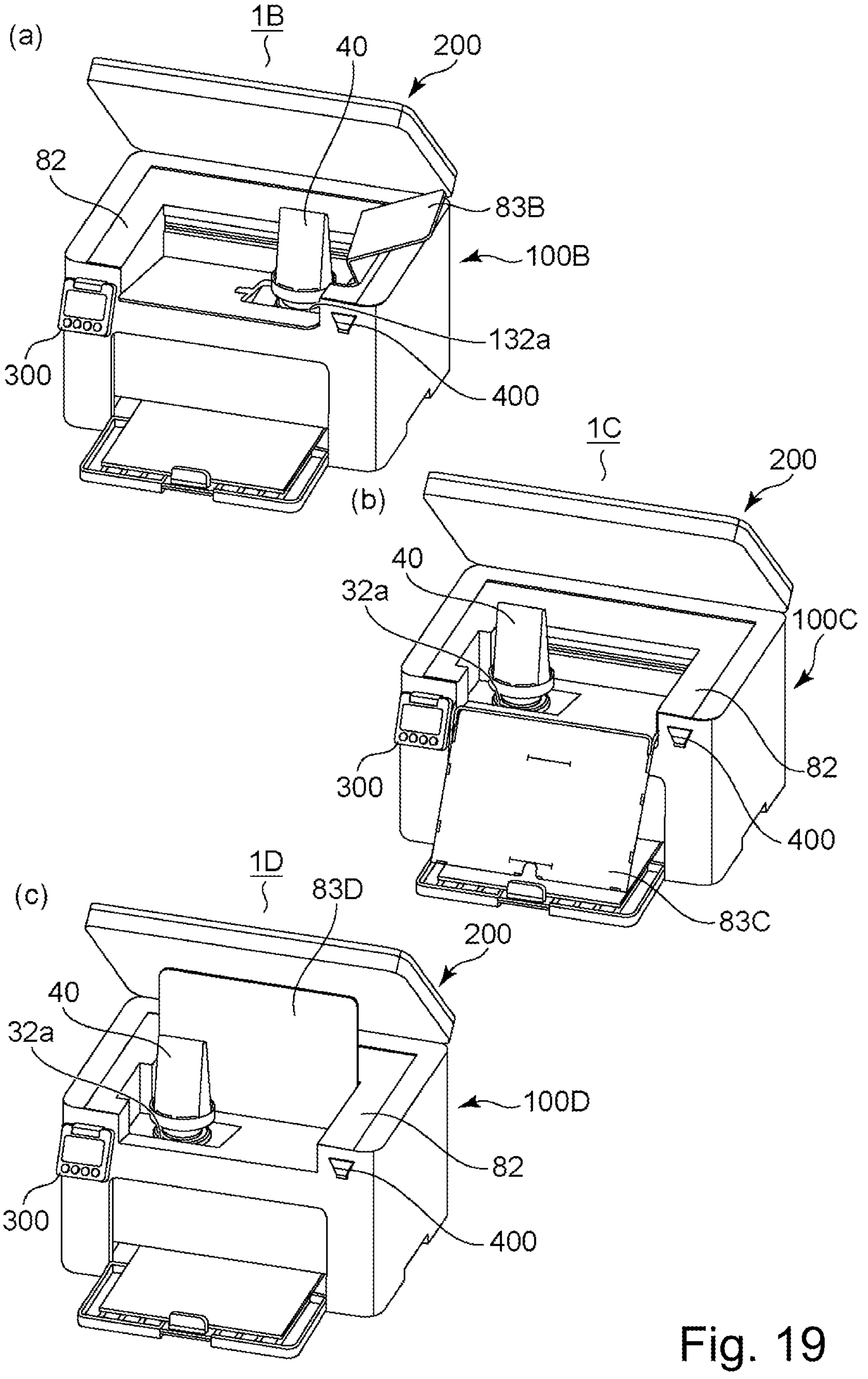
In FIG. 19, part (a) is a perspective view showing a first modified embodiment of the image forming apparatus, part (b) is a perspective view showing a second modified embodiment of the image forming apparatus, and part (c) is a perspective view showing a third modified embodiment.

In part (a) of FIG. 19, a first modified embodiment is shown. As shown in part (a) of FIG. 19, an image forming apparatus 1B is such that a supply opening 132*a* of the developing container is disposed on a right side of the apparatus and that an openable(/closable) member 83B is also disposed on the right side of the apparatus. The openable member 83B exposes the supply opening 132*a* in an open state and covers the supply opening 132*a* in a closed state. Thus, by disposing the supply opening 132*a* on the right side of the apparatus, the supply opening 132*a* is close to the remaining toner amount panel 400. For this reason, when the toner supply to the developing container is carried out using the toner pouch 40, it is possible to check the remaining toner amount panel 400 easily.

Second Modified Embodiment

Further, the present invention is not limited to the embodiment shown in part (a) of FIG. 19, as shown in part (b) of FIG. 19, the present invention may also be applied to an image forming apparatus 1C constituted so that an openable member 83C is opened to the front side.

Third Modified Embodiment

Further, as shown in part (c) of FIG. 19, the present invention may also be applied to an image forming apparatus 1D constituted so that an openable member 83D is opened to the rear side.

Fourth Modified Embodiment

Figure 20:
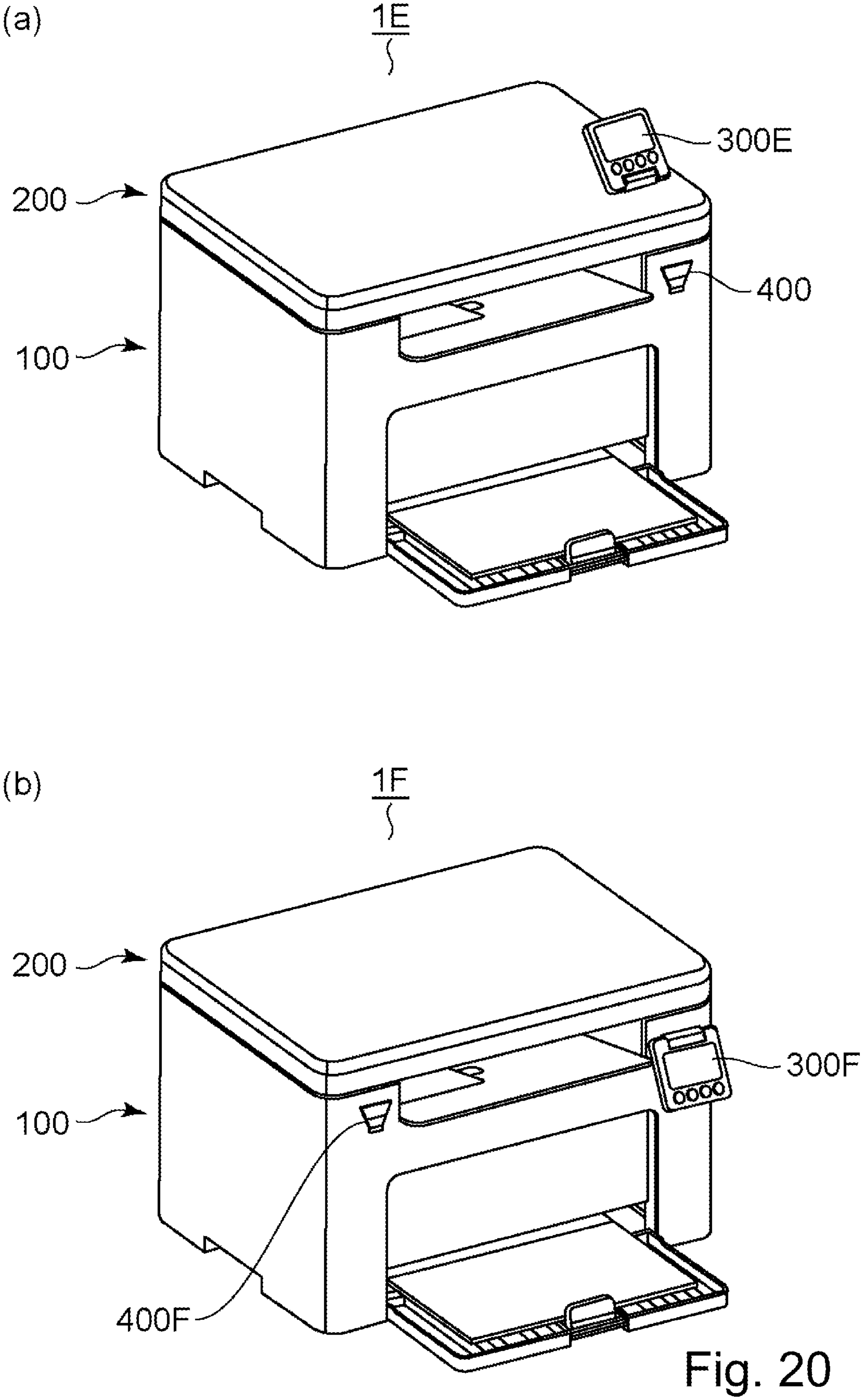
In FIG. 20, part (a) is a perspective view showing a fourth modified embodiment of the image forming apparatus, and part (b) is a perspective view showing a fifth modified embodiment of the image forming apparatus.

Further, as shown in part (a) of FIG. 20, an operating portion 300E may be disposed on the reading device 200, not the printer main assembly 100, and further may also be disposed together with the remaining toner amount panel 400 on the right side of the apparatus. Incidentally, both the operating portion 300E and the remaining toner amount panel 400 may be disposed on the right side as a matter of course.

Fifth Modified Embodiment

Further, as shown in part (b) of FIG. 20, a remaining toner amount panel 400F may be disposed on the left side, and an operating portion 300F may be disposed on the right side.

Second Embodiment

Next, although a second embodiment of the present invention will be described, in the second embodiment, the constitution of the supply opening 32*a* in the first embodiment is changed. For this reason, constituent elements similar to those in the first embodiment will be omitted from illustration or will be described by adding the same symbols to the figures.

Figure 21:
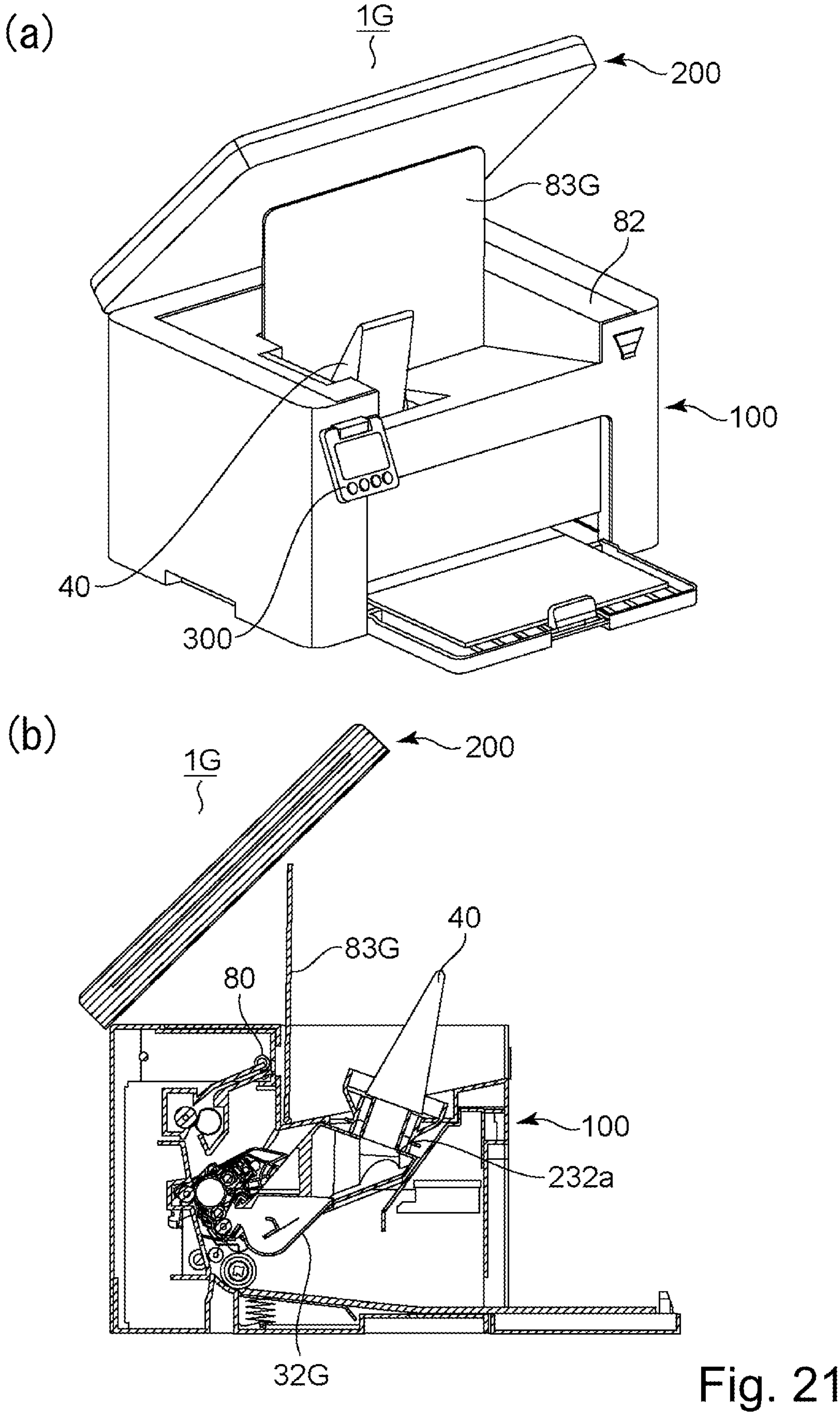
In FIG. 21, part (a) is a perspective view showing an image forming apparatus according to a second embodiment, and (b) is a sectional view showing the image forming apparatus.

As shown in part (a) of FIG. 21, an image forming apparatus 1G is constituted so that an openable member 83G is supported by the top cover 82 so as to be openable and closable relative to the top cover 82 and so that the openable member 83G opens toward the rear side of the apparatus. By opening the openable member 83G, a supply opening 232*a* of a developing container 32G is exposed. Further, the supply opening 232*a* opens toward a downstream and upward in the discharging direction of the discharging roller pair 80 so as to be inclined with respect to the vertical direction, and in other words, the supply opening 232*a* opens obliquely frontward and upward.

By this constituting the supply opening 232*a*, the toner pouch 40 is in a state in which the toner pouch 40 is inclined frontward in a state in which the toner pouch 40 is mounted on the supply opening 232*a*. For this reason, a space between the supply opening 232*a* and the detecting device 200 can be effectively utilized, so that a large-volume toner pouch becomes mountable on the supply opening 232*a*.

Figure 22:
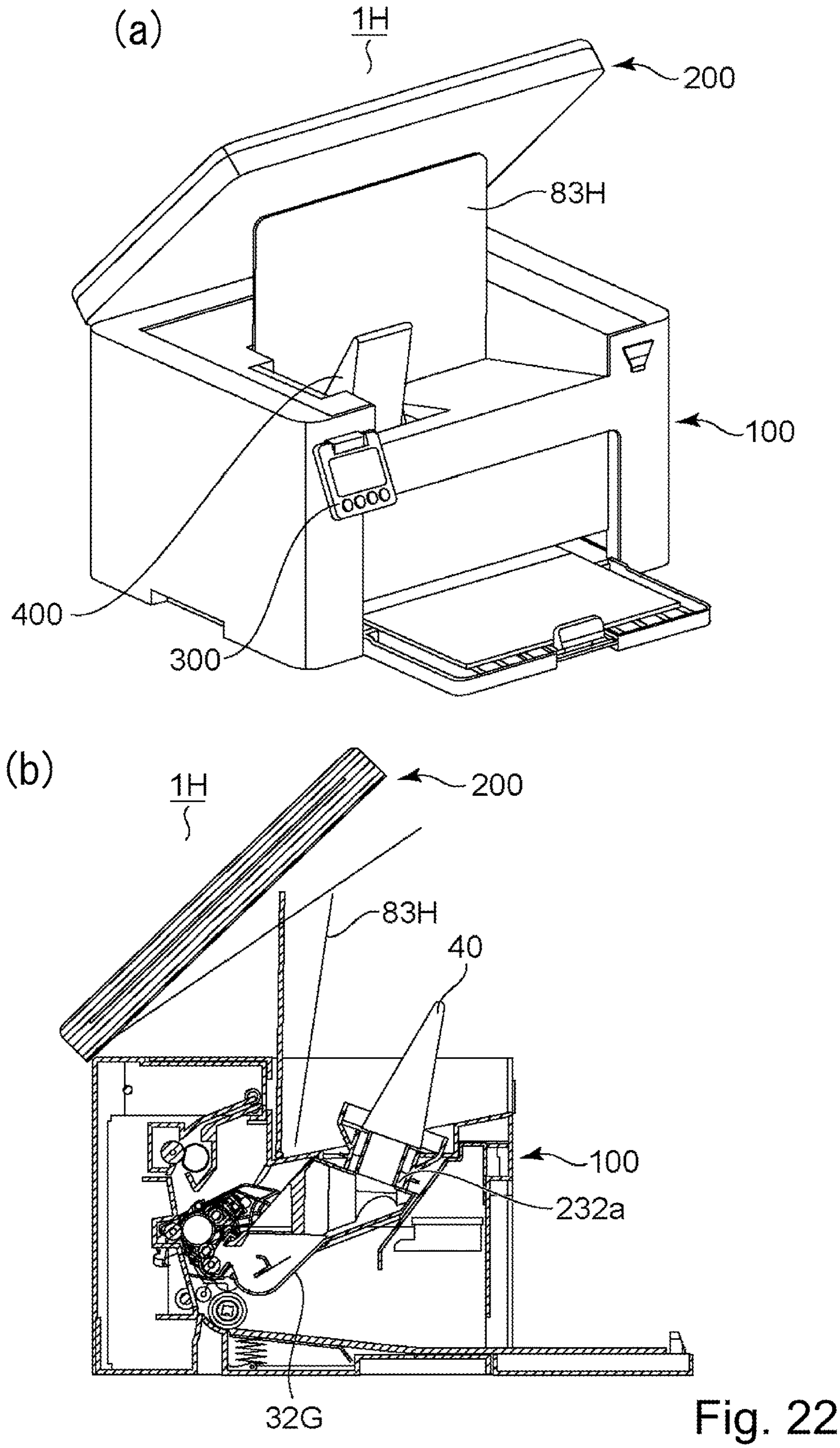
In FIG. 22, part (a) is a perspective view showing a modified embodiment of the image forming apparatus of the second embodiment, and part (b) is a sectional view showing the modified embodiment of the image forming apparatus of the second embodiment.

Incidentally, as shown in parts (a) and (b) of FIG. 22, an openable member 83H and the reading device 200 may be constituted so as to be held at a shallower angle than those in parts (a) and (b) of FIG. 21. By employing such constitution, an installation space of the image forming apparatus 1 can be saved.

Third Embodiment

Next, although a third embodiment of the present invention will be described, in the third embodiment, the constitution of the cartridge guide 102 in the first embodiment is changed. For this reason, constituent elements similar to those in the first embodiment will be omitted from illustration or will be described by adding the same symbols to the figures.

Figure 23:
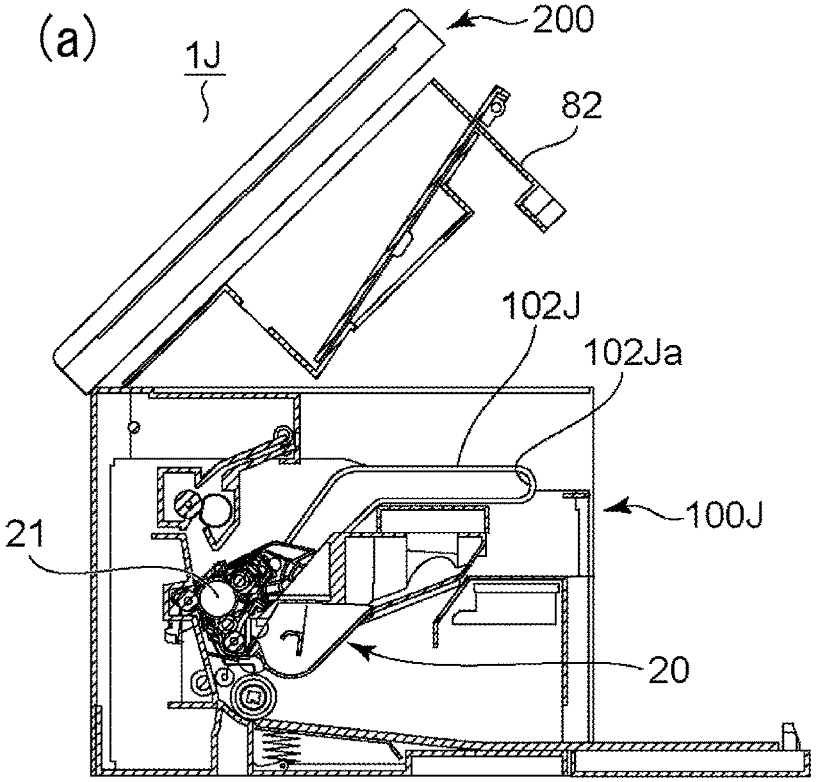
In FIG. 23, part (a) is a sectional view showing an image forming apparatus of a third embodiment, and (b) is a sectional view showing the image forming apparatus in a state in which a process cartridge is pulled out.
Figure 23:
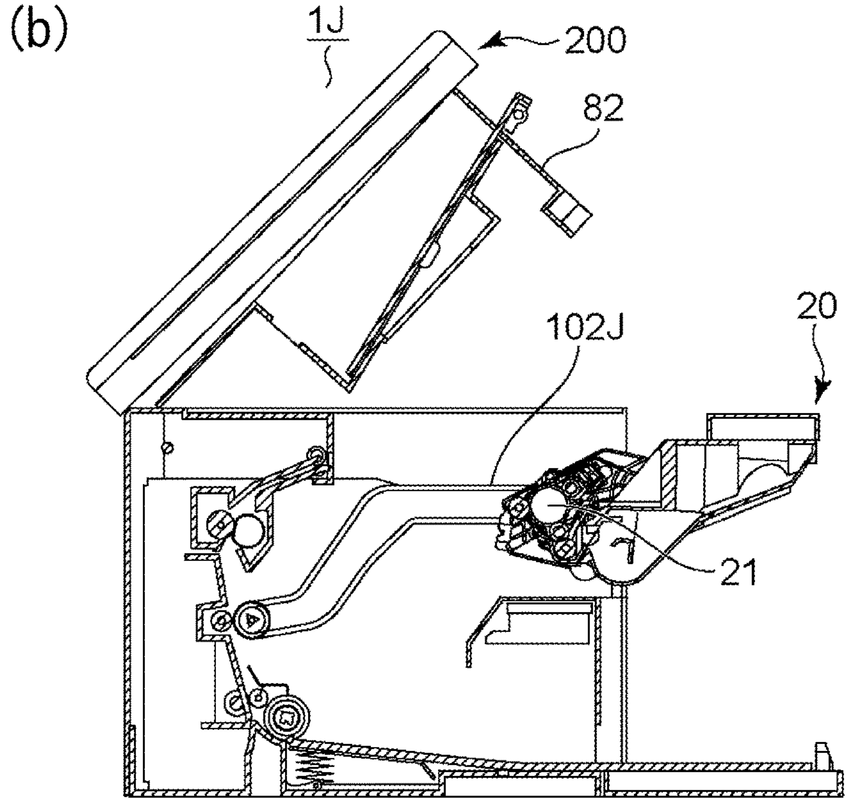

An image forming apparatus 1J includes, as shown in parts (a) and (b) of FIG. 23, a printer main assembly 100J and the reading device 200, and the printer main assembly 100J includes a cartridge guide 102J. The cartridge guide 102J slides with the projected portion 21*a* (see part (a) of FIG. 5) provided at an end portion of the photosensitive drum 21 in the axial direction, and thus guides the process cartridge 20 when the process cartridge 20 is pulled out.

At a downstream end of the cartridge guide 102J in a pulling-out direction, a retainer 102Ja is formed. For this reason, as shown in part (b) of FIG. 23, when the user pulls out the process cartridge 20, the projected portion 21*a* of the process cartridge 20 abuts against the retainer 102Ja, so that the process cartridge 20 is not dismounted from the printer main assembly 100J. Incidentally, in the neighborhood of the retainer 102Ja, an unshown rotation stopper is provided, so that the process cartridge 20 is held by the rotation stopper without rotation in a state in which the process cartridge 20 abuts against the retainer 102Ja.

Figure 24:
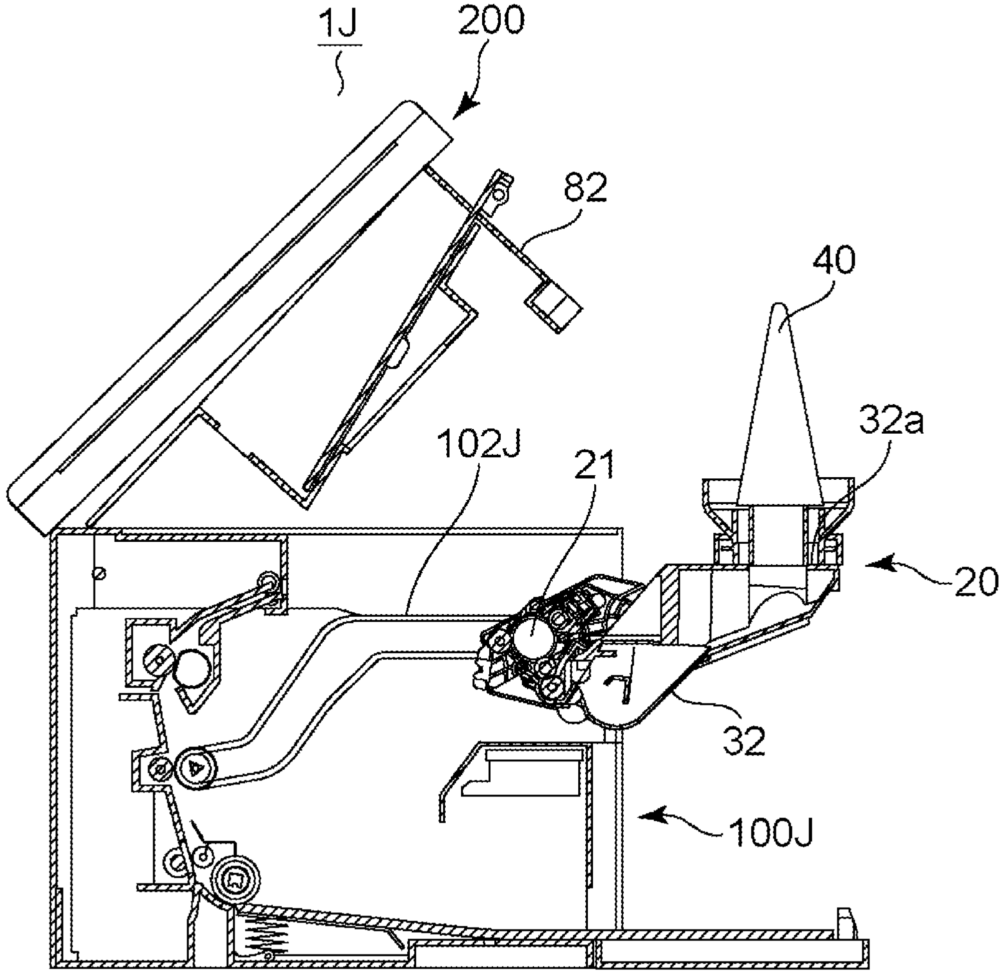
FIG. 24 is a sectional view showing a state in which a toner pouch is mounted on a process cartridge in a pulled-out state.
Figure 25:
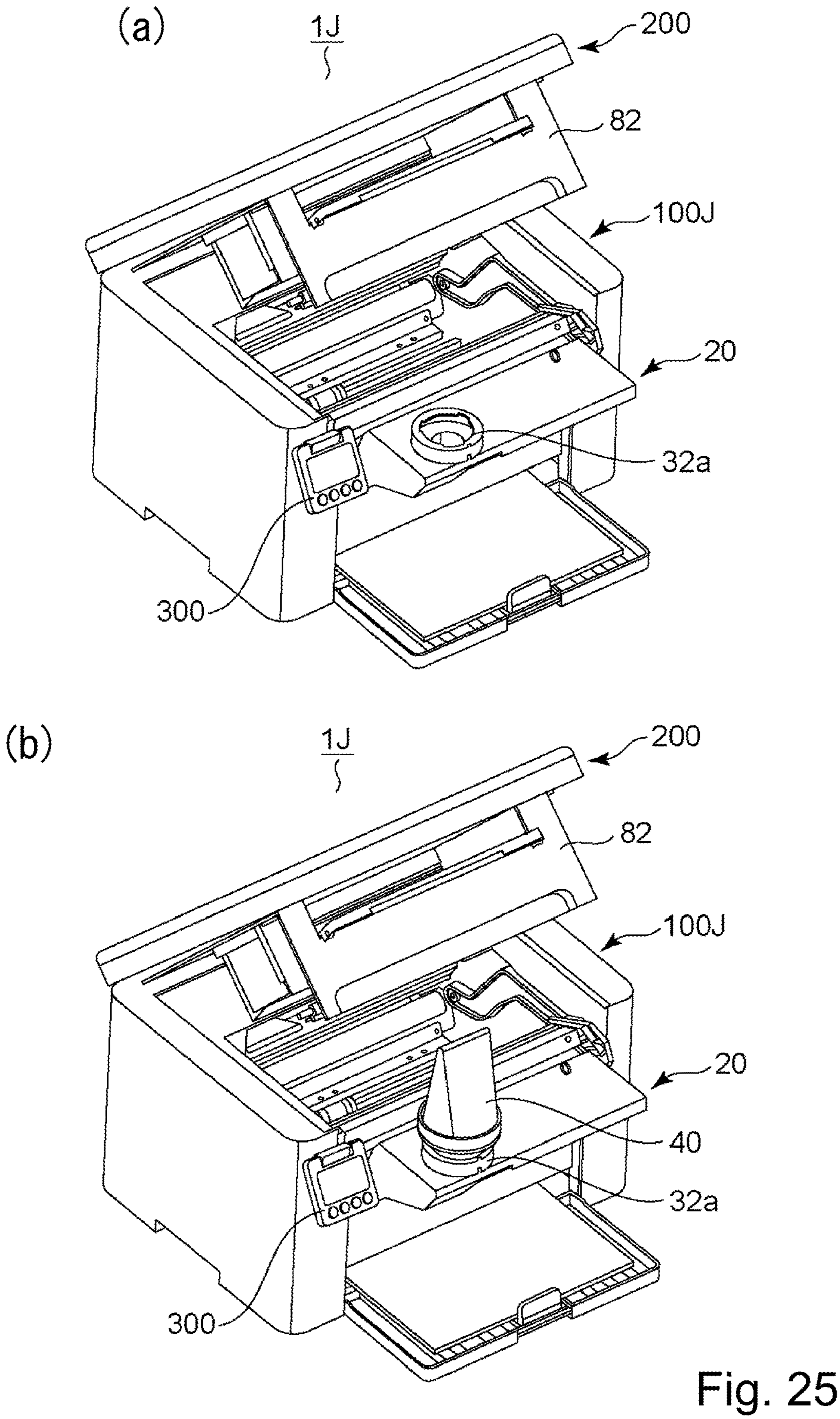
In FIG. 25, part (a) is a perspective view showing the image forming apparatus in a state in which the process cartridge is pulled out, and part (b) is a perspective view showing a state in which the toner pouch is mounted on the process cartridge in the pulled-out state.

Thus, in a state in which the process cartridge 20 is pulled out along the cartridge guide 102J, as shown in FIG. 24 and parts (a) and (b) of FIG. 25, the supply opening 32*a* is positioned on the front side of the image forming apparatus 1J. For this reason, it is possible to easily perform a toner supply operation for supplying the toner from the supply opening 32*a* to the developing container 32 with use of the toner pouch 40. Further, just above the supply opening 32*a*, a large space exists, and therefore, a large-volume toner pouch can be mounted on the supply opening 32*a*. Incidentally, any embodiments and modified embodiments which have been described hereinbefore may be appropriately combined with each other.

Incidentally, in either embodiment which has been described hereinbefore, the detecting device 200 was provided above the printer main assembly, but the present invention is not limited thereto. That is, the image forming apparatus may be a printer which does not include the reading device. Further, the reading device may be a reading device provided with an ADF (Auto Document Feeder) for feeding an original.

In the toner container constituted so as to be mountable in and dismountable from the main assembly accommodating portion which is the main assembly(-side) accommodating portion provided in the image forming apparatus and for accommodating the toner and which includes the receiving opening for permitting reception of the toner and the engaging portion, the container for accommodating the toner, the base which is fixed to the container and which includes the supplying opening for permitting supply of the toner accommodated in the container to the main assembly accommodating portion, the portion-to-be-engaged constituted so as to be engaged with the engaging portion of the main assembly accommodating portion, and the shutter supported by the base so as to be rotatable about the rotational axis relative to the base are provided, and the shutter constituted so as to be rotated between the first position where the supplying opening is opened and the second position where the supplying opening is shielded and the engaging portion are provided coaxially with each other along the rotational axis, and the base is constituted so as to be engageable with the engaging portion of the main assembly accommodating portion so that the base is not rotated relative to the main assembly accommodating portion.

In the image forming apparatus to which the toner container which is the toner container for accommodating the toner and which includes the supplying opening for permitting the supply of the toner, the shutter including the through hole and the shielding portion and constituted rotatably about the rotational axis, and the toner accommodating portion which is the toner accommodating portion constituted so that the toner container is mountable thereto, which includes the receiving opening provided at the position overlapping with the supplying opening so as to be capable of receiving the toner from the toner container when the receiving opening is viewed in the direction of the rotational axis, and the discharge opening provided at the position which does not overlap with the supplying opening, and in which the toner dropped form the receiving opening and the discharge opening is accommodated is provided, and the shutter is constituted so that when the shutter is viewed in the direction of the rotational axis, the shutter is rotated between the first position where the through hole overlaps with the receiving opening so that the toner in the toner container is supplied to the toner accommodating portion and the second position where the shielding portion overlaps with the receiving opening so that the toner in the toner container is not supplied to the toner accommodating portion, and passes through the third position where the through hole overlaps with the discharge opening when the shutter is viewed in the direction of the rotational axis during rotation thereof from the first position to the second position.

In the toner container which is mountable to and dismountable from the main assembly accommodating portion of the image forming apparatus, the pouch in which the toner is accommodated and which includes the opening at the end portion with respect to the longitudinal direction, and the base which is the base mounted to the end portion of the pouch and which includes the supplying opening communicating with the opening and for permitting the supply of the toner to the main assembly accommodating portion are provided, and the base includes the supporting portion for supporting, over the longitudinal direction, one end portion of the pouch with respect to the direction perpendicular to the longitudinal direction of the pouch.

INDUSTRIAL APPLICABILITY

According to the present invention, there is provided a toner container for an electrophotographic image forming apparatus or the like.

The present invention is not restricted to the foregoing embodiments, but can be variously changed and modified without departing from the spirit and the scope of the present invention. Accordingly, the following claims are attached for making public the scope of the present invention.

This application claims the Conventional Priority from Japanese Patent Application 2019-146927 filed Aug. 9, 2019, Japanese Patent Application 2019-146928 filed Aug. 9, 2019, Japanese patent Application 2019-146929 filed Aug. 9, 2019, and Japanese Patent Application 2019-146930 filed Aug. 9, 2019, all disclosure of which are incorporated by reference herein.

The invention claimed is:

1. A toner container for accommodating toner, the toner container comprising:

a pouch configured to accommodate the toner therein and provided with an opening at a first end portion of the pouch with respect to a first direction, with a width of the pouch in a second direction that is perpendicular to the first direction being wider than a width of the pouch in a third direction that is perpendicular to both the first direction and the second direction;

a base attached to the first end portion of the pouch and provided with a supplying opening communicating with the opening of the pouch, the supplying opening being configured to permit supply of the toner to outside of the toner container;

a shutter configured to move between an open position and a closed position with respect to the base, the open position being a position in which the shutter opens the supplying opening to permit supply of the toner to outside of the toner container, the closed position being a position in which the shutter closes the supplying opening, with the shutter being engaged to the base in the open position and the closed position;

a first supporting portion provided outside of the pouch and supporting the pouch on a first side of the first end portion of the pouch with respect to the second direction, the first supporting portion extending in a direction from the first end portion of the pouch to a second end portion of the pouch that is opposite to the first end portion of the pouch with respect to the first direction; and a second supporting portion provided outside of the pouch and supporting the pouch on a second side of the first end portion of the pouch that is opposite to the first side of the first end portion of the pouch with respect to the second direction, the second supporting portion extending in the direction from the first end portion of the pouch to the second end portion of the pouch, wherein, as seen in the third direction, a central portion of the pouch between the first supporting portion and the second supporting portion with respect to the second direction is exposed to outside of the first and second supporting portions.

2. A toner container according to claim 1, wherein the base includes the first supporting portion and the second supporting portion, and wherein the opening of the pouch is positioned between the first supporting portion and the second supporting portion in the second direction.

3. A toner container according to claim 1, wherein the first and second supporting portions extend at least to a center of the pouch in the first direction.

4. A toner container according to claim 1, wherein the first and second supporting portions extend along edges on the first and second sides of the first end portion of the pouch, respectively, in the direction from the first end portion of the pouch to the second end portion of the pouch.

5. A toner container according to claim 1, wherein the pouch includes a part where a width of the pouch in the second direction becomes narrower toward the base in the first direction.

6. A toner container according to claim 1, wherein the pouch is constituted by a resin sheet.

7. A toner container according to claim 1, wherein the shutter is rotatable between the open position and the closed position about a rotational axis extending in the first direction, and wherein, as seen in the third direction, the rotational axis of the shutter is provided between the first supporting portion and the second supporting portion in the second direction.

8. A toner container according to claim 7, wherein the base includes a hole that opens in a direction from the pouch to the base in the first direction, wherein the rotational axis of the shutter passes through the hole, and wherein the hole of the base is exposed outside of the toner container when the shutter is in the closed position.

* * * * *